US012400603B2

(12) United States Patent
Choi et al.

(10) Patent No.: US 12,400,603 B2
(45) Date of Patent: Aug. 26, 2025

(54) GATE DRIVING CIRCUIT AND DISPLAY DEVICE

(71) Applicant: LG Display Co., Ltd., Seoul (KR)

(72) Inventors: Hoon Choi, Paju-si (KR); HongJae Shin, Paju-si (KR); YongHo Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/590,630

(22) Filed: Feb. 28, 2024

(65) Prior Publication Data

US 2024/0290285 A1 Aug. 29, 2024

(30) Foreign Application Priority Data

Feb. 28, 2023 (KR) ........................ 10-2023-0027316

(51) Int. Cl.

*G09G 3/3266* (2016.01)
*G09G 3/32* (2016.01)
*G09G 3/3291* (2016.01)
*G09G 3/36* (2006.01)

(52) U.S. Cl.

CPC ............ *G09G 3/3266* (2013.01); *G09G 3/32* (2013.01); *G09G 3/3291* (2013.01); *G09G 3/3677* (2013.01); *G09G 2310/0267* (2013.01); *G09G 2310/0286* (2013.01); *G09G 2310/0291* (2013.01); *G09G 2310/08* (2013.01); *G09G 2330/08* (2013.01)

(58) Field of Classification Search

None

See application file for complete search history.

(56) References Cited

U.S. PATENT DOCUMENTS 11,657,756 B2 * 5/2023 Wang .................. G09G 3/3233 345/690
2011/0157124 A1 * 6/2011 Jung ...................... G11C 19/28 345/55

FOREIGN PATENT DOCUMENTS

CN 118871972 A * 10/2024 ............... G09G 3/20

* cited by examiner

*Primary Examiner* — Duane N Taylor, Jr.

(74) *Attorney, Agent, or Firm* — Birch, Stewart, Kolasch & Birch, LLP

(57) ABSTRACT

A gate driving panel circuit and a display device are discussed. The gate driving circuit in an example includes n gate driving panel circuits configured to output two or more gate signals where, n is a natural number equal to or larger than 2, a start dummy gate driving panel circuit configured to generate a first feedback voltage and transfer a start carry signal to a first gate driving panel circuit among the plurality of gate driving panel circuits, and an end dummy gate driving panel circuit configured to generate a second feedback voltage and transferring an end carry signal to an nth gate driving panel circuit.

19 Claims, 39 Drawing Sheets

GATE DRIVING CIRCUIT AND DISPLAY DEVICE

CROSS-REFERENCE TO RELATED APPLICATION

This application claims priority to Korean Patent Application No. 10-2023-0027316, filed in the Republic of Korea on Feb. 28, 2023, the entire contents of which is hereby expressly incorporated by reference into the present application.

BACKGROUND

Field

Embodiments of the disclosure relate to a gate driving circuit and a display device including the same, and, more specifically, to a lightweight gate driving circuit and a display device including the same, which can reduce the size of the gate bezel area and facilitate defect detection.

Discussion of the Related Art

Example display devices for displaying an image based on digital data include liquid crystal display (LCD) devices using liquid crystal and organic light emitting display devices using organic light emitting diodes OLEDs.

Among these display devices, the organic light emitting display device uses self-emission light emitting diodes, which provide advantages, such as a fast response and better contrast ratio, luminous efficiency, luminance, and viewing angle. In this case, the light emitting diode can be implemented with an inorganic material or an organic material.

The organic light emitting display device can include organic light emitting diodes respectively arranged in a plurality of subpixels disposed on a display panel and cause the organic light emitting diodes to emit light by controlling the current flowing to the organic light emitting diodes, thereby displaying images while controlling the brightness of each subpixel.

The display device can include a gate driving circuit and a data driving circuit that can drive the display panel.

The gate driving circuit can be implemented, in a gate in panel (GIP) type, in the display panel. Having the gate driving panel circuit implemented in the display panel, the size of the gate bezel area can be increased.

SUMMARY OF THE DISCLOSURE

Accordingly, the inventors of the disclosure have invented a lightweight gate driving circuit and a display device including the same, which can reduce the size of the gate bezel area and facilitate defect detection.

Embodiments of the disclosure can provide a lightweight gate driving circuit and a display device including the same, which can reduce the size of the gate bezel area by configuring the dummy gate driving panel circuit to be simpler than the gate driving panel circuit.

Embodiments of the disclosure can provide a lightweight gate driving circuit and a display device including the same, which can reduce the size of the gate bezel area and facilitate defect detection by configuring a feedback circuit in the dummy gate driving panel circuit.

Embodiments of the disclosure can provide a gate driving circuit comprising n gate driving panel circuits outputting two or more gate signals (where, n is a natural number equal to or larger than 2), a start dummy gate driving panel circuit generating a first feedback voltage and transferring a start carry signal to a first gate driving panel circuit among the n gate driving panel circuits, and an end dummy gate driving panel circuit generating a second feedback voltage and transferring an end carry signal to an nth gate driving panel circuit among the n gate driving panel circuits.

Embodiments of the disclosure can provide a display device comprising a display panel having a plurality of subpixels, a gate driving circuit configured to supply a plurality of gate signals to the display panel through a plurality of gate lines, a data driving circuit configured to supply a plurality of data voltages to the display panel through a plurality of data lines, and a timing controller configured to drive the gate driving circuit and the data driving circuit, wherein the gate driving circuit includes n gate driving panel circuits outputting two or more gate signals (where, n is a natural number equal to or larger than 2), a start dummy gate driving panel circuit generating a first feedback voltage and transferring a start carry signal to a first gate driving panel circuit among the n gate driving panel circuits, and an end dummy gate driving panel circuit generating a second feedback voltage and transferring an end carry signal to an nth gate driving panel circuit among the n gate driving panel circuits.

According to embodiments of the disclosure, it is possible to reduce the size and weight of the gate bezel area and facilitate defect detection.

According to embodiments of the disclosure, it is possible to reduce the size and weight of the gate bezel area by configuring the dummy gate driving panel circuit to be simpler than the gate driving panel circuit.

According to embodiments of the disclosure, it is possible to reduce the size and weight of the gate bezel area and facilitate defect detection by configuring a feedback circuit in the dummy gate driving panel circuit.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
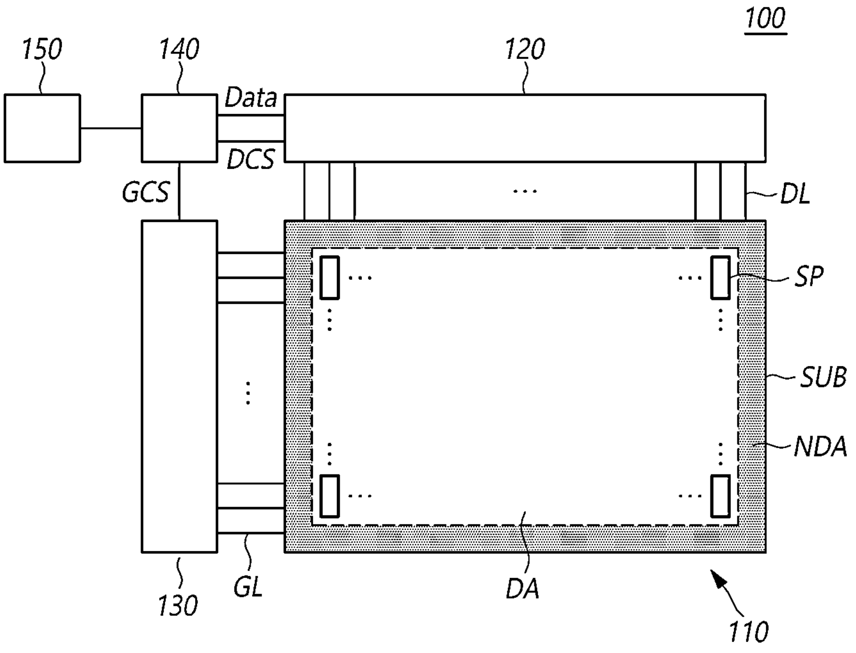
FIG. 1 is a view illustrating a system configuration of a display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings. All the components of each display device or driving circuit according to all embodiments of the present disclosure are operatively coupled and configured.

FIG. 1 is a view illustrating a system configuration of a display device 100 according to embodiments of the disclosure.

Referring to FIG. 1, the display device 100 according to the embodiments of the disclosure can include a display panel 110 including a plurality of subpixels SP and one or more driving circuits for driving the plurality of subpixels SP included in the display panel 110.

The driving circuits can include a data driving circuit 120 and a gate driving circuit 130. The display device 100 can further include a controller 140 for controlling the data driving circuit 120 and the gate driving circuit 130.

The display panel 110 can include a substrate SUB and signal lines, such as a plurality of data lines DL and a plurality of gate lines GL disposed on the substrate SUB. The plurality of data lines DL and the plurality of gate lines GL can be connected to the plurality of subpixels SP, and can be disposed perpendicular to each other.

The display panel 110 can include a display area DA in which images are displayed and a non-display area NDA in which no image is displayed. In the display panel 110, a plurality of subpixels SP for displaying images can be disposed in the display area DA, and the driving circuits 120, 130, and 140 can be electrically connected or disposed in the non-display area NDA. Further, pad units for connection of integrated circuits or a printed circuit can be disposed in the non-display area NA. The non-display area NA can surround only a part of the display area DA, or the entire display area DA.

The data driving circuit 120 is a circuit for driving the plurality of data lines DL, and can supply data signals to the plurality of data lines DL.

The gate driving circuit 130 is a circuit for driving the plurality of gate lines GL, and can supply gate signals to the plurality of gate lines GL.

The controller 140 can supply a data control signal DCS to the data driving circuit 120 to control the operation timing of the data driving circuit 120 and can supply a gate control signal GCS to the gate driving circuit 130 to control the operation timing of the gate driving circuit 130.

The controller 140 can start scanning according to a timing implemented in each frame, convert input image data input from the outside into image data Data suited for the data signal format used in the data driving circuit 120, supply the image data Data to the data driving circuit 120, and control data driving at an appropriate time suited for scanning.

The controller 140 receives, from the outside (e.g., a host system 150), various timing signals including a vertical synchronization signal, a horizontal synchronization signal, a data enable signal, and a clock signal, along with the input image data.

To control the data driving circuit 120 and the gate driving circuit 130, the controller 140 receives timing signals, such as the vertical synchronization signal, horizontal synchronization signal, data enable signal, and clock signal, generates various control signals DCS and GCS, and outputs the control signals to the data driving circuit 120 and the gate driving circuit 130.

As an example, to control the gate driving circuit 130, the controller 140 outputs various gate control signals GCS including a gate start pulse, a gate shift clock, and a gate output enable signal.

To control the data driving circuit 120, the controller 140 outputs various data control signals DCS including, e.g., a source start pulse, a source sampling clock, and a source output enable signal.

The controller 140 can be implemented as a separate component from the data driving circuit 120, or the controller 140, along with the data driving circuit 120, can be implemented as an integrated circuit.

The data driving circuit 120 receives the image data Data from the controller 140 and supply data voltages to the plurality of data lines DL, thereby driving the plurality of data lines DL. The data driving circuit 120 is also referred to as a 'source driving circuit.'

The data driving circuit 120 can include one or more source driver integrated circuit SDIC.

Each source driver integrated circuit (SDIC) can include a shift register, a latch circuit, a digital-to-analog converter (DAC), and an output buffer. In some cases, each source driver integrated circuit (SDIC) can further include an analog-digital converter ADC.

For example, each source driver integrated circuit (SDIC) can be connected with the display panel 110 by a tape automated bonding (TAB) method or connected to a bonding pad of the display panel 110 by a chip on glass (COG) or chip on panel (COP) method or can be implemented by a chip on film (COF) method and connected with the display panel 110.

The gate driving circuit 130 can output a gate signal of a turn-on level voltage or a gate signal of a turn-off level voltage according to the control of the controller 140. The gate driving circuit 130 can sequentially drive the plurality of gate lines GL by sequentially supplying gate signals of the turn-on level voltage to the plurality of gate lines GL.

The gate driving circuit 130 can be connected with the display panel 110 by a TAB method or connected to a bonding pad of the display panel 110 by a COG or COP method or can be connected with the display panel 110 according to a COF method. Alternatively, the gate driving circuit 130 can be formed in a gate in panel (GIP) type, in the non-display area NDA of the display panel 110. The gate driving circuit 130 can be disposed on the substrate SUB or can be connected to the substrate SUB. In other words, the gate driving circuit 130 that is of a GIP type can be disposed in the non-display area NDA of the substrate SUB. The gate driving circuit 130 that is of a chip-on-glass (COG) type or chip-on-film (COF) type can be connected to the substrate SUB.

Meanwhile, at least one of the data driving circuit 120 and the gate driving circuit 130 can be disposed in the display area DA. For example, at least one of the data driving circuit 120 and the gate driving circuit 130 can be disposed not to overlap the subpixels SP or to overlap all or some of the subpixels SP.

When a selected gate line GL is driven by the gate driving circuit 130, the data driving circuit 120 can convert the image data Data received from the controller 140 into an analog data voltage and supply it to the plurality of data lines DL.

The data driving circuit 120 can be connected to one side (e.g., an upper or lower side) of the display panel 110. Depending on the driving scheme or the panel design scheme, data driving circuits 120 can be connected with both the sides (e.g., both the upper and lower sides) of the display panel 110, or two or more of the four sides of the display panel 110.

The gate driving circuit 130 can be connected to one side (e.g., a left or right side) of the display panel 110. Depending on the gate driving scheme and the panel design scheme, gate driving circuits 130 can be connected with both the sides (e.g., both the left and right sides) of the display panel 110, or two or more of the four sides of the display panel 110.

The controller 140 can be a timing controller used in typical display technology, a control device that can perform other control functions as well as the functions of the timing controller, or a control device other than the timing controller, or can be a circuit in the control device. The controller 140 can be implemented as various circuits or electronic components, such as an integrated circuit (IC), a field programmable gate array (FPGA), an application specific integrated circuit (ASIC), or a processor.

The controller 140 can be mounted on a printed circuit board or a flexible printed circuit and can be electrically connected with the data driving circuit 120 and the gate driving circuit 130 through the printed circuit board or the flexible printed circuit.

The controller 140 can transmit/receive signals to/from the data driving circuit 120 according to one or more predetermined interfaces. The interface can include, e.g., a low voltage differential signaling (LVDS) interface, an embedded clock point to point interface (EPI), and a serial peripheral interface (SPI).

The controller 140 can include a storage medium, such as one or more registers.

The display device 100 according to embodiments of the disclosure can be a display including a backlight unit, such as a liquid crystal display, or can be a self-emission display, such as an organic light emitting display device, a quantum dot display device, or an inorganic light emitting display device.

When the display device 100 according to embodiments of the disclosure is an organic light emitting display device, each subpixel SP can include an organic light emitting diode (OLED), which is self-emissive, as the light emitting element.

If the display device 100 according to embodiments of the disclosure is a quantum dot display device, each subpixel SP can include a light emitting element formed of a quantum dot, which is a self-emission semiconductor crystal.

If the display device 100 according to embodiments of the disclosure is an inorganic light emitting display device, each subpixel SP can include an inorganic light emitting element, which is self-emissive and formed of an inorganic material, as the light emitting element. For example, the inorganic light emitting element is also called a micro light emitting diode (LED), and the inorganic light emitting display device is also called a micro LED display device.

Figure 2:
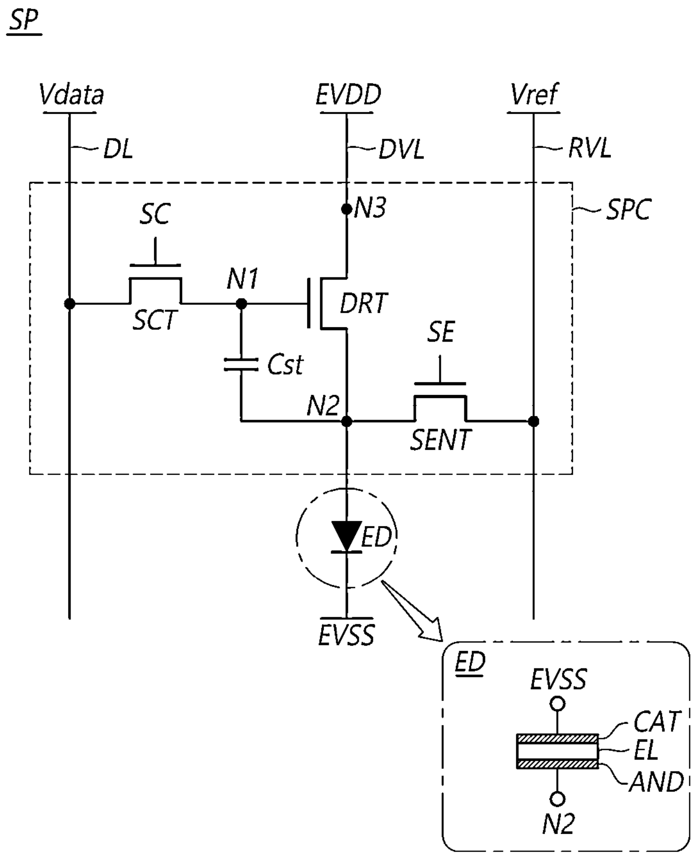
FIG. 2 illustrates an equivalent circuit diagram illustrating a subpixel in a display panel according to embodiments of the disclosure.

FIG. 2 illustrates an equivalent circuit diagram illustrating a subpixel in a display panel according to embodiments of the disclosure. Each subpixel of FIG. 1 can have the subpixel configuration of FIG. 2.

Referring to FIG. 2, each of the plurality of subpixels SP disposed on the display panel 110 according to embodiments of the disclosure can include a light emitting element ED and a subpixel circuit SPC for driving the light emitting element ED.

The subpixel circuit SPC of each subpixel SP can include a driving transistor DRT, a scan transistor SCT, a sensing transistor SENT, and a storage capacitor Cst. In this case, as the subpixel circuit SPC of each subpixel SP includes three transistors DRT, SCT, and SENT, and one capacitor Cst, it can be referred to as having a 3T (transistor) 1C (capacitor) structure.

The light emitting element ED can include an anode electrode AND and a cathode electrode CAT and can include a light emitting layer EL positioned between the anode electrode AND and the cathode electrode CAT.

One of the anode electrode AND and the cathode electrode CAT can be a pixel electrode connected to a transistor, such as the driving transistor DRT, and the other can be a common electrode to which the common voltage is applied. Here, the pixel electrode is an electrode disposed in each subpixel SP, and the common electrode is an electrode commonly disposed in all subpixels SP. For example, the common voltage can be a high-potential voltage EVDD which is a high-level common voltage or a low-potential voltage EVSS which is a low-level common voltage. Here, the high-potential voltage EVDD is also referred to as a driving voltage, and the low-potential voltage EVSS is also referred to as a base voltage.

According to the example shown in FIG. 2, the anode electrode AND can be a pixel electrode connected to a transistor, such as the driving transistor DRT, and the cathode electrode CAT can be a common electrode to which the low-potential voltage EVSS is applied.

For example, the light emitting element ED can be an organic light emitting diode OLED, an inorganic material-based light emitting diode LED, or a quantum dot light emitting element.

The driving transistor DRT is a transistor for driving the light emitting element ED, and can include a first node N1, a second node N2, and a third node N3.

The first node N1 of the driving transistor DRT can be a gate node of the driving transistor DRT, and can be electrically connected with a source node or a drain node of the scan transistor SCT. The second node N2 of the driving transistor DRT can be a source node or a drain node of the driving transistor DRT, and can be electrically connected with a source node or a drain node of the sensing transistor SENT and can also be electrically connected with the anode electrode AND of the light emitting element ED. The third node N3 of the driving transistor DRT can be electrically connected with a high-potential voltage line DVL supplying a high-potential voltage EVDD.

The scan transistor SCT can be controlled by a scan signal SC, which is a type of gate signal, and can be connected between the first node N1 of the driving transistor DRT and the data line DL. In other words, the scan transistor SCT can be turned on or off according to the scan signal SC supplied from the scan signal line SCL, which is a type of the gate line GL, controlling the connection between the data line DL and the first node N1 of the driving transistor DRT.

The scan transistor SCT can be turned on by the scan signal SC having a turn-on level voltage and transfer the data voltage Vdata supplied from the data line DL to the first node N1 of the driving transistor DRT.

If the scan transistor SCT is an n-type transistor, the turn-on level voltage of the scan signal SC can be a high level voltage. If the scan transistor SCT is a p-type transistor, the turn-on level voltage of the scan signal SC can be a low level voltage. Hereinafter, the scan transistor SCT is exemplified as an n-type transistor. Accordingly, the turn-on level voltage is exemplified as a high-level voltage.

The sensing transistor SENT can be controlled by a sensing signal SE, which is a type of gate signal, and can be connected between the second node N2 of the driving transistor DRT and the reference voltage line RVL. In other words, the sensing transistor SENT can be turned on or off according to the sensing signal SE supplied from the sensing signal line SENL, which is another type of the gate line GL, controlling the connection between the reference voltage line RVL and the second node N2 of the driving transistor DRT.

The sensing transistor SENT can be turned on by the sensing signal SE having a turn-on level voltage and transfer a reference voltage Vref supplied from the reference voltage line RVL to the second node N2 of the driving transistor DRT. Here, the sensing signal SE can be viewed as a second scan signal that is different from the scan signal SC.

The sensing transistor SENT can be turned on by the sensing signal SE having a turn-on level voltage, transferring the voltage of the second node N2 of the driving transistor DRT to the reference voltage line RVL.

If the sensing transistor SENT is an n-type transistor, the turn-on level voltage of the sensing signal SE can be a high level voltage. If the sensing transistor SENT is a p-type transistor, the turn-on level voltage of the sensing signal SE can be a low level voltage. Hereinafter, the sensing transistor SENT is exemplified as an n-type transistor. Accordingly, the turn-on level voltage is exemplified as a high-level voltage.

The function in which the sensing transistor SENT transfers the voltage of the second node N2 of the driving transistor DRT to the reference voltage line RVL can be used upon driving to sense the characteristic value of the subpixel SP. In this case, the voltage transferred to the reference voltage line RVL can be a voltage for calculating the characteristic value of the subpixel SP or a voltage reflecting the characteristic value of the subpixel SP.

In the disclosure, the characteristic value of the subpixel SP can be a characteristic value of the driving transistor DRT or the light emitting element ED. For example, the characteristic value of the driving transistor DRT can include a threshold voltage and mobility of the driving transistor DRT. The characteristic value of the light emitting element ED can include a threshold voltage of the light emitting element ED.

The storage capacitor Cst can be connected between the first node N1 and second node N2 of the driving transistor DRT. The storage capacitor Cst can be charged with the quantity of electric charge corresponding to the voltage difference between both ends thereof and can serve to maintain the voltage difference between both ends for a predetermined frame time. Accordingly, during the predetermined frame time, the corresponding subpixel SP can emit light.

Each of the driving transistor DRT, the scan transistor SCT, and the sensing transistor SENT can be an n-type transistor or a p-type transistor. In the disclosure, for convenience of description, each of the driving transistor DRT, the scan transistor SCT, and the sensing transistor SENT is an n-type transistor.

The storage capacitor Cst is not a parasitic capacitor (e.g., Cgs or Cgd) which is an internal capacitor existing between the gate node and the source node (or drain node) of the driving transistor DRT, but can be an external capacitor intentionally designed outside the driving transistor DRT.

The subpixel SP illustrated in FIG. 2 is merely an example, and various changes can be made thereto, e.g., such as further including one or more transistors or one or more capacitors.

Figure 3A:
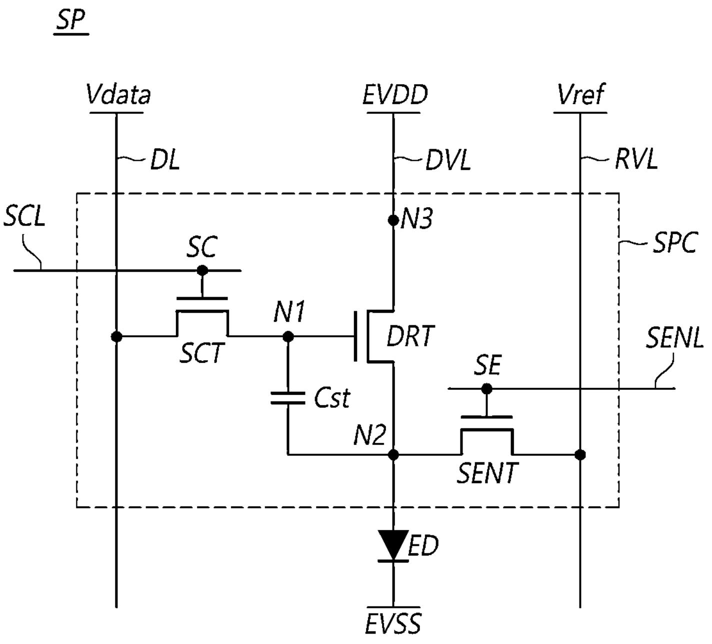
FIGS. 3A and 3B illustrate an equivalent circuit of a subpixel having a 2-gate driven structure and an equivalent circuit of a subpixel having a 1-gate driven structure in a display panel according to embodiments of the disclosure.
Figure 3B:
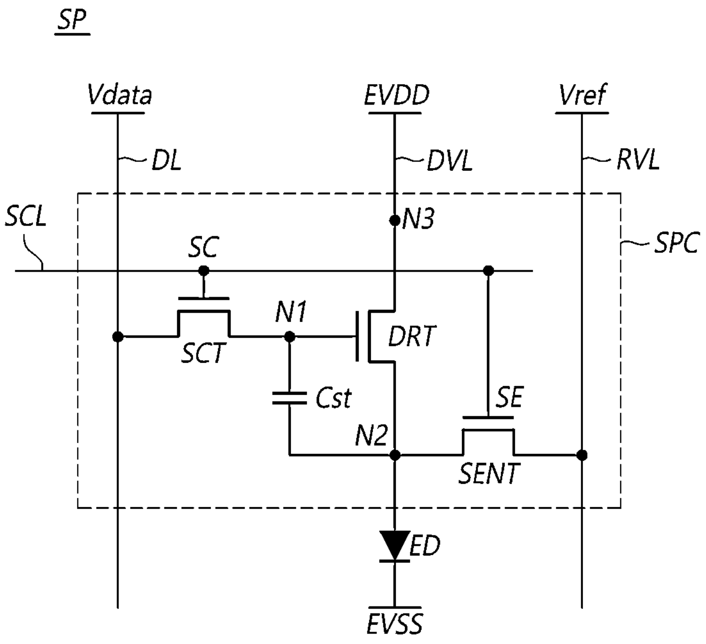

FIGS. 3A and 3B illustrate an equivalent circuit of a subpixel having a 2-gate driven structure and an equivalent circuit of a subpixel having a 1-gate driven structure in a display panel according to embodiments of the disclosure.

The subpixel circuit SPC of the subpixel SP of FIG. 3A and the subpixel circuit SPC of the subpixel SP of FIG. 3B have the same 3T1C structure as that of FIG. 2.

The subpixel SP of FIG. 3A and the subpixel SP of FIG. 3B can have different gate driven structures. The subpixel SP of FIG. 3A can have a 2-gate driven structure. The subpixel SP of FIG. 3B can have a 1-gate driven structure.

Referring to FIG. 3A, when the subpixel SP has a 2-gate driven structure, the subpixel SP can be connected to two gate lines GL including the scan signal line SCL and the sensing signal line SENL.

In the subpixel circuit SPC of the subpixel SP having the 2-gate driven structure, the gate node of the scan transistor SCT can be connected to the scan signal line SCL, and the gate node of the sensing transistor SENT can be connected to the sensing signal line SENL. Accordingly, the scan transistor SCT and sensing transistor SENT can operate independently of each other.

The subpixel circuit SPC of the subpixel SP having 2-gate driven structure can receive the scan signal SC through the scan signal line SCL and receive the scan signal SC through the sensing signal line SENL. In the subpixel circuit SPC of the subpixel SP having the 2-gate driven structure, the gate node of the scan transistor SCT can receive the scan signal SC through the scan signal line SCL, and the gate node of the sensing transistor SENT can receive the sensing signal SE through the sensing signal line SENL.

When the subpixel SP has the 2-gate driven structure, the on-off timings of the scan transistor SCT and the on-off timings of the sensing transistor SENT in one subpixel SP can be independent. In other words, when the subpixel SP has the 2-gate driven structure, the on-off timings of the scan transistor SCT and the on-off timings of the sensing transistor SENT in one subpixel SP can be different or identical.

Referring to FIG. 3B, when the subpixel SP has a 1-gate driven structure, the subpixel SP can be connected to the scan signal line SCL corresponding to one gate line GL.

In the subpixel circuit SPC of the subpixel SP having the 1-gate driven structure, the gate node of the scan transistor SCT and the gate node of the sensing transistor SENT both can be commonly connected to one scan signal line SCL. Accordingly, the scan transistor SCT and sensing transistor SENT can operate together.

In the subpixel circuit SPC of the subpixel SP having the 1-gate driven structure, the gate node of the scan transistor SCT and the gate node of the sensing transistor SENT both can receive the scan signal SC through one scan signal line SCL.

In the subpixel circuit SPC of the subpixel SP having the 1-gate driven structure, the scan signal SC supplied to the gate node of the sensing transistor SENT serves as the sensing signal SE.

When the subpixel SP has the 2-gate driven structure, the on-off timings of the scan transistor SCT and the on-off timings of the sensing transistor SENT in one subpixel SP can be the same.

Figure 4:
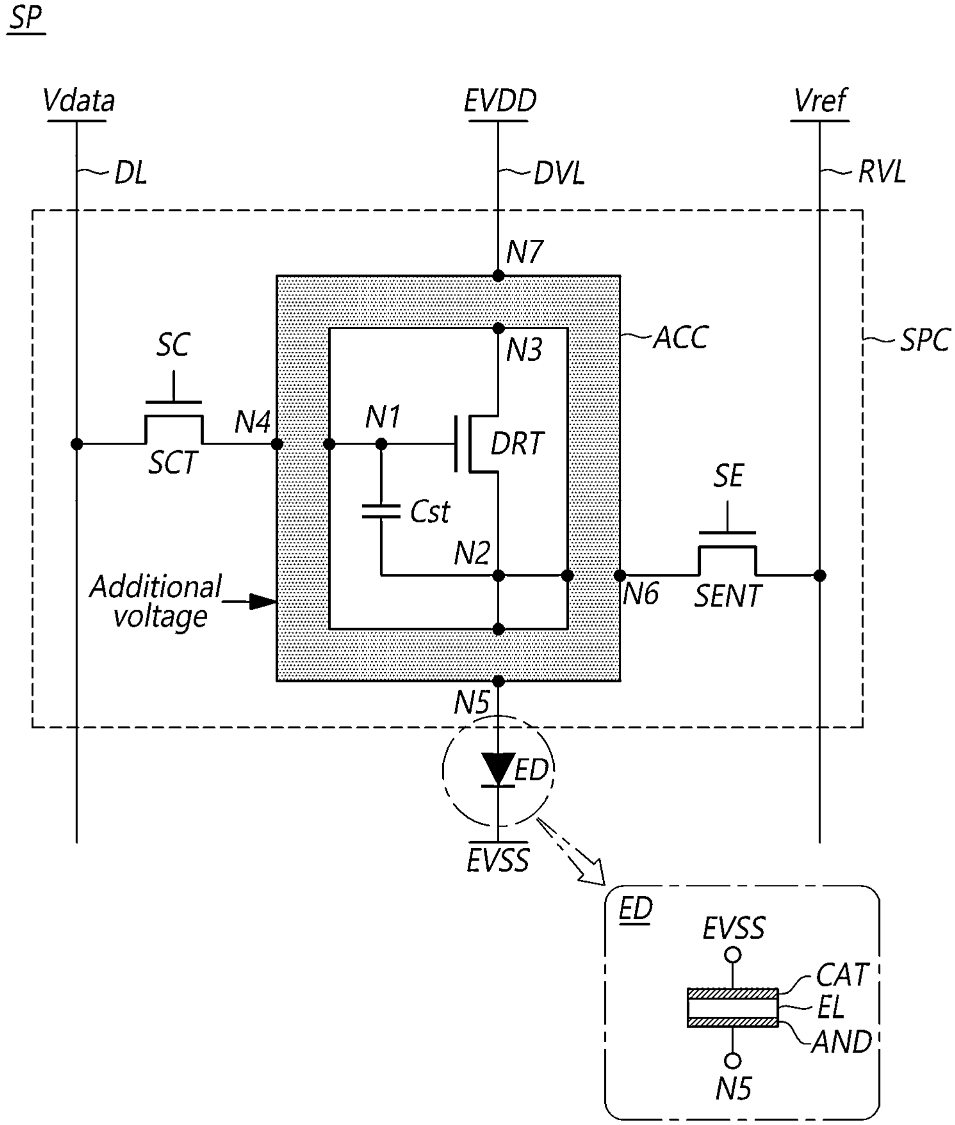
FIG. 4 illustrates another equivalent circuit diagram illustrating a subpixel in a display panel according to embodiments of the disclosure.

FIG. 4 illustrates another equivalent circuit diagram illustrating a subpixel in a display panel according to embodiments of the disclosure.

Referring to FIG. 4, the subpixel SP can include a light emitting element ED and a subpixel circuit SPC for driving the light emitting element ED. The subpixel circuit SPC can include an additional control circuit ACC in addition to a driving transistor DRT, a scan transistor SCT, a sensing transistor SENT, a storage capacitor Cst.

The additional control circuit ACC can include one or more transistors and/or one or more capacitors.

The additional control circuit ACC can include a fourth node N4 electrically connected to the source node or the drain node of the scan transistor SCT, a fifth node N5 electrically connected to the anode electrode AND of the light emitting element ED, a sixth node N6 electrically connected to the source node or the drain node of the sensing transistor SENT, and a seventh node N7 electrically connected to the high-potential voltage line DVL.

The additional control circuit ACC can be supplied with additional voltage, if required.

When the fourth node N4 and the first node N1 are electrically connected, the fifth node N5, the sixth node N6, and the second node N2 are electrically connected, and the seventh node N7 and the third node N3 are electrically connected by the additional control circuit ACC, the subpixel SP of FIG. 4 can be the same as the subpixel SP of FIG. 2.

For example, the additional control circuit ACC can include an emission control transistor that controls connection between the second node N2 and the fifth node N5. As another example, the additional control circuit ACC can include an emission control transistor that controls the connection between the seventh node N7 and the third node N3.

Figure 5:
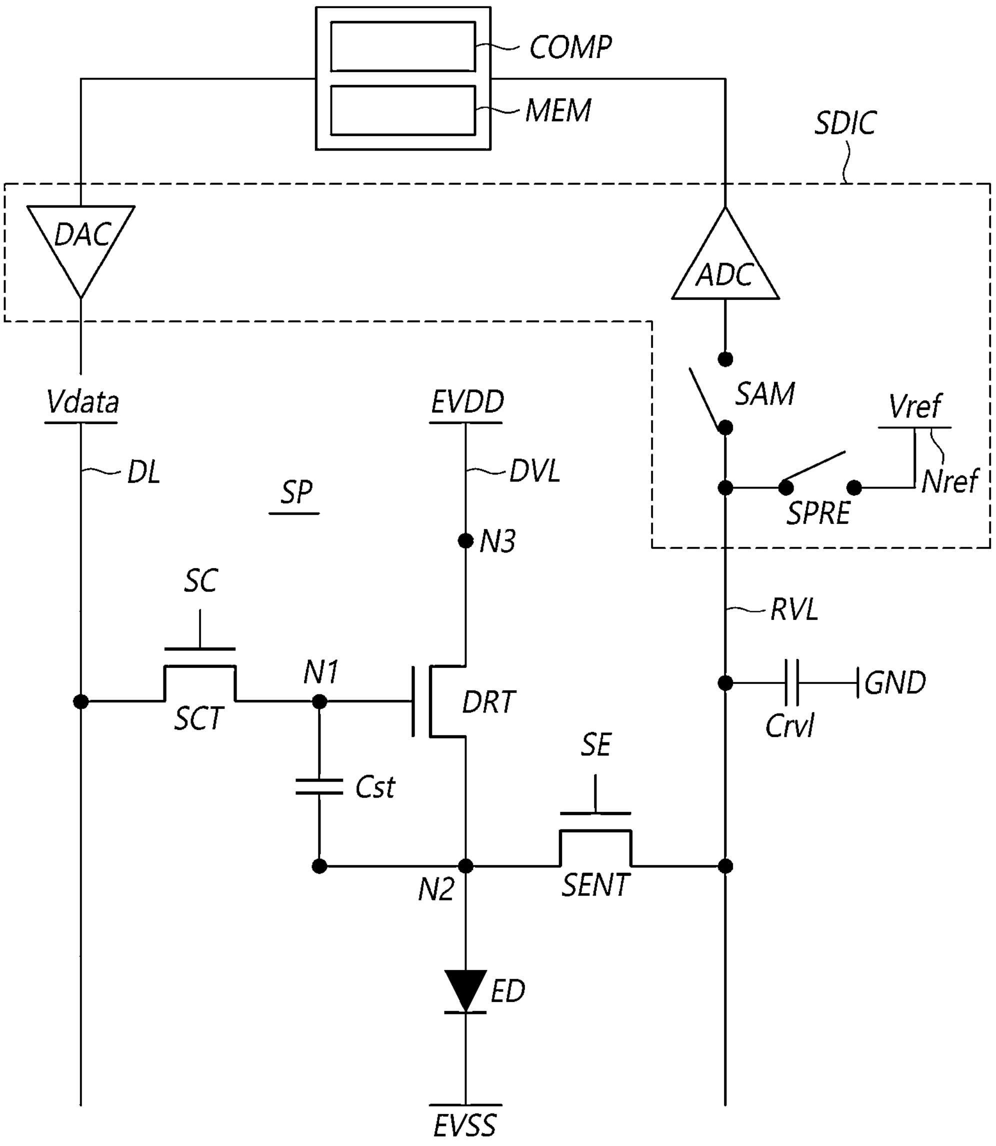
FIG. 5 is a view illustrating a compensation circuit of a display device according to embodiments of the disclosure.

FIG. 5 is a view illustrating a compensation circuit of a display device according to embodiments of the disclosure. The subpixel SP of FIG. 5 takes the subpixel SP of FIG. 2 as an example.

Referring to FIG. 5, the compensation circuit is a circuit capable of sensing and compensation processing on characteristic values of circuit elements in the subpixel SP. Here, the circuit element can mean, e.g., a light emitting element ED or a driving transistor DRT.

The compensation circuit can include a power switch SPRE, a sampling switch SAM, an analog-to-digital converter ADC, a compensator COMP, and a memory MEM. The compensation circuit can further include a subpixel SP.

The power switch SPRE can control the connection between the reference voltage line RVL and the reference voltage supply node Nref. The reference voltage Vref output from the power supply can be supplied to the reference voltage supply node Nref, and the reference voltage Vref supplied to the reference voltage supply node Nref can be applied to the reference voltage line RVL through the power switch SPRE.

The sampling switch SAM can control a connection between the analog-to-digital converter ADC and the reference voltage line RVL. If connected to the reference voltage line RVL by the sampling switch SAM, the analog-to-digital converter ADC can convert the voltage (analog voltage) of the connected reference voltage line RVL into a sensing value corresponding to a digital value.

According to the driving of the subpixel SP, a line capacitor Crvl can be formed between the reference voltage line RLV and the ground GND. The voltage of the reference voltage line RVL can correspond to the charge amount of the line capacitor Crvl.

The analog-to-digital converter ADC can provide sensing data including a sensing value to the compensator COMP.

The compensator COMP can figure out characteristic values of the circuit elements (e.g., the light emitting element ED, the driving transistor DRT, etc.) included in the corresponding subpixel SP based on the sensing data supplied from the analog-to-digital converter ADC, calculate a compensation value for reducing a deviation in characteristic value between the circuit elements based on the characteristic values, and store the calculated compensation value in the memory MEM.

For example, the compensation value is information calculated for reducing a deviation in characteristic value between the light emitting elements ED or a deviation in characteristic value between the driving transistors DRT and can include an offset and a gain value for data change.

The controller 140 can change the image data using the compensation value stored in the memory MEM and can supply the changed image data to the data driving circuit 120.

The data driving circuit 120 can convert the changed image data into a data voltage Vdata corresponding to the analog voltage using the digital-to-analog converter DAC and output the data voltage Vdata. Accordingly, compensation can be realized.

The analog-to-digital converter ADC, the power switch SPRE, and the sampling switch SAM can be included in the source driver integrated circuit SDIC. Here, the source driver integrated circuit SDIC can be an integrated circuit that constitutes the data driving circuit 120 and can include a digital-to-analog converter DAC.

The compensator COMP can be included in the controller 140.

As described above, the display device 100 according to embodiments of the disclosure can perform compensation processing to reduce a deviation in characteristic value between the driving transistors DRT. To perform compensation processing, the display device 100 can perform sensing driving to detect the deviation in characteristic value between the driving transistors DRT.

The display device 100 according to embodiments of the disclosure can perform sensing driving in two sensing modes (first sensing mode and second sensing mode). Sensing driving in the two sensing modes (first sensing mode and second sensing mode) is described below with reference to FIGS. 6A and 6B.

Figure 6A:
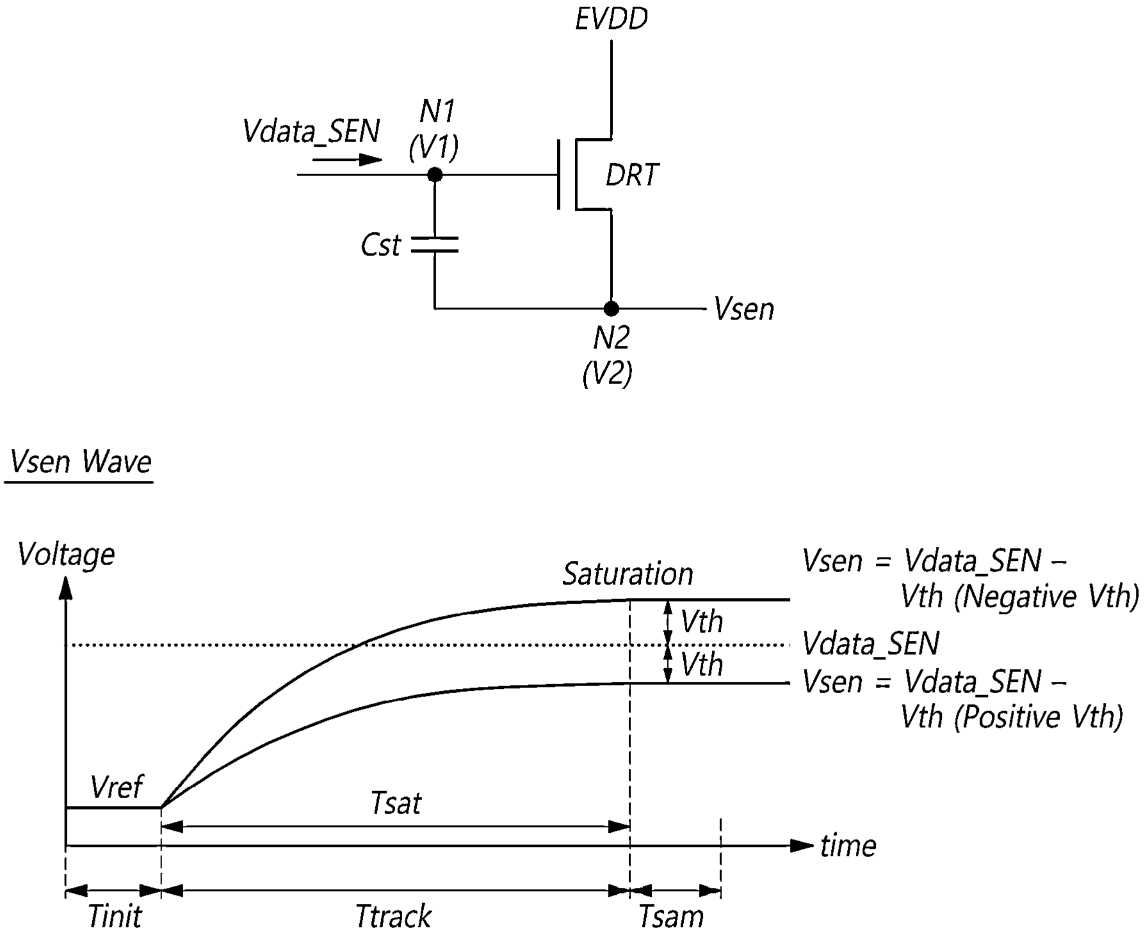
FIGS. 6A and 6B are diagrams illustrating a first sensing mode and a second sensing mode of a display device according to embodiments of the disclosure.
Figure 6B:
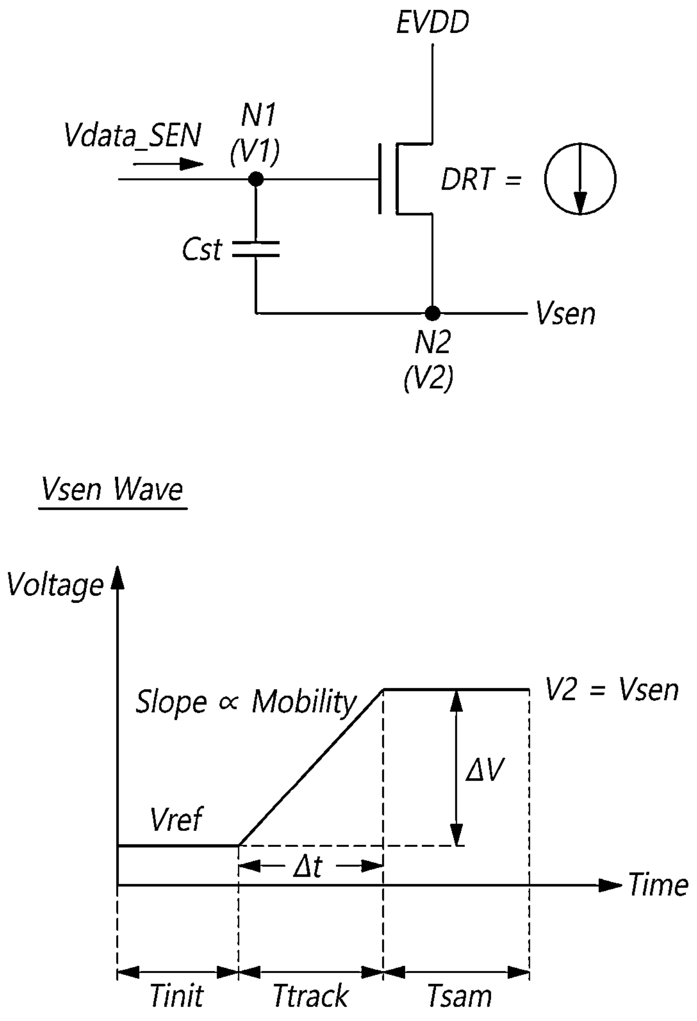

FIGS. 6A and 6B are diagrams illustrating a first sensing mode and a second sensing mode of a display device 100 according to embodiments of the disclosure.

Referring to FIG. 6A, a “first sensing mode” is a sensing mode for sensing the threshold voltage requiring a relatively long sensing time among the characteristic values (e.g., threshold voltage and mobility) of the driving transistor DRT. The first sensing mode can also be referred to as a “slow sensing mode” or a “threshold voltage sensing mode”.

Referring to FIG. 6B, a “second sensing mode” is a sensing mode for sensing the mobility requiring a relatively short sensing time among the characteristic values (e.g., threshold voltage and mobility) of the driving transistor DRT. The second sensing mode can also be referred to as a "fast sensing mode" or a "mobility sensing mode".

Sensing driving in the first sensing mode and sensing driving in the second sensing mode are described below.

First, referring to FIG. 6A, sensing driving in the first sensing mode is described.

The sensing driving period in the first sensing mode can include an initialization period Tinit, a tracking period Ttrack, and a sampling period Tsam.

The initialization period Tinit of the sensing driving period of the first sensing mode is a period for initializing the first node N1 and the second node N2 of the driving transistor DRT.

During the initialization period Tinit, the voltage V1 of the first node N1 of the driving transistor DRT can be initialized as a sensing driving data voltage Vdata_SEN, and the voltage V2 of the second node N2 of the driving transistor DRT can be initialized as a sensing driving reference voltage Vref.

During the initialization period Tinit, the scan transistor SCT and the sensing transistor SENT can be turned on, and the power switch SPRE can be turned on.

The tracking period Ttrack of the sensing driving period of the first sensing mode is a period for tracking the voltage V2 of the second node N2 of the driving transistor DRT reflecting the threshold voltage Vth of the driving transistor DRT or a change therein.

During the tracking period Ttrack, the power switch SPRE can be turned off, or the sensing transistor SENT can be turned off.

Accordingly, during the tracking period Ttrack, the first node N1 of the driving transistor DRT is in a constant voltage state of having the sensing driving data voltage Vdata_SEN, but the second node N2 of the driving transistor DRT can be in an electrically floating state. Accordingly, during the tracking period Ttrack, the voltage V2 of the second node N2 of the driving transistor DRT can be varied.

During the tracking period Ttrack, the voltage V2 of the second node N2 of the driving transistor DRT can increase until the voltage V2 of the second node N2 of the driving transistor DRT reflects the threshold voltage Vth of the driving transistor DRT.

During the initialization period Tinit, the voltage difference between the first node N1 and second node N2 of the initialized driving transistor DRT can be the threshold voltage Vth of the driving transistor DRT or more. Accordingly, when the tracking period Ttrack starts, the driving transistor DRT is in a turn-on state and conducts current. Accordingly, if the tracking period Ttrack starts, the voltage V2 of the second node N2 of the driving transistor DRT can increase.

During the tracking period Ttrack, the voltage V2 of the second node N2 of the driving transistor DRT does not steadily increase.

To the end of the tracking period Ttrack, the width at which the voltage of the second node N2 of the driving transistor DRT increase can be reduced and, resultantly, the voltage V2 of the second node N2 of the driving transistor DRT can be saturated.

The saturated voltage V2 of the second node N2 of the driving transistor DRT can correspond to the difference Vdata_SEN-Vth between the data voltage Vdata_SEN and the threshold voltage Vth or the difference Vdata_SEN-ΔVth between the data voltage Vdata_SEN and the threshold voltage deviation ΔVth. Here, the threshold voltage Vth can be a negative threshold voltage (Negative Vth) or a positive threshold voltage (Positive Vth).

If the voltage V2 of the second node N2 of the driving transistor DRT is saturated, the sampling period Tsam can be started.

The sampling period Tsam of the sensing driving period of the first sensing mode is a period for measuring the voltage (Vdata_SEN-Vth, Vdata_SEN-ΔVth) reflecting the threshold voltage Vth of the driving transistor DRT or a change therein.

The sampling period Tsam of the sensing driving period of the first sensing mode is a step in which the analog-to-digital converter ADC senses the voltage of the reference voltage line RVL. The voltage of the reference voltage line RVL can correspond to the voltage V2 of the second node N2 of the driving transistor DRT and correspond to the charged voltage of the line capacitor Crvl formed in the reference voltage line RVL.

During the sampling period Tsam, the voltage Vsen sensed by the analog-to-digital converter ADC is the voltage Vdata_SEN-Vth which is the data voltage Vdata_SEN minus the threshold voltage Vth or the voltage Vdata_SEN-ΔVth which is the data voltage Vdata_SEN minus the threshold voltage deviation ΔVth. Here, Vth can be a positive threshold voltage or a negative threshold voltage.

During the tracking period Ttrack of the sensing driving period of the first sensing mode, the saturation time Tsat taken for the voltage V2 of the second node N2 of the driving transistor DRT to be increased and saturated can be a temporal length of the tracking period Ttrack of the sensing driving period of the first sensing mode and can be a time taken for the threshold voltage Vth of the driving transistor DRT or a change therein to be reflected to the voltage V2 (V2=Vdata_SEN-Vth) of the second node N2 of the driving transistor DRT.

The saturation time Tsat can occupy most of the overall temporal length of the sensing driving period of the first sensing mode. In the first sensing mode, it can take a quite long time (saturation time: Tsat) for the voltage V2 of the second node N2 of the driving transistor DRT to be increased and saturated.

As described above, the sensing driving scheme for sensing the threshold voltage of the driving transistor DRT requires a long saturation time Tsat until the voltage state of the second node N2 of the driving transistor DRT indicates the threshold voltage of the driving transistor DRT and is thus referred to as a slow mode (first sensing mode).

Next, referring to FIG. 6B, a sensing driving period in the second sensing mode is described.

The sensing driving period in the second sensing mode can include an initialization period Tinit, a tracking period Ttrack, and a sampling period Tsam.

The initialization period Tinit of the sensing driving period of the second sensing mode is a period for initializing the first node N1 and the second node N2 of the driving transistor DRT.

During the initialization period Tinit, the scan transistor SCT and the sensing transistor SENT can be turned on, and the power switch SPRE can be turned on.

During the initialization period Tinit, the voltage V1 of the first node N1 of the driving transistor DRT can be initialized as a sensing driving data voltage Vdata_SEN, and the voltage V2 of the second node N2 of the driving transistor DRT can be initialized as a sensing driving reference voltage Vref.

The tracking period Ttrack of the sensing driving period of the second sensing mode is a period during which the voltage V2 of the second node N2 of the driving transistor DRT is changed during a preset tracking time Δt until the voltage V2 of the second node N2 of the driving transistor DRT becomes a voltage state of reflecting the mobility of the driving transistor DRT or a change in mobility.

During the tracking period Ttrack, the preset tracking time Δt can be set to be short. Accordingly, during the short tracking time Δt, it is hard for the voltage V2 of the second node N2 of the driving transistor DRT to reflect the threshold voltage Vth. However, during the short tracking time Δt, the voltage V2 of the second node N2 of the driving transistor DRT can be changed in such an extent as to be able to figure out the mobility of the driving transistor DRT.

Accordingly, the second sensing mode is a sensing driving scheme for sensing the mobility of the driving transistor DRT.

In the tracking period Ttrack, as the power switch SPRE is turned off or the sensing transistor SENT is turned off, the second node N2 of the driving transistor DRT can become an electrically floating state.

During the tracking period Ttrack, by the scan signal SC of the turn-off level voltage, the scan transistor SCT can be in a turned-off state, and the first node N1 of the driving transistor DRT can be in a floating state.

During the initialization period Tinit, the voltage difference between the first node N1 and second node N2 of the initialized driving transistor DRT can be the threshold voltage Vth of the driving transistor DRT or more. Accordingly, when the tracking period Ttrack starts, the driving transistor DRT is in a turn-on state and conducts current.

If the first node N1 and second node N2 of the driving transistor DRT are the gate node and source node, respectively, the voltage difference between the first node N1 and second node N2 of the driving transistor DRT becomes Vgs.

Accordingly, during the tracking period Ttrack, the voltage V2 of the second node N2 of the driving transistor DRT can be increased. In this case, the voltage V1 of the first node N1 of the driving transistor DRT can also be increased.

During the tracking period Ttrack, the increasing rate of the voltage V2 of the second node N2 of the driving transistor DRT is varied depending on the current capability (i.e., mobility) of the driving transistor DRT. As the current capability (mobility) of the driving transistor DRT increases, the voltage V2 of the second node N2 of the driving transistor DRT can be further sharply increased.

After the tracking period Ttrack proceeds the preset tracking time Δt, i.e., after the voltage V2 of the second node N2 of the driving transistor DRT rises during the preset tracking time Δt, the sampling period Tsam can proceed.

During the tracking period Ttrack, the increasing rate of the voltage V2 of the second node N2 of the driving transistor DRT corresponds to the voltage variation ΔV of the second node N2 of the driving transistor DRT during the preset tracking time Δt. The voltage variation Δt of the second node N2 of the driving transistor DRT can correspond to the voltage variation of the reference voltage line RVL.

After the tracking period Ttrack proceeds the preset tracking time Δt, the sampling period Tsam can begin. During the sampling period Tsam, the sampling switch SAM can be turned on, so that the reference voltage line RVL and the analog-to-digital converter ADC can be electrically connected with each other.

The analog-to-digital converter ADC can sense the voltage of the reference voltage line RVL. The voltage Vsen sensed by the analog-to-digital converter ADC can be the voltage Vref+ΔV which is the reference voltage Vref plus an increment during the preset tracking time Δt, i.e., the voltage variation Δt.

The voltage Vsen sensed by the analog-to-digital converter ADC can be the voltage of the reference voltage line RVL and can be the voltage of the second node N2 electrically connected with the reference voltage line RVL through the sensing transistor SENT.

In the sampling period Tsam of the sensing driving period of the second sensing mode, the voltage Vsen sensed by the analog-to-digital converter ADC can be varied depending on the mobility of the driving transistor DRT. As the mobility of the driving transistor DRT increases, the sensing voltage Vsen increases. As the mobility of the driving transistor DRT decreases, the sensing voltage Vsen decreases.

As described above, the sensing driving scheme for sensing the mobility of the driving transistor DRT can change the voltage of the second node N2 of the driving transistor DRT only for a short time Δt and is thus called a fast mode (second sensing mode).

Referring to FIG. 6A, the compensator COMP can figure out the threshold voltage Vth of the driving transistor DRT, or a change therein, in the corresponding subpixel SP based on sensing data corresponding to the voltage Vsen sensed through the first sensing mode, calculate the threshold voltage compensation value of reducing or removing the threshold voltage deviation between the driving transistors DRT, and store the calculated threshold voltage compensation value in the memory MEM.

Referring to FIG. 6B, the compensator COMP can figure out the mobility of the driving transistor DRT, or a change therein, in the corresponding subpixel SP based on sensing data corresponding to the voltage Vsen sensed through the second sensing mode, calculate the mobility compensation value of reducing or removing the mobility deviation between the driving transistors DRT, and store the calculated mobility compensation value in the memory MEM.

The controller 140 can change the data based on the threshold voltage compensation value Φ and the mobility compensation value α stored in the memory MEM, and supply the changed data (Data'=α×Data+Φ) to the data driving circuit 120.

The data driving circuit 120 can convert the data (Data'=α×Data+Φ) supplied from the controller 140 into the data voltage Vdata and supply the converted data to the corresponding subpixel SP. Here, the data voltage Vdata supplied to the corresponding subpixel SP can be a data voltage Vata capable of reducing the threshold voltage deviation and the mobility deviation.

Meanwhile, as described above, since a long sensing time is required for threshold voltage sensing and a short sensing time is sufficient for mobility sensing, threshold voltage sensing can be performed in the first sensing mode corresponding to a slow sensing mode, and mobility sensing can be performed in the second sensing mode corresponding to a fast sensing mode.

Figure 7:
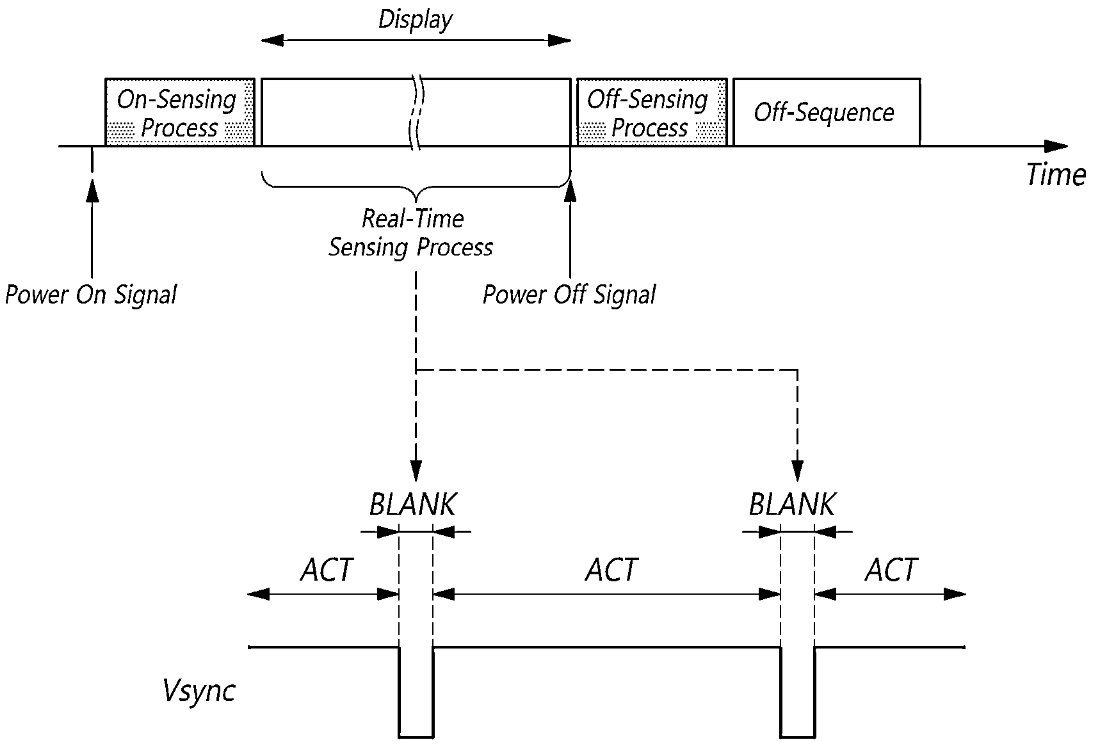
FIG. 7 is a view illustrating various sensing driving timings of a display device according to embodiments of the disclosure.

FIG. 7 is a diagram illustrating various sensing driving timings (various sensing periods) of a display device according to embodiments of the disclosure.

Referring to FIG. 7, the display device 100 according to embodiments of the disclosure can sense the characteristic value of the driving transistor DRT in each subpixel SP disposed in the display panel 110 if a power on signal is generated. Such sensing process is referred to as an on-sensing process.

The display device 100 according to embodiments of the disclosure can sense the characteristic value of the driving transistor DRT in each subpixel SP disposed in the display panel 110 before an off sequence, such as power off, proceeds if a power off signal is generated. Such sensing process is referred to as an off-sensing process.

The display device 100 according to embodiments of the disclosure can sense the characteristic value of the driving transistor DRT in each subpixel SP during display driving until before a power off signal is generated after a power on signal is generated. Such sensing process is referred to as a "real-time sensing process."

Such real-time (RT) sensing process can be performed every blank time BLANK between the active times ACT with respect to the vertical sync signal Vsync.

Since a short time is sufficient for the mobility sensing of the driving transistor DRT, the mobility sensing can proceed in the second sensing mode corresponding to a fast sensing mode of the two sensing modes.

Since a short time is sufficient for mobility sensing, mobility sensing can proceed in any one of the on-sensing process, off-sensing process, and real-time sensing process. For example, the mobility sensing which can proceed in the second sensing mode can proceed in the real-time sensing process that can reflect changes in mobility in real-time during display driving. In other words, the mobility sensing can proceed every blank period BLANK during display driving.

Threshold voltage sensing of the driving transistor DRT needs a long sensing time including a long saturation time Vsat. Accordingly, threshold voltage sensing can be performed in the first sensing mode corresponding to the slow sensing mode of the two sensing modes.

The threshold voltage sensing has a long sensing time and thus should be performed using a timing when the user's viewing is not disturbed. Accordingly, the threshold voltage sensing of the driving transistor DRT can proceed while display driving is not done (i.e., the circumstance where the user does not intend to view) after a power off signal is generated according to, e.g., a user input. In other words, the threshold voltage sensing can proceed in the off-sensing process.

Figure 8:
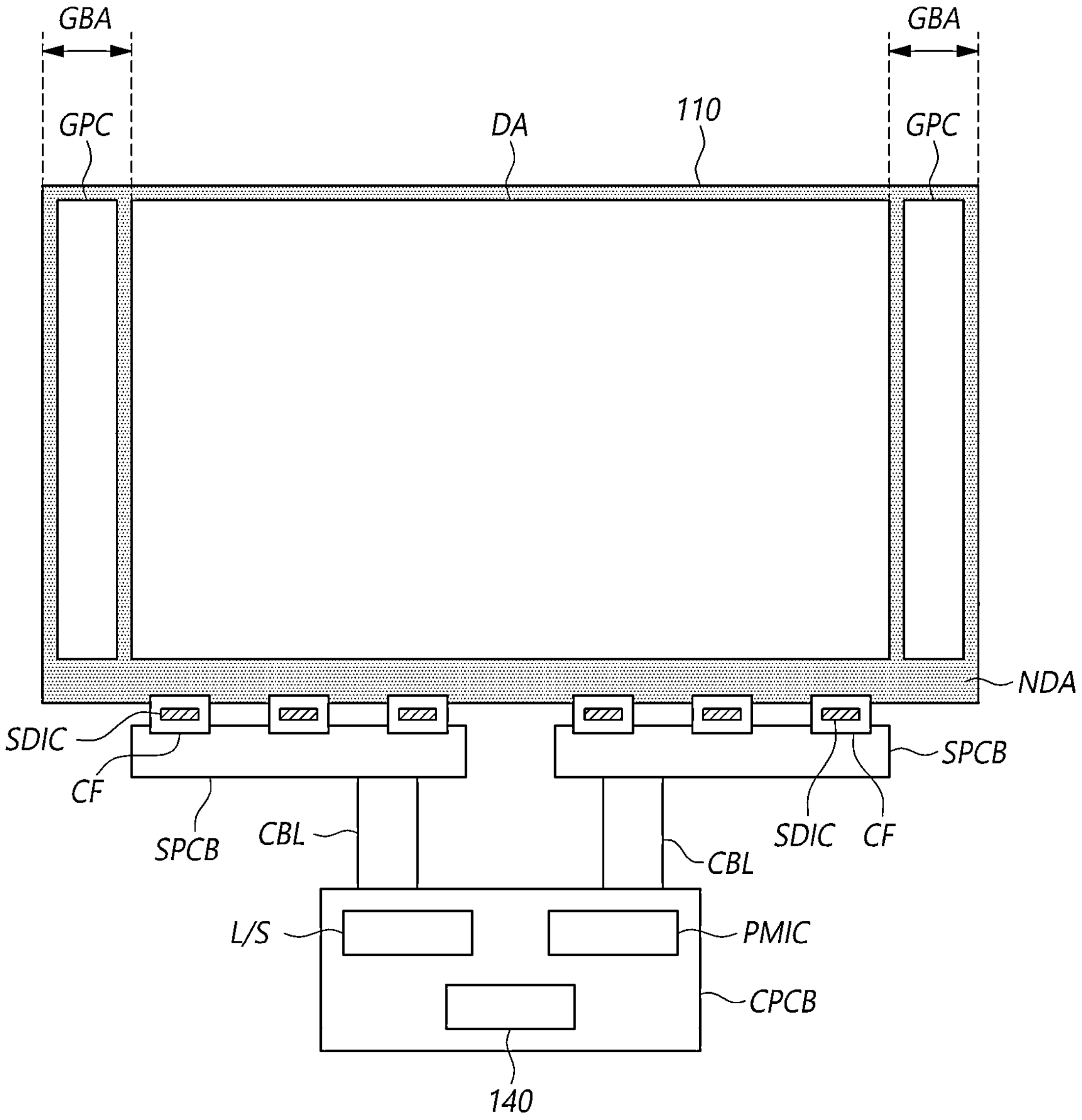
FIG. 8 is a view illustrating an example system implementation of a display device according to embodiments of the disclosure.

FIG. 8 is a view illustrating an example system implementation of a display device according to embodiments of the disclosure.

Referring to FIG. 8, the display panel 110 can include a display area DA in which images are displayed and a non-display area NDA in which no image is displayed.

According to the implementation example of FIG. 8, the data driving circuit 120 can include a plurality of source driver integrated circuits SDIC and can be implemented in a chip on film (COF) method. Each of the plurality of source driver integrated circuits SDIC can be mounted on the circuit film CF connected to the non-display area NDA of the display panel 110. Here, the circuit film CF is also referred to as a flexible printed circuit.

According to the implementation example of FIG. 8, the gate driving circuit 130 can be implemented in a gate in panel (GIP) type. Hereinafter, the gate driving circuit 130 implemented in the GIP type is also referred to as a "gate driving panel circuit GPC".

The gate driving panel circuit GPC can be formed in the non-display area NDA of the display panel 110. According to the implementation example of FIG. 8, the gate driving panel circuit GPC can be disposed in both the non-display area NDA positioned outside one side of the display area DA and the non-display area NDA positioned outside the other side of the display area DA.

The display device 100 can include at least one source printed circuit board SPCB for a circuit connection between the plurality of source driver integrated circuits SDIC and the other devices (e.g., 140, L/S, PMIC, etc.), and a control printed circuit board CPCB for mounting control components and various electric devices.

The circuit film CF on which the source driver integrated circuit SDIC is mounted can be connected to at least one source printed circuit board SPCB. In other words, one side of the source driver integrated circuit SDIC-mounted circuit film CF can be electrically connected with the display panel 110, and the opposite side thereof can be electrically connected with the source printed circuit board SPCB.

The controller 140, the power management integrated circuit PMIC, and the like can be mounted on the control printed circuit board CPCB.

The controller 140 can perform an overall control function related to driving of the display panel 110, and can control operations of the plurality of source driver integrated circuits SDIC and the gate driving panel circuit GPC.

The power management integrated circuit PMIC can supply various voltages or currents to the plurality of source driver integrated circuits SDIC, gate driving panel circuit GPC, or the like, or can control various voltages or currents to be supplied.

At least one source printed circuit board SPCB and the control printed circuit board CPCB can be circuit-connected through at least one connection cable CBL. Here, the connection cable CBL can be, e.g., either a flexible printed circuit (FPC) or a flexible flat cable (FFC).

The at least one source printed circuit board SPCB and control printed circuit board CPCB can be integrated into a single printed circuit board.

The display device 100 according to embodiments of the disclosure can further include a level shifter L/S for adjusting the voltage level of signal. For example, the level shifter L/S can be disposed on a control printed circuit board CPCB or a source printed circuit board SPCB.

In the display device 100 according to embodiments of the disclosure, the level shifter L/S can output signals required for gate driving to the gate driving panel circuit GPC which is the GIP-type gate driving circuit 130.

For example, the power management integrated circuit PMIC can output a signal to the level shifter L/S. The level shifter L/S can adjust the voltage level of the signal input from the power management integrated circuit PMIC. The signal of which the voltage level is adjusted by the level shifter L/S can be input to the gate driving panel circuit GPC.

For example, the level shifter L/S can output a plurality of clock signals having different phases to the gate driving panel circuit GPC. The gate driving panel circuit GPC can generate a plurality of gate signals (e.g., the scan signal SC, the sensing signal SE, etc.) based on the plurality of clock signals input from the level shifter L/S and output the generated plurality of gate signals to a plurality of gate lines (e.g., the scan signal line SCL, the sensing signal line SENL, etc.).

Referring to FIG. 8, the non-display area NDA of the display panel 110 can include a gate bezel area GBA. The gate bezel area GBA can refer to an area in which the gate driving panel circuit GPC, which is the GIP-type gate driving circuit 130, and various lines connected to the gate driving panel circuit GPC are disposed.

Various lines connected to the gate driving panel circuit GPC can include a plurality of clock lines, a high-level gate voltage line, and a low-level gate voltage line.

Described below is the structure of the gate driving panel circuit GPC and the gate bezel area GBA in which the gate driving panel circuit GPC is disposed according to embodiments of the disclosure.

Figure 9A:
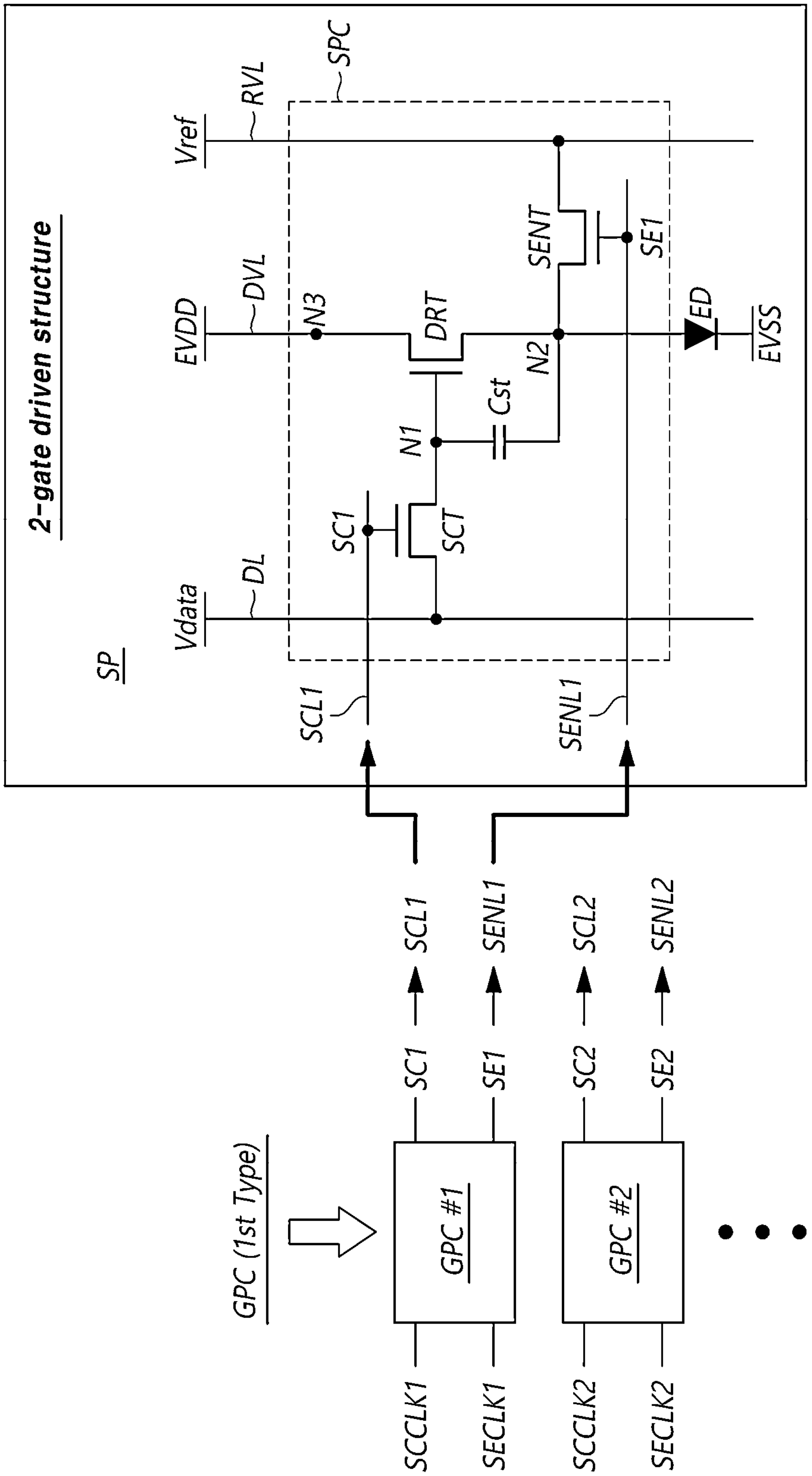
FIG. 9A illustrates an input and output of a gate driving panel circuit when the gate driving panel circuit is of a first type according to embodiments of the disclosure.

FIG. 9A illustrates an input and output of a gate driving panel circuit when the gate driving panel circuit is of a first type according to embodiments of the disclosure.

Referring to FIG. 9A, when each subpixel SP disposed on the display panel 110 has a 1-gate driven structure (see FIG. 3A), the gate driving panel circuit GPC can be of a first type.

When the gate driving panel circuit GPC is of the first type, the first gate driving panel circuit GPC #1 included in the gate driving panel circuit GPC can receive a first scan clock signal SCCLK1 and a first sensing clock signal SECLK1 and output a first scan signal SC1 and a first sensing signal SE1.

The first scan clock signal SCCLK1 and the first sensing clock signal SECLK1 can be output from the level shifter L/S.

The first scan signal SC1 and the first sensing signal SE1 can be applied to the first scan signal line SCL1 and the first sensing signal line SENL1, respectively.

When the gate driving panel circuit GPC is of the first type, the second gate driving panel circuit GPC #2 included in the gate driving panel circuit GPC can receive a second scan clock signal SCCLK2 and a second sensing clock signal SECLK2 and output a second scan signal SC2 and a second sensing signal SE2.

The second scan clock signal SCCLK2 and the second sensing clock signal SECLK2 can be output from the level shifter L/S.

The second scan signal SC2 and the second sensing signal SE2 can be applied to the second scan signal line SCL2 adjacent to the first scan signal line SCL1 and the second sensing signal line SENL2 adjacent to the first sensing signal line SENL1, respectively.

Figure 9B:
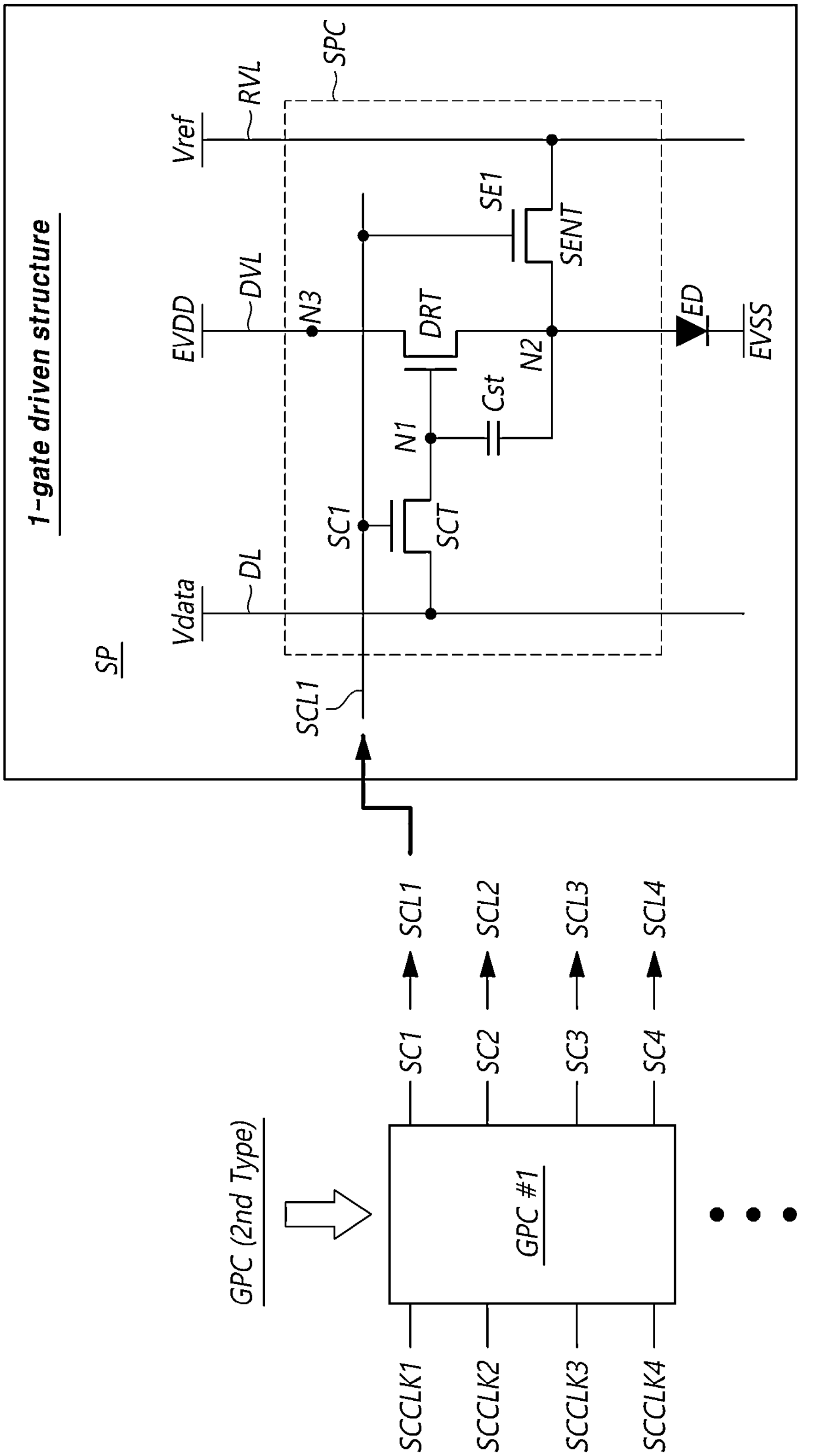
FIG. 9B illustrates an input and output of a gate driving panel circuit when the gate driving panel circuit is of a second type according to embodiments of the disclosure.

FIG. 9B illustrates an input and output of a gate driving panel circuit GPC when the gate driving panel circuit GPC is of a second type according to embodiments of the disclosure.

Referring to FIG. 9B, when each subpixel SP disposed on the display panel 110 has a 2-gate driven structure (see FIG. 3B), the gate driving panel circuit GPC can be of a second type.

For example, when the gate driving panel circuit GPC is of the second type, the first gate driving panel circuit GPC1 included in the gate driving panel circuit GPC can receive a first scan clock signal SCCLK1, a second scan clock signal SCCLK2, a third scan clock signal SCCLK3, and a fourth scan clock signal SCCLK4, and can output a first scan signal SC1, a second scan signal SC2, a third scan signal SC3, and a fourth scan signal SC4.

The first scan clock signal SCCLK1, the second scan clock signal SCCLK2, the third scan clock signal SCCLK3, and the fourth scan clock signal SCCLK4 can be output from the level shifter L/S.

The first scan signal SC1 can be applied to the first scan signal line SCL1, and the second scan signal SC2, the third scan signal SC3, and the fourth scan signal SC4 can be applied to the second scan signal line SCL2, the third scan signal line SCL3, and the fourth scan signal line SCL4, respectively, adjacent to the first scan signal line SCL1.

Figure 10:
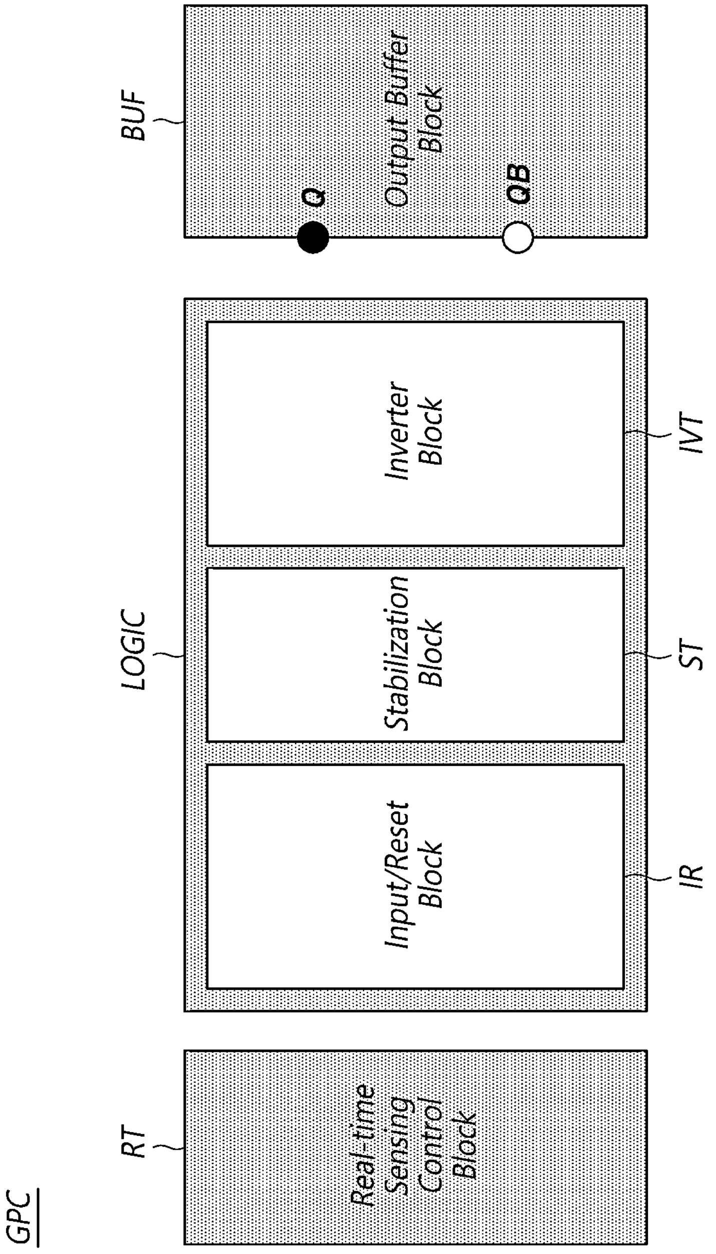
FIG. 10 is a block diagram illustrating a gate driving panel circuit according to embodiments of the disclosure.

FIG. 10 is a block diagram illustrating a gate driving panel circuit according to embodiments of the disclosure.

Referring to FIG. 10, the gate driving panel circuit GPC can include an output buffer block BUF, a logic block LOGIC, and a real-time sensing control block RT.

The output buffer block BUF can be configured to output two or more gate signals.

For example, when the gate driving panel circuit GPC is of the first type, the output buffer block BUF can output at least one scan signal SC and at least one sensing signal SE.

When the gate driving panel circuit GPC is of the first type, the subpixel SP can have a 2-gate driven structure as shown in FIG. 3A.

For example, when the gate driving panel circuit GPC is of the second type, the output buffer block BUF can output two or more scan signals SC.

When the gate driving panel circuit GPC is of the second type, the subpixel SP can have a 1-gate driven structure as shown in FIG. 3B.

The output buffer block BUF can be controlled according to voltage states of a Q node and a QB node. The operation and output of the output buffer block BUF can vary according to voltage states of the Q node and the QB node.

The Q node and the QB node can have different voltage levels. For example, if the voltage of the Q node during a first period is a high-level voltage, the voltage of the QB node can be a low-level voltage. If the voltage of the Q node is a low-level voltage during a second period before or after the first period, the voltage of the QB node can be a high-level voltage.

The logic block LOGIC can be a circuit block that controls the operation of the output buffer block BUF and implements an operation of a shift register. The logic block LOGIC can control the voltages of the Q node and the QB node to control the operation of the output buffer block BUF.

The logic block LOGIC can include an input/reset block IR, a stabilization block ST, and an inverter block IVT.

The input/reset block IR can be a circuit block that controls charge and discharge of the Q node. The inverter block IVT can control the inverted voltage level of the voltage level of the Q node to be the voltage level of the QB node according to the voltage of the Q node. The stabilization block ST can stabilize the Q node and the output according to the voltage of the QB node during a period when the output signal of the gate driving panel circuit GPC has a turn-off level voltage.

Each of the input/reset block IR, the stabilization block ST, and the inverter block IVT can include at least one transistor.

The real-time sensing control block RT can be a circuit block for controlling the operation of the logic block LOGIC for real-time sensing driving. Here, the real-time sensing driving can be sensing driving performed in real time during display driving and sensing driving performed every blank period BLANK between active periods ACT (see FIG. 7). The real-time sensing driving can be performed in a second sensing mode corresponding to the fast sensing mode (FIG. 6B). The real-time sensing driving can be sensing driving for sensing the mobility of the driving transistor DRT of each subpixel SP (FIG. 6B).

The real-time sensing control block RT can include at least one transistor.

When the gate driving panel circuit GPC is of the first type, the real-time sensing control block RT can control the voltages of the Q node and the QB node such that the output buffer block BUF outputs the scan signal SC and the sensing signal SE to the subpixel SP where the real-time sensing driving is performed.

When the gate driving panel circuit GPC is of the second type, the real-time sensing control block RT can control the voltages of the Q node and the QB node such that the output buffer block BUF outputs the scan signal SC to the subpixel SP where the real-time sensing driving is performed.

Figure 11:
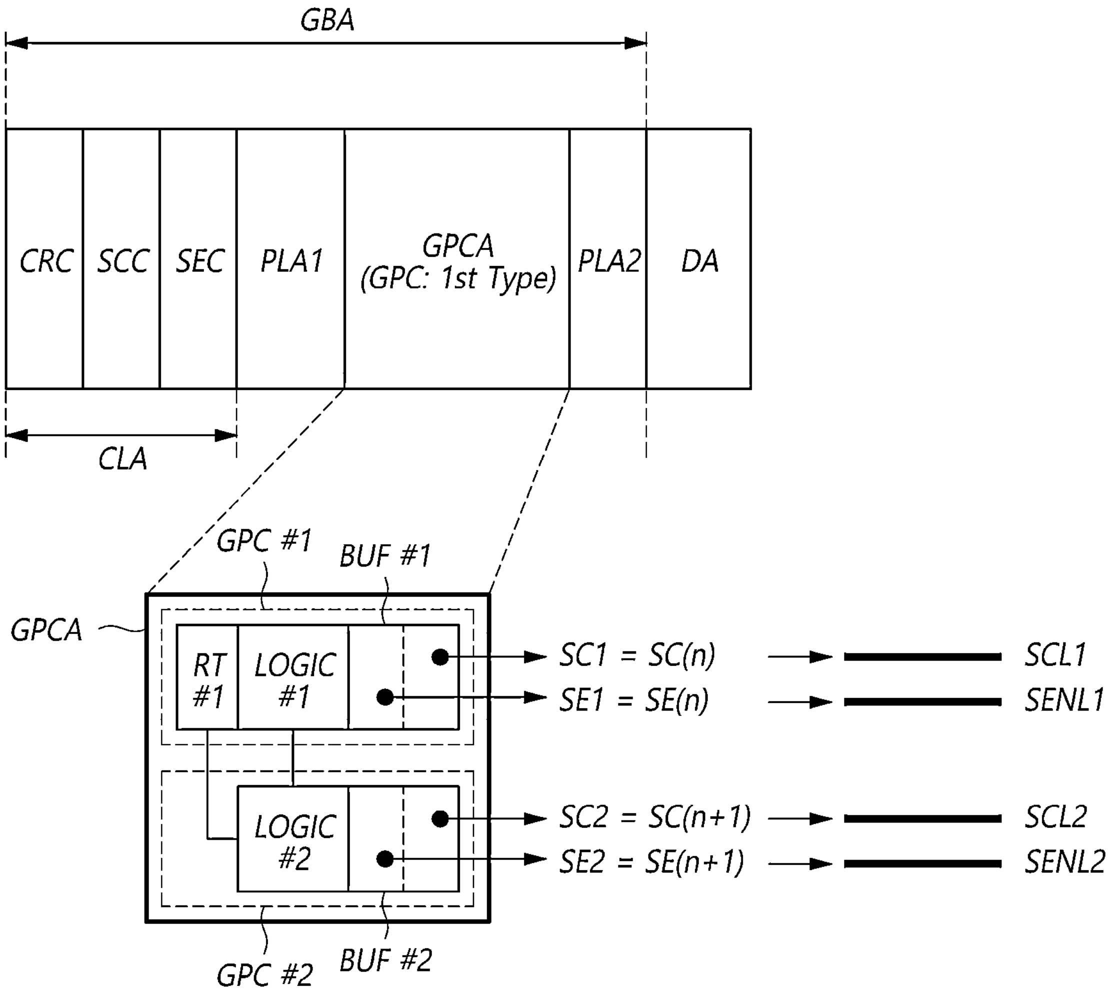
FIG. 11 is a layout view illustrating a gate bezel area in a display panel when a gate driving panel circuit is of a first type according to embodiments of the disclosure.

FIG. 11 is a layout view illustrating a gate bezel area in a display panel when a gate driving panel circuit is of a first type according to embodiments of the disclosure.

Referring to FIG. 11, the gate bezel area GBA of the display panel 110 can include a clock signal line area CLA, a first power line area PLA1, a gate driving panel circuit area GPCA, and a second power line area PLA2.

The gate driving panel circuit area GPCA can be an area in which the gate driving panel circuit GPC of the first type is disposed. The gate driving panel circuit GPC of the first type can output scan signals SC and sensing signals SE to be supplied to the subpixel SP having a 2-gate driving structure.

Various lines for supplying power, voltage, or signals to the gate driving panel circuit GPC can be disposed around the gate driving panel circuit area GPCA. Accordingly, in the gate bezel area GBA, the clock signal line area CLA, the first power line area PLA1, and the second power line area PLA2 can be disposed around the gate driving panel circuit area GPCA.

For example, the clock signal line area CLA and the first power line area PLA1 can be positioned on one side of the gate driving panel circuit area GPCA, and the second power line area PLA2 can be positioned on the other side of the gate driving panel circuit area GPCA.

The gate driving panel circuit area GPCA can be positioned on one side of the second power line area PLA2, and the display area DA can be positioned on the other side of the second power line area PLA2.

The clock signal line area CLA can be an area in which clock signal lines for transferring various clock signals to the gate driving panel circuit GPC are disposed.

The first power line area PLA1 can be an area in which at least one gate high-potential voltage line for transferring at least one gate high-potential voltage to the gate driving panel circuit GPC is disposed.

At least one control signal line for transferring at least one control signal to the gate driving panel circuit GPC can be further disposed in the first power line area PLA1. For example, the at least one control signal can include at least one of a start signal, a reset signal, and a line selection signal.

The second power line area PLA2 can be an area in which at least one gate low-potential voltage line for transferring at least one gate low-potential voltage to the gate driving panel circuit GPC is disposed.

When the gate driving panel circuit GPC is of the first type, the clock signal line area CLA can include a carry clock signal line area CRC, a scan clock signal line area SCC, and a sensing clock signal line area SEC.

The carry clock signal line area CRC can be an area in which carry clock signal lines for transferring carry clock signals to the gate driving panel circuit GPC are disposed.

The scan clock signal line area SCC can be an area in which scan clock signal lines for transferring scan clock signals to the gate driving panel circuit GPC are disposed.

The sensing clock signal line area SEC can be an area in which sensing clock signal lines for transferring sensing clock signals to the gate driving panel circuit GPC are disposed.

The position order of the carry clock signal line area CRC, the scan clock signal line area SCC, and the sensing clock signal line area SEC can be variously set (e.g., CRC-SCC-SEC, SCC-CRC-SEC, SCC-SEC-CRC, SEC-SCC-CRC, etc.).

For example, among the carry clock signal line area CRC, the scan clock signal line area SCC, and the sensing clock signal line area SEC, the scan clock signal line area SCC can be positioned between the carry clock signal line area CRC and the sensing clock signal line area SEC, and the carry clock signal line area CRC can be positioned further away from the display area DA or the gate driving panel circuit area GPCA than the sensing clock signal line area SEC.

When the gate driving panel circuit GPC is of the first type, the gate driving panel circuit GPC disposed in the gate driving panel circuit area GPCA can include, e.g., a first gate driving panel circuit GPC #1 and a second gate driving panel circuit GPC #2. Each of the first gate driving panel circuit GPC #1 and the second gate driving panel circuit GPC #2 can have a separate Q node and a separate QB node.

The first gate driving panel circuit GPC #1 can include a first output buffer block BUF #1, a first logic block LOGIC #1, and a first real-time sensing control block RT #1.

The first output buffer block BUF #1 can be configured to output the first scan signal SC1 and the first sensing signal SE1 to the first scan signal line SCL1 and the first sensing signal line SENL1, respectively, connected to the first subpixel SP. For example, the first scan signal SC1 can be an nth scan signal SC(n), and the first sensing signal SE1 can be an nth sensing signal SE (n).

The first logic block LOGIC #1 can be configured to control the operation of the first output buffer block BUF #1 by controlling the voltage of each of the Q node and the QB node.

The second gate driving panel circuit GPC #2 can include only the second output buffer block BUF #2 and the second logic block LOGIC #2.

The second output buffer block BUF #2 can be configured to output the second scan signal SC2 and the second sensing signal SE2 to the second scan signal line SCL2 and the second sensing signal line SENL2, respectively, connected to the second subpixel SP. For example, the second scan signal SC2 can be an (n+1)th scan signal SC(n+1), and the second sensing signal SE2 can be an (n+1)th sensing signal SE (n+1).

The second logic block LOGIC #2 can be configured to control the operation of the second output buffer block BUF #2 by controlling the voltage of each of the Q node and the QB node.

The first real-time sensing control block RT #1 can be shared by the first gate driving panel circuit GPC #1 and the second gate driving panel circuit GPC #2. Accordingly, the size of the gate bezel area GBA can be significantly reduced.

The first real-time sensing control block RT #1 can be configured to control the voltage of each of the Q node and the QB node of the first gate driving panel circuit GPC #1 during a first real-time sensing driving period (first blank period) to control the operation of the first output buffer block BUF #1 such that the first output buffer block BUF #1 outputs the first scan signal SC1 and the first sensing signal SE1 for sensing driving to the first subpixel SP where real-time sensing driving is to be performed.

The first real-time sensing control block RT #1 can be configured to control the voltage of each of the Q node and the QB node of the second gate driving panel circuit GPC #2 during a second real-time sensing driving period (second blank period) different from the first real-time sensing driving period (first blank period) to control the operation of the second output buffer block BUF #2 such that the second output buffer block BUF #2 outputs the second scan signal SC2 and the second sensing signal SE2 for sensing driving to the second subpixel SP where real-time sensing driving is to be performed.

At least one specific node of the first logic block LOGIC #1 and at least one specific node of the second logic block LOGIC #2 can be electrically connected to each other.

Among the first output buffer block BUF #1, the first logic block LOGIC #1, and the first real-time sensing control block RT #1, the first real-time sensing control block RT #1 can be positioned farthest from the display area DA.

The gate driving panel circuit area GPCA can be disposed between the first power line area PLA1 and the second power line area PLA2.

Accordingly, at least one gate high-potential voltage line disposed in the first power line area PLA1 and at least one gate low-potential voltage line disposed in the second power line area PLA2 can be separated by the gate driving panel circuit GPC disposed in the gate driving panel circuit area GPCA.

According to the above-described power supply arrangement, at least one high-potential voltage line and at least one low-potential voltage line do not overlap each other, and thus, the high-potential voltages (GVDD, GVDD2, GVDD_o/GVDD_e of FIG. 12) and the low-potential voltages (GVSS0, GVSS1, and GVSS2 of FIG. 12) can be stabilized.

Figure 12:
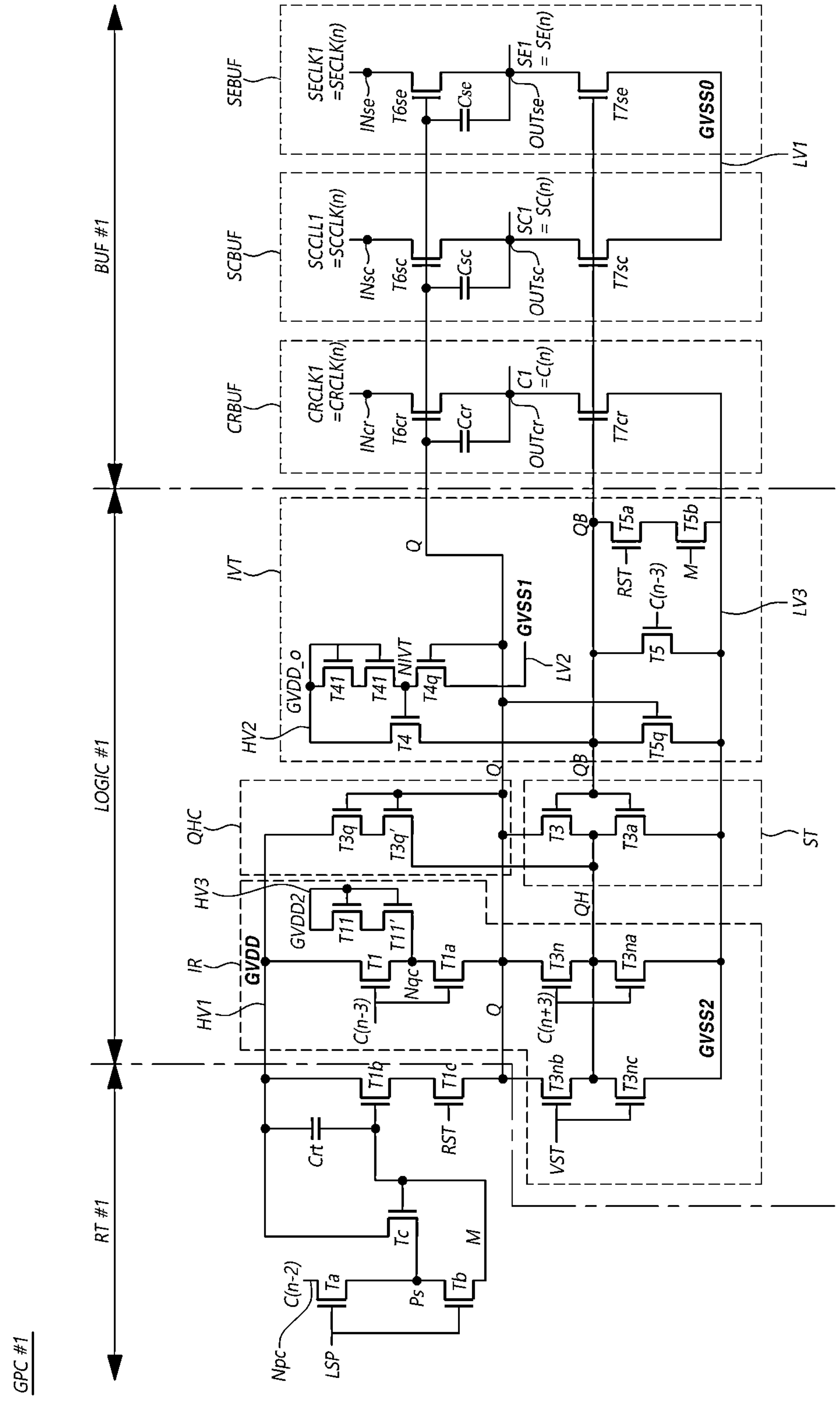
FIG. 12 illustrates a first gate driving panel circuit included in a gate driving panel circuit when the gate driving panel circuit is of a first type according to embodiments of the disclosure.

FIG. 12 illustrates a first gate driving panel circuit included in a gate driving panel circuit when the gate driving panel circuit is of a first type according to embodiments of the disclosure.

Here, the first gate driving panel circuit GPC #1 can be configured to output an odd-numbered nth scan signal SC(n) and nth sensing signal SE (n). The nth scan signal SC(n) can be supplied to an odd-numbered nth scan signal line SCL, and the nth sensing signal SE (n) can be supplied to an odd-numbered nth sensing signal line SENL. Hereinafter, for convenience of description, the nth scan signal SC(n) can also be referred to as the first scan signal SC1, and the nth sensing signal SE (n) can also be referred to as the first sensing signal SE1.

Referring to FIG. 12, the first gate driving panel circuit GPC #1 can include a first output buffer block BUF #1, a first logic block LOGIC #1, and a first real-time sensing control block RT #1.

The first output buffer block BUF #1 can include a carry output buffer CRBUF, a scan output buffer SCBUF, and a sensing output buffer SEBUF.

The carry output buffer CRBUF can include a carry pull-up transistor T6*cr* and a carry pull-down transistor T7*cr*.

The carry pull-up transistor T6*cr* can be turned on or off according to the voltage of the Q node, thereby controlling the connection between the carry clock node INcr to which the nth carry clock signal CRCLK(n) is input and the carry output node OUTcr where the nth carry signal C(n) is output. Here, the nth carry clock signal CRCLK(n) can also be referred to as the first carry clock signal CRCLK1, and the nth carry signal C(n) can also be referred to as the first carry signal C1.

The gate node of the carry pull-up transistor T6*cr* can be the Q node or can be electrically connected to the Q node. The source node (or drain node) of the carry pull-up transistor T6*cr* can be the carry output node OUTcr or can be electrically connected to the carry output node OUTcr. The drain node (or source node) of the carry pull-up transistor T6*cr* can be the carry clock node INcr or can be electrically connected to the carry clock node INcr.

The carry pull-up transistor T6*cr* can be turned on to output the first carry clock signal CRCLK1 as the first carry signal C1 having a high-level voltage.

The carry output buffer CRBUF can further include a carry bootstrapping capacitor Ccr connected between the gate node and the source node (or the drain node) of the carry pull-up transistor T6*cr*.

The carry-pull-down transistor T7*cr* can be turned on or off according to the voltage of the QB node, thereby controlling the connection between the third gate low-potential node LV3 to which the third gate low-potential voltage GVSS2 is input and the carry output node OUTcr where the nth carry signal C(n) is output.

The gate node of the carry pull-down transistor T7*cr* can be the QB node or can be electrically connected to the QB node. The drain node or the source node of the carry pull-down transistor T7*cr* can be the third gate low-potential node LV3 or can be electrically connected to the third gate low-potential node LV3, and the source node or the drain node of the carry pull-down transistor T7*cr* can be the carry output node OUTcr or can be electrically connected to the carry output node OUTcr.

The carry pull-down transistor T7*cr* can be turned on to output the third gate low-potential voltage GVSS2 as the first carry signal C1 having a low-level voltage.

The scan output buffer SCBUF can be configured to output an nth scan clock signal SCCLK(n) having a turn-on level voltage or a turn-off level voltage to the scan output node OUTsc. The nth scan clock signal SCCLK(n) output to the scan output node OUTsc can be applied to the first scan signal line SCL1 electrically connected to the scan output node OUTsc.

The scan output buffer SCBUF can include a scan pull-up transistor T6*sc* and a scan pull-down transistor T7*sc*.

The scan pull-up transistor T6*sc* can be turned on or off according to the voltage of the Q node, thereby controlling the connection between the scan clock node INsc to which the nth scan clock signal SCCLK(n) is input and the scan output node OUTsc where the nth scan signal SC(n) is output. Here, the nth scan clock signal SCCLK(n) can also be referred to as the first scan clock signal SCCLK1, and the nth scan signal SC(n) can also be referred to as the first scan signal SC1.

The gate node of the scan pull-up transistor T6*sc* can be the Q node or can be electrically connected to the Q node. The source node (or drain node) of the scan pull-up transistor T6*sc* can be the scan output node OUTsc or can be electrically connected to the scan output node OUTsc. The drain node (or source node) of the scan pull-up transistor T6*sc* can be the scan clock node INsc or can be electrically connected to the scan clock node INsc.

The scan pull-up transistor T6*sc* can be turned on to output the scan clock signal SCCLK, as the first scan signal SC1 having a turn-on level voltage (e.g., a high-level voltage), to the scan output node OUTsc. The first scan signal SC1 having a turn-on level voltage (e.g., a high-level voltage) output from the scan pull-up transistor T6*sc* can be applied to the first scan signal line SCL1.

The scan output buffer SCBUF can further include a scan bootstrapping capacitor Csc connected between the gate node and the source node (or the drain node) of the scan pull-up transistor T6*sc*.

The scan pull-down transistor T7*sc* can be turned on or off according to the voltage of the QB node, thereby controlling the connection between the first gate low-potential node LV1 to which the first gate low-potential voltage GVSS0 is input and the scan output node OUTsc where the nth scan signal SC(n) is output.

The gate node of the scan pull-down transistor T7*sc* can be the QB node or can be electrically connected to the QB node. The drain node or the source node of the scan pull-down transistor T7*sc* can be the first gate low-potential node LV1 or can be electrically connected to the first gate low-potential node LV1. The source node or drain node of the scan pull-down transistor T7*sc* can be the scan output node OUTsc or can be electrically connected to the scan output node OUTsc.

The scan pull-down transistor T7*sc* can be turned on to output the first gate low-potential voltage GVSS0, as the first scan signal SC1 having a turn-off level voltage (e.g., a low-level voltage), to the scan output node OUTsc. The first scan signal SC1 having a turn-off level voltage (e.g., a low-level voltage) in the scan pull-up transistor T6*sc* can be applied to the first scan signal line SCL1.

The sensing output buffer SEBUF can be configured to output an nth sensing signal SE (n) having a turn-on level voltage or a turn-off level voltage to the sensing output node OUTse. The nth sensing signal SE (n) output to the sensing output node OUTse can be applied to the first sensing signal line SENL1 electrically connected to the sensing output node OUTse.

The sensing output buffer SEBUF can include a sensing pull-up transistor T6*se* and a sensing pull-down transistor T7*se*.

The sensing pull-up transistor T6*se* can be turned on or off according to the voltage of the Q node, thereby controlling the connection between the sensing clock node INse to which the nth sensing clock signal SECLK(n) is input and the sensing output node OUTse where the nth sensing signal SE (n) is output. Here, the nth sensing clock signal SECLK (n) can also be referred to as the first sensing clock signal SECLK1, and the nth sensing signal SE (n) can also be referred to as the first sensing signal SE1.

The gate node of the sensing pull-up transistor T6*se* can be the Q node or can be electrically connected to the Q node. The source node (or drain node) of the sensing pull-up transistor T6*se* can be the sensing output node OUTse or can be electrically connected to the sensing output node OUTse. The drain node (or source node) of the sensing pull-up transistor T6*se* can be the sensing clock node INse or can be electrically connected to the sensing clock node INse.

The sensing pull-up transistor T6*se* can be turned on to output the sensing clock signal SECLK, as the first sensing signal SE1 having a turn-on level voltage (e.g., a high-level voltage), to the sensing output node OUTse. The first sensing signal SE1 having a turn-on level voltage (e.g., a high-level voltage) output from the sensing pull-up transistor T6*se* can be applied to the first sensing signal line SENL1.

The sensing output buffer SEBUF can further include a sensing bootstrapping capacitor Se connected between the gate node and the source node (or the drain node) of the sensing pull-up transistor T6*se*.

The sensing pull-down transistor T7*se* can be turned on or off according to the voltage of the QB node, thereby controlling the connection between the first gate low-potential node LV1 to which the first gate low-potential voltage GVSS0 is input and the sensing output node OUTse where the nth sensing signal SE (n) is output.

The gate node of the sensing pull-down transistor T7*se* can be the QB node or can be electrically connected to the QB node. The drain node or the source node of the sensing pull-down transistor T7*se* can be the first gate low-potential node LV1 or can be electrically connected to the first gate low-potential node LV1. The source node or drain node of the sensing pull-down transistor T7*se* can be the sensing output node OUTse or can be electrically connected to the sensing output node OUTse.

The sensing pull-down transistor T7*se* can be turned on to output the first gate low-potential voltage GVSS0, as the first sensing signal SE1 having a turn-off level voltage (e.g., a low-level voltage), to the sensing output node OUTse. The first sensing signal SE1 having a turn-off level voltage (e.g., a low-level voltage) in the sensing pull-down transistor T7*se* can be applied to the first sensing signal line SENL1.

The respective gate nodes of the carry pull-up transistor T6*cr*, the scan pull-up transistor T6*sc*, and the sensing pull-up transistor T6*se* included in the first output buffer block BUF #1 can be electrically connected to each other.

The Q node can be shared by the carry output buffer CRBUF, the scan output buffer SCBUF, and the sensing output buffer SEBUF included in the first output buffer block BUF #1. The Q node can be electrically connected to the gate node of the carry pull-up transistor T6*cr*, the gate node of the scan pull-up transistor T6*sc*, and the gate node of the sensing pull-up transistor T6*se*. This structure can also be referred to as a "Q node sharing structure".

The respective gate nodes of the carry-pull-down transistor T7*cr*, the scan-pull-down transistor T7*sc*, and the sensing-pull-down transistor T7*se* included in the first output buffer block BUF #1 can be connected to each other.

The QB node can be shared by the carry output buffer CRBUF, the scan output buffer SCBUF, and the sensing output buffer SEBUF included in the first output buffer block BUF #1. The QB node can be electrically connected to the gate node of the carry pull-down transistor T5*cr*, the gate node of the scan pull-down transistor T5*sc*, and the gate node of the sensing pull-down transistor T5*se*.

The first logic block LOGIC #1 is the circuit block for controlling the voltages of the Q node and the QB node to control the operation of the first output buffer block BUF #1, and can include an input/reset block IR, a stabilization block ST, and an inverter block IVT.

The input/reset block IR is a circuit block for controlling charging and discharging of the Q node, and can include a Q node charging block connected between the first gate high-potential node HV1 and the Q node and a Q node discharging block connected between the Q node and the third gate low-potential node LV3. Here, the first gate high-potential voltage GVDD can be input to the first gate high-potential node HV1. The third gate low-potential voltage GVSS2 can be input to the third gate low-potential node LV3.

The Q node charge block of the input/reset block IR can include at least one Q node charge transistor for controlling the connection between the first gate high-potential node HV1 and the Q node by being turned on or off according to the (n−3)th carry signal C(n−3) to charge the Q node.

For example, the Q node charge block of the input/reset block IR can include a first Q node charge transistor T1 and a second Q node charge transistor T1*a* connected in series between the first gate high-potential node HV1 and the Q node.

The gate node of the first Q node charge transistor T1 and the gate node of the second Q node charge transistor T1*a* can be electrically connected to each other to receive the (n−3)th carry signal C(n−3) together.

The first Q node charge transistor T1 can be connected between the first gate high-potential node HV1 and the Q node charge control node Nqc, and the second Q node charge transistor T1*a* can be connected between the Q node charge control node Nqc and the Q node.

The Q node charge block of the input/reset block IR can further include a first Q node charge control transistor T11 and a second Q node charge control transistor T11' connected in series between the third gate high-potential node HV3 and the Q node charge control node Nqc to control the Q node charge control node Nqc. Here, the third gate high-potential voltage GVDD2 can be applied to the third gate high-potential node HV3.

The gate node of the first Q node charge control transistor T11 and the gate node of the second Q node charge control transistor T11' can be electrically connected to each other and can be connected to the third gate high-potential node HV3 together.

The Q node discharge block of the input/reset block IR can include a first Q node discharge transistor T3*n* and a second Q node discharge transistor T3*na* connected in series between the Q node and the third gate low-potential node LV3 to discharge the Q node.

The first Q node discharge transistor T3*n* and the second Q node discharge transistor T3*na* can be turned on or off together according to the (n+3)th carry signal C(n+3) to control the connection between the Q node and the third gate low-potential node LV3.

The first Q node discharge transistor T3*n* can be connected between the Q node and the holding node QH node, and the second Q node discharge transistor T3*na* can be connected between the holding node QH node and the third gate low-potential node LV3.

The gate node of the first Q node discharge transistor T3*n* and the gate node of the second Q node discharge transistor T3*na* can be electrically connected to each other to receive the (n+3)th carry signal C(n+3) together.

The Q node discharge block of the input/reset block IR can further include a third Q node discharge transistor T3*nb* and a fourth Q node discharge transistor T3*nc* connected in series between the Q node and the third gate low-potential node LV3 to discharge the Q node.

The third Q node discharge transistor T3*nb* and the fourth Q node discharge transistor T3*nc* can be turned on or off together according to the start signal VST to control the connection between the Q node and the third gate low-potential node LV3.

The third Q node discharge transistor T3*nb* can be connected between the Q node and the holding node QH node, and the fourth Q node discharge transistor T3*nc* can be connected between the holding node QH node and the third gate low-potential node LV3.

The stabilization block ST can be a circuit block that stabilizes the Q node and the output according to the voltage of the QB node during a period when the output signal of the gate driving panel circuit GPC has a turn-off level voltage.

The stabilization block ST can include a first stabilization transistor T3 and a second stabilization transistor T3*a* that are turned on or off according to the voltage of the QB node to control the connection between the Q node and the third gate low-potential node LV3.

The first stabilization transistor T3 can be connected between the Q node and the holding node QH node, and can be turned on or off according to the voltage of the QB node to control the connection between the Q node and the holding node QH node.

The second stabilization transistor T3*a* can be connected between the holding node QH node and the third gate low-potential node LV3, and can be turned on or off according to the voltage of the QB node to control the connection between the holding node QH node and the third gate low-potential node LV3.

The inverter block IVT can be a circuit block that controls the inverted voltage level of the voltage level of the Q node to be the voltage level of the QB node according to the voltage of the Q node.

The inverter block IVT can include a QB node charge transistor T4 for charging the QB node.

The QB node charge transistor T4 can be connected between the second gate high-potential node HV2 and the QB node, and can be turned on or off according to the voltage of the inverter control node NIVT to control the connection between the second gate high-potential node HV2 and the QB node. Here, the second gate high-potential voltage GVDD_o can be applied to the second gate high-potential node HV2.

The inverter block IVT can further include a first inverter control transistor T4*q* for controlling the voltage of the inverter control node NIVT.

The first inverter control transistor T4*q* can be connected between the inverter control node NIVT and the second gate low-potential node LV2 and can be turned on or off according to the voltage of the Q node to control the connection between the inverter control node NIVT and the second gate low-potential node LV2. Here, the second gate low-potential voltage GVSS1 can be applied to the second gate low-potential node LV2.

As the Q node has a low-level voltage, the first inverter control transistor T4*q* can be turned off. Accordingly, the inverter control node NIVT is in a state in which the second gate high-potential voltage GVDD_o supplied by the second inverter control transistor T41 is applied. Accordingly, the QB node charge transistor T4 can be turned on, so that the second gate high-potential voltage GVDD_o can be supplied to the QB node (Q node charging).

As the Q node has a high-level voltage, the first inverter control transistor T4*q* can be turned on to supply the second gate low-potential voltage GVSS1 to the inverter control node NIVT. Accordingly, the QB node charge transistor T4 can be turned off to prevent the second gate high-potential voltage GVDD_o from being supplied to the QB node.

The inverter block IVT can further include a second inverter control transistor T41 for controlling the voltage of the inverter control node NIVT.

The second inverter control transistor T41 can be connected between the second gate high-potential node HV2 and the inverter control node NIVT, and can be turned on or off according to the second gate low-potential voltage GVSS1 to control the connection between the second gate high-potential node HV2 and the inverter control node NIVT.

The second inverter control transistor T41 can always maintain the turned-on state to supply the second gate high-potential voltage GVDD_o to the inverter control node NIVT.

The inverter block IVT can include a first QB node discharge transistor T5 connected between the QB node and the third gate low-potential node LV3 to discharge the QB node.

The first QB node discharge transistor T5 can be turned on or off according to the (n−3)th carry signal C(n−3), and can control the connection between the QB node and the third gate low-potential node LV3. The first QB node discharge transistor T5 can be turned on, so that the third gate low-potential voltage GVSS2 can be applied to the QB node. Accordingly, the QB node can be discharged.

The inverter block IVT can further include a second QB node discharge transistor T5*q* connected between the QB node and the third gate low-potential node LV3 to discharge the QB node.

The second QB node discharge transistor T5*q* can be turned on or off according to the voltage of the Q node to control the connection between the QB node and the third gate low-potential node LV3. The second QB node discharge transistor T5*q* can be turned on, so that the third gate low-potential voltage GVSS2 can be applied to the QB node. Accordingly, the QB node can be discharged.

The inverter block IVT can further include a third QB node discharge transistor T5*a* and a fourth QB node discharge transistor T5*b* connected in series between the QB node and the third gate low-potential node LV3 to discharge the QB node.

The reset signal RST can be input to the gate node of the third QB node discharge transistor T5*a*. In other words, the third QB node discharge transistor T5*a* can be turned on or off according to the voltage of the reset signal RST.

The gate node of the fourth QB node discharge transistor T5*b* can be electrically connected to the intermediate node M. In other words, the fourth QB node discharge transistor T5*b* can be turned on or off according to the voltage of the intermediate node M. Here, the intermediate node M can be a node included in the first real-time sensing control block RT #1.

Among the plurality of QB node discharge transistors T5, T5*q*, T5*a*, and T5*b* included in the inverter block IVT, the first QB node discharge transistor T5 and the second QB node discharge transistor T5*q* can be configured to discharge the QB node for display driving during the active period ACT, and the third QB node discharge transistor T5*a* and the fourth QB node discharge transistor T5*b* can be configured to discharge the QB node for sensing driving during the blank period BLANK.

The first logic block LOGIC #1 can further include a holding node control block QHC for controlling the voltage of the holding node QH node. The holding node control block QHC can be connected between the first gate high-potential node HV1 and the holding node QH node.

The holding node control block QHC can include a first holding node control transistor T3*q* and a second holding node control transistor T3*q*' connected in series between the first gate high-potential node HV1 and the holding node QH node.

The respective gate nodes of the first holding node control transistor T3*q* and the second holding node control transistor T3*q*' can be connected to the Q node together.

When the Q node has a high-level voltage, both the first holding node control transistor T3*q* and the second holding node control transistor T3*q*' can be turned on, so that the first gate high-potential voltage GVDD can be applied to the holding node QH node. As the holding node QH node has the first gate high-potential voltage GVDD, the Q node can stably maintain the high-level voltage regardless of the on-off state of the third Q node discharge transistor T3*nb*, the first Q node discharge transistor T3*n*, and the first stabilization transistor T3.

The first real-time sensing control block RT #1 can be a circuit block for controlling the operation of the first logic block LOGIC #1 for real-time sensing driving. The first real-time sensing control block RT #1 can be configured to control the voltage of the Q node such that the first scan signal SC1 and the first sensing signal SE1 are output at a predetermined timing by the first output buffer block BUF #1 during the blank period BLANK.

The first real-time sensing control block RT #1 can control the first scan signal SC1 to be output to one of the plurality of scan signal lines SCL by the first output buffer block BUF #1 during the blank period BLANK, and can control the first sensing signal SE1 to be output to one of the plurality of sensing signal lines SENL. Accordingly, sensing can be performed on the subpixel SP included in any one of the plurality of subpixel lines.

The first real-time sensing control block RT #1 can include a first sensing control transistor Ta, a second sensing control transistor Tb, a third sensing control transistor Tc, a fourth sensing control transistor T1*b*, and a fifth sensing control transistor T1*c*.

The first sensing control transistor Ta and the second sensing control transistor Tb can be connected in series between the previous carry input node Npc and the intermediate node M. Here, the (n−2)th carry signal C(n−2) can be input to the previous carry input node Npc.

In order to perform real-time sensing driving on the subpixel SP capable of receiving the first sensing signal SE1 and the first scan signal SC1 output from the first gate driving panel circuit GPC #1, the first gate driving panel circuit GPC #1 should output the first scan signal SC1 and the first sensing signal SE1 as gate signals for sensing driving during the real-time sensing driving period. Here, the real-time sensing driving period can be included in the blank period BLANK.

The first real-time sensing control block RT #1 can use the line selection signal LSP to control the first scan signal SC1 and the first sensing signal SE1 to be output as gate signals for sensing driving during the real-time sensing driving period.

During the real-time sensing driving period, the line selection signal LSP can be commonly input to the respective gate nodes of the first sensing control transistor Ta and the second sensing control transistor Tb. Here, the line selection signal LSP is a signal in the form of a pulse and can be commonly applied to the respective gate nodes of the first sensing control transistor Ta and the second sensing control transistor Tb in the middle of the frame.

The third sensing control transistor Tc can be turned on or off according to the voltage of the intermediate node M to control the connection between the connection point Ps and the first gate high-potential node HV1. Here, the connection point Ps can be a point where the first sensing control transistor Ta and the second sensing control transistor Tb are connected.

The fourth sensing control transistor T1*b* and the fifth sensing control transistor T1*c* can be connected in series between the first gate high-potential node HV1 and the Q node.

The gate node of the fourth sensing control transistor T1*b* can be connected to the intermediate node M. The reset signal RST can be input to the gate node of the fifth sensing control transistor T1*c*.

During the real-time sensing driving period, the fourth sensing control transistor T1*b* and the fifth sensing control transistor T1*c* can be turned on according to the voltage of the intermediate node M and the reset signal RST, respectively, to transfer the first gate high-potential voltage GVDD to the Q node. Accordingly, during the real-time sensing driving period, the Q node can be charged. Here, the real-time sensing driving period can be included in the blank period BLANK.

The first real-time sensing control block RT #1 can include a sensing control capacitor Crt connected between the first gate high-potential node HV1 and the intermediate node M.

Figure 13A:
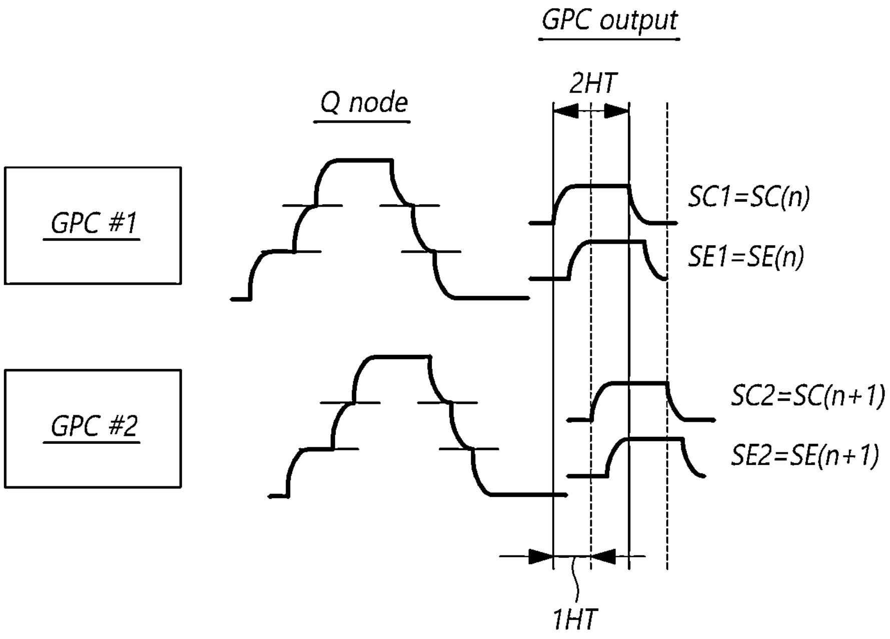
FIG. 13A illustrates a variation in voltage at Q node and output of each of a first gate driving panel circuit and a second gate driving panel circuit included in a gate driving panel circuit when the gate driving panel circuit is of a first type according to embodiments of the disclosure.

FIG. 13A illustrates a variation in voltage at Q node and output of each of a first gate driving panel circuit and a second gate driving panel circuit included in a gate driving panel circuit when the gate driving panel circuit is of a first type according to embodiments of the disclosure.

Referring to FIG. 13A, two or more voltage rises can occur during the voltage rising process of the Q node of the first gate driving panel circuit GPC #1. Two or more voltage rises (boosting) can occur during the voltage rising process of the Q node of the second gate driving panel circuit GPC #2.

When the Q node of the first gate driving panel circuit GPC #1 has a high-level voltage, the first gate driving panel circuit GPC #1 can output a first scan signal SC1 having a high-level voltage and a first sensing signal SE1 having a high-level voltage. The high-level voltage section of the first sensing signal SE1 can proceed after the high-level voltage section of the first scan signal SC1.

When the Q node of the second gate driving panel circuit GPC #2 has a high-level voltage, the second gate driving panel circuit GPC #2 can output a second scan signal SC2 having a high-level voltage and a second sensing signal SE2 having a high-level voltage. The high-level voltage section of the second sensing signal SE2 can proceed after the high-level voltage section of the second scan signal SC2.

The temporal length of the high-level voltage section of each of the first scan signal SC1 and the second scan signal SC2 can be a 2-horizontal time 2HT.

The high-level voltage section of the first scan signal SC1 and the high-level voltage section of the second scan signal SC2 can temporally overlap each other. A length in which the high-level voltage section of the first scan signal SC1 overlaps the high-level voltage section of the second scan signal SC2 can be a 1 horizontal time 1HT. As described above, a gate driving method in which high-level voltage sections of two scan signals SC1 and SC2 output immediately adjacent to each other temporally overlap each other temporally can be referred to as an "overlap gate driving method".

The high-level voltage section of the first sensing signal SE1 and the high-level voltage section of the second sensing signal SE2 can temporally overlap each other. A length in which the high-level voltage section of the first sensing signal SE1 overlaps the high-level voltage section of the second sensing signal SE2 can be a 1 horizontal time 1HT.

Figure 13B:
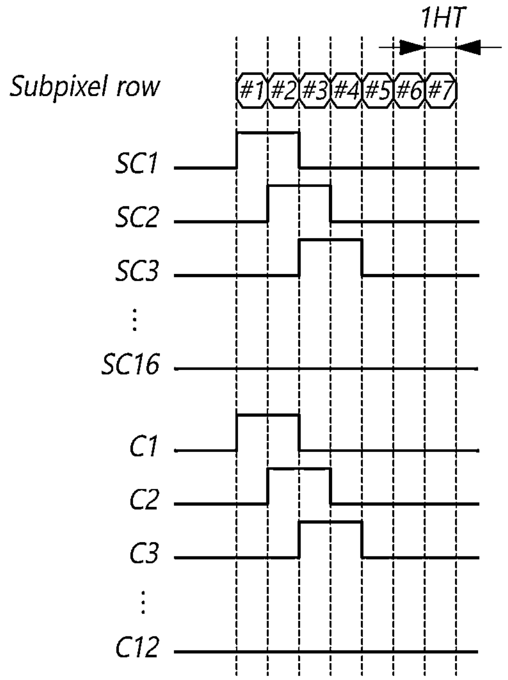
FIG. 13B illustrates scan signals and carry signals generated in a gate driving panel circuit when the gate driving panel circuit is of a first type according to embodiments of the disclosure.

FIG. 13B illustrates scan signals SC1 to SC16 and carry signals C1 to C12 generated by a gate driving panel circuit GPC when the gate driving panel circuit GPC is of a first type according to embodiments of the disclosure.

Referring to FIG. 13B, the gate driving panel circuit GPC can supply a corresponding scan signal to each of a plurality of subpixel rows #1, #2, #3, . . . . The gate driving panel circuit GPC can supply a first scan signal SC1 to a first subpixel row #1, can supply a second scan signal SC2 to a second subpixel row #2, and can supply a third scan signal SC3 to a third subpixel row #3.

The temporal length of the high-level voltage interval of each of the scan signals SC1 to SC16 can be a 2 horizontal time 2HT. The second half of the high-level voltage section of the first scan signal SC1 and the first half of the high-level voltage section of the second scan signal SC2 can overlap each other by 1 horizontal time HT. The second half of the high-level voltage section of the second scan signal SC2 and the first half of the high-level voltage section of the third scan signal SC3 can overlap each other by 1 horizontal time HT.

The gate driving panel circuit GPC can internally output the carry signals C1 to C12.

The temporal length of the high-level voltage section of each of the carry signals C1 to C12 can be 2 horizontal time 2HT. The second half of the high-level voltage section of the first carry signal C1 and the first half of the high-level voltage section of the second carry signal C2 can overlap each other by 1 horizontal time HT. The second half of the high-level voltage section of the second carry signal C2 and the first half of the high-level voltage section of the third carry signal C3 can overlap each other by 1 horizontal time HT.

Figure 14:
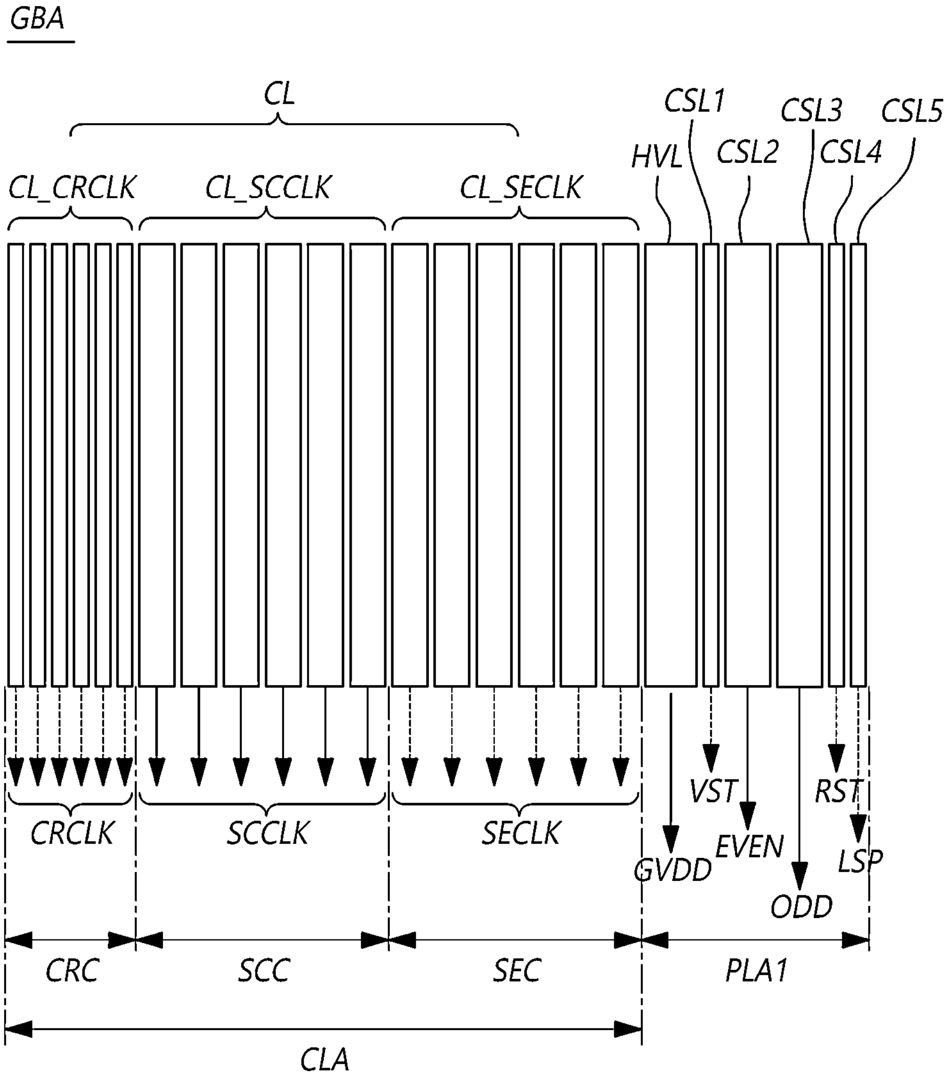
FIG. 14 is a view illustrating an arrangement of lines in a first power line area and a clock signal line area included in a gate bezel area when a gate driving panel circuit is of a first type according to embodiments of the disclosure.

FIG. 14 is a view illustrating an arrangement of lines in a first power line area and a clock signal line area included in a gate bezel area when a gate driving panel circuit is of a first type according to embodiments of the disclosure.

Referring to FIG. 14, the gate bezel area GBA of the display panel 110 can include a clock signal line area CLA and a first power line area PLA1. The clock signal line area CLA and the first power line area PLA1 can be positioned on one side of the first type of gate driving panel circuit area GPCA.

When the gate driving panel circuit GPC is of the first type, the plurality of clock signal lines CL disposed in the clock signal line area CLA can include a carry clock signal line area CRC, a scan clock signal line area SCC, and a sensing clock signal line area SEC.

The carry clock signal lines CL_CRCLK for transferring the carry clock signals CRCCLK to the gate driving panel circuit GPC can be disposed in the carry clock signal line area CRC.

In the scan clock signal line area SCC, the scan clock signal lines CL_SCCLK for transferring the scan clock signals SCCLK to the gate driving panel circuit GPC can be disposed.

The sensing clock signal lines CL_SECLK for transferring the sensing clock signals SECLK to the gate driving panel circuit GPC can be disposed in the sensing clock signal line area SEC.

Among the carry clock signal line area CRC, the scan clock signal line area SCC, and the sensing clock signal line area SEC, the scan clock signal line area SCC can be positioned between the carry clock signal line area CRC and the sensing clock signal line area SEC, the carry clock signal line area CRC can be positioned farthest from the display area DA, and the sensing clock signal line area SEC can be positioned closest to the display area DA.

Among the carry clock signal line area CRC, the scan clock signal line area SCC, and the sensing clock signal line area SEC, the carry clock signal line area CRC can be positioned farthest from the gate driving panel circuit area GPCA, and the sensing clock signal line area SEC can be positioned closest to the gate driving panel circuit area GPCA.

The width of one scan clock signal line CL_SCCLK can be larger than the width of one carry clock signal line CL_CRCLK. The width of one sensing clock signal line CL_SECLK can be larger than the width of one carry clock signal line CL_CRCLK.

In the first power line area PLA1, at least one gate high-potential voltage line HVL for transferring at least one gate high-potential voltage GVDD to the gate driving panel circuit GPC can be disposed.

Further, at least one control signal line can be additionally disposed in the first power line area PLA1. For example, the at least one control signal line can include at least one of a start signal line CSL1 for transferring a start signal VST for indicating the start of the gate driving operation to the gate driving panel circuit GPC, a first driving order control signal line CSL2 for transferring an even-numbered driving control signal EVEN to the gate driving panel circuit GPC, a second driving order control signal line CSL3 for transferring an odd-numbered driving control signal ODD to the gate driving panel circuit GPC, a reset signal line CSL4 for transferring a reset signal RST for indicating the end of the gate driving operation to the gate driving panel, and a line selection signal line CSL5 for transferring a line selection signal LSP to the gate driving panel circuit GPC.

The gate high-potential voltage line HVL can have a larger width than the start signal line CSL1, the reset signal line CSL4, and the line selection signal line CSL5.

The first driving order control signal line CSL2 and the second driving order control signal line CSL3 can be disposed in two specific line areas within the first power line area PLA1. As an example of changing the line arrangement, the first driving order control signal line CSL2 and the second driving order control signal line CSL3 may not be disposed in two specific line areas in the first power line area PLA1, but different gate high-potential voltage lines can be disposed.

For example, the second gate high-potential voltage can be divided into a 2-1th gate high-potential voltage GVDD_o applied at a high-level at an odd-numbered horizontal time and a 2-1th gate high-potential voltage GVDD_e applied at a high-level at an even-numbered horizontal time.

Accordingly, when the 2-1th gate high-potential voltage GVDD_o is at a high-level, the first group of pull-down transistors can be turned on and driven, and the second group of pull-down transistors can be turned off.

On the other hand, when the 2-2th gate high-potential voltage GVDD_e is at a high-level, the second group of pull-down transistors can be turned on and driven, and the first group of pull-down transistors can be turned off.

Illustrated here is an example in which a 2-1th gate high-potential voltage GVDD_o of a high level is applied at an odd-numbered horizontal time.

Figure 15:
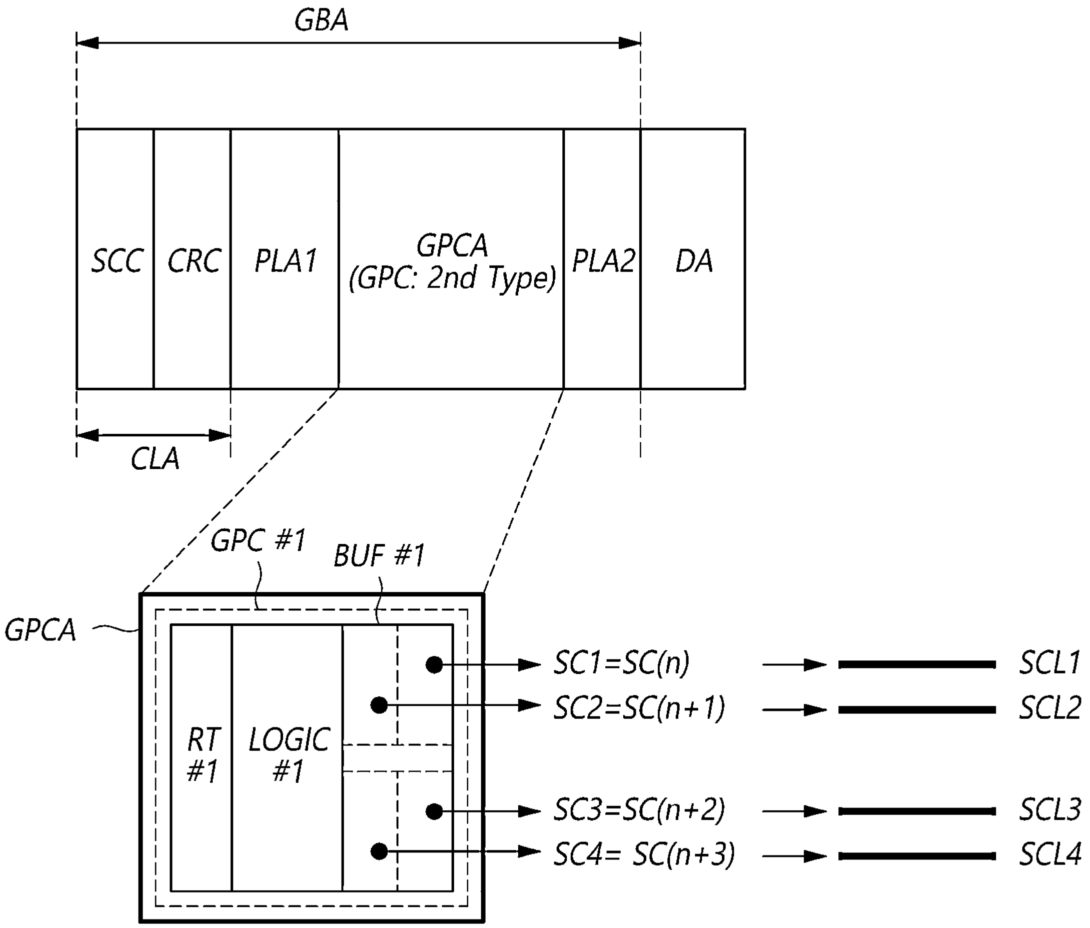
FIG. 15 is a layout view illustrating a gate bezel area in a display panel when a gate driving panel circuit is of a second type according to embodiments of the disclosure.

FIG. 15 is a layout view illustrating a gate bezel area in a display panel when a gate driving panel circuit is of a second type according to embodiments of the disclosure.

Referring to FIG. 15, the gate bezel area GBA in the non-display area NDA of the display panel 110 can include a clock signal line area CLA, a first power line area PLA1, a gate driving panel circuit area GPCA, and a second power line area PLA2.

The arrangement of the sub-areas in the gate bezel area GBA in which the gate driving panel circuit GPC of the second type is disposed is almost the same as the arrangement of the sub-areas in the gate bezel area GBA in which the first type of gate driving panel circuit GPC is disposed (see FIG. 11), except for the clock signal line area CLA and the gate driving panel circuit area GPCA. Accordingly, the following description focuses primarily on differences from the arrangement of sub-areas (see FIG. 11) in the gate bezel area GBA in which the first type of gate driving panel circuit GPC is disposed.

The gate driving panel circuit area GPCA can be an area in which the second type of gate driving panel circuit GPC is disposed. The second type of gate driving panel circuit GPC can output scan signals SC to be supplied to the subpixel SP having the 1-gate driven structure.

In the gate bezel area GBA, the clock signal line area CLA, the first power line area PLA1, and the second power line area PLA2 can be disposed around the gate driving panel circuit area GPCA.

For example, the clock signal line area CLA and the first power line area PLA1 can be positioned on one side of the gate driving panel circuit area GPCA, and the first power line area PLA1 can be positioned between the clock signal line area CLA and the gate driving panel circuit area GPCA. The second power line area PLA2 can be positioned on the other side of the gate driving panel circuit area GPCA. The second power line area PLA2 can be positioned between the gate driving panel circuit area GPCA and the display area DA. The gate driving panel circuit area GPCA can be positioned on one side of the second power line area PLA2, and the display area DA can be positioned on the other side of the second power line area PLA2.

The clock signal line area CLA can be included in the gate bezel area GBA in the non-display area NDA, and can be an area in which a plurality of clock signal lines for supplying a plurality of clock signals to the gate driving panel circuit GPC are disposed.

The first power line area PLA1 can be included in the gate bezel area GBA in the non-display area NDA, and can be an area in which at least one gate high-potential voltage line for supplying at least one gate high-potential voltage to the gate driving panel circuit GPC is disposed.

For example, a plurality of gate high-potential voltage lines for supplying a plurality of gate high-potential voltages to the gate driving panel circuit GPC can be disposed in the first power line area PLA1. For example, the plurality of gate high-potential voltages can all have the same high-potential voltage value, or alternatively, some of the plurality of gate high-potential voltages can have different high-potential voltage values. The plurality of gate high-potential voltages can be high-potential voltages of different uses.

At least one control signal line for transferring at least one control signal to the gate driving panel circuit GPC can be further disposed in the first power line area PLA1. For example, the at least one control signal can include at least one of a start signal VST, a reset signal RST, and a line selection signal LSP.

The second power line area PLA2 can be included in the gate bezel area GBA in the non-display area NDA, and can be an area in which at least one gate low-potential voltage line for supplying at least one gate low-potential voltage to the gate driving panel circuit GPC is disposed.

For example, a plurality of gate low-potential voltage lines for supplying a plurality of gate low-potential voltages to the gate driving panel circuit GPC can be disposed in the first power line area PLA1. For example, the plurality of gate low-potential voltages can all have the same low-potential voltage value, or alternatively, some of the plurality of gate high-potential voltages can have different low-potential voltage values. The plurality of gate low-potential voltages can be low-potential voltages of different uses.

When the gate driving panel circuit GPC is of the second type, the clock signal line area CLA can include a scan clock signal line area SCC and a carry clock signal line area CRC.

The scan clock signal line area SCC can be an area in which scan clock signal lines for transferring scan clock signals to the gate driving panel circuit GPC are disposed.

The carry clock signal line area CRC can be an area in which carry clock signal lines for transferring carry clock signals to the gate driving panel circuit GPC are disposed.

When the gate driving panel circuit GPC is of the second type, the clock signal line area CLA does not include the sensing clock signal line area.

Among the scan clock signal line area SCC and the carry clock signal line area CRC, the scan clock signal line area SCC can be positioned farther from the display area DA or the gate driving panel circuit area GPCA than the carry clock signal line area CRC, and the carry clock signal line area CRC can be positioned closer to the display area DA or the gate driving panel circuit area GPCA than the scan clock signal line area SCC.

Alternatively, the carry clock signal line area CRC can be positioned farther from the display area DA or the gate driving panel circuit area GPCA than the scan clock signal line area SCC. The scan clock signal line area SCC can be positioned closer to the display area DA or the gate driving panel circuit area GPCA than the carry clock signal line area CRC.

When the gate driving panel circuit GPC is of the second type, the gate driving panel circuit GPC disposed in the gate driving panel circuit area GPCA can include the first gate driving panel circuit GPC #1 or the like.

The first gate driving panel circuit GPC #1 can include a first output buffer block BUF #1, a first logic block LOGIC #1, and a first real-time sensing control block RT #1.

The first output buffer block BUF #1 can be configured to output two or more scan signals SC to two or more scan signal lines SCL. For example, the first output buffer block BUF #1 can be configured to output the four scan signals SC1, SC2, SC3, and SC4 to the four scan signal lines SCL1, SCL2, SCL3, and SCL4, respectively.

The four scan signals SC1, SC2, SC3, and SC4 can include a first scan signal SC1 corresponding to an nth scan signal SC(n), a second scan signal SC2 corresponding to an (n+1)th scan signal SC(n+1), a third scan signal SC3 corresponding to an (n+2)th scan signal SC(n+2), and a fourth scan signal SC4 corresponding to an (n+3)th scan signal SC(n+3).

The first scan signal SC1 can be applied to the first scan signal line SCL1, the second scan signal SC2 can be applied to the second scan signal line SCL2, the third scan signal SC3 can be applied to the third scan signal line SCL3, and the fourth scan signal SC4 can be applied to the fourth scan signal line SCL4.

The first logic block LOGIC #1 can be configured to control the operation of the first output buffer block BUF #1 by controlling the voltage of each of the Q node and the QB node.

The first real-time sensing control block RT #1 can be configured to control the operation of the first output buffer block BUF #1 to output the first scan signal SC1 for sensing driving to the first subpixel SP where the real-time sensing driving is to be performed by controlling the voltage of each of the Q node and the QB node of the first gate driving panel circuit GPC #1 during the first real-time sensing driving period.

As the gate driving panel circuit area GPCA is disposed between the first power line area PLA1 and the second power line area PLA2, the first power line area PLA1 and the second power line area PLA2 can be separated by the gate driving panel circuit area GPCA.

Accordingly, at least one gate high-potential voltage line disposed in the first power line area PLA1 and at least one gate low-potential voltage line disposed in the second power line area PLA2 can be separated by the gate driving panel circuit GPC disposed in the gate driving panel circuit area GPCA.

According to the above-described power supply arrangement, at least one high-potential voltage line and at least one low-potential voltage line do not overlap each other, and thus, the high-potential voltages (GVDD, GVDD2, GVDD_o/GVDD_e of FIG. 16) and the low-potential voltages (GVSS0, GVSS1, and GVSS2) can be stabilized.

Figure 16:
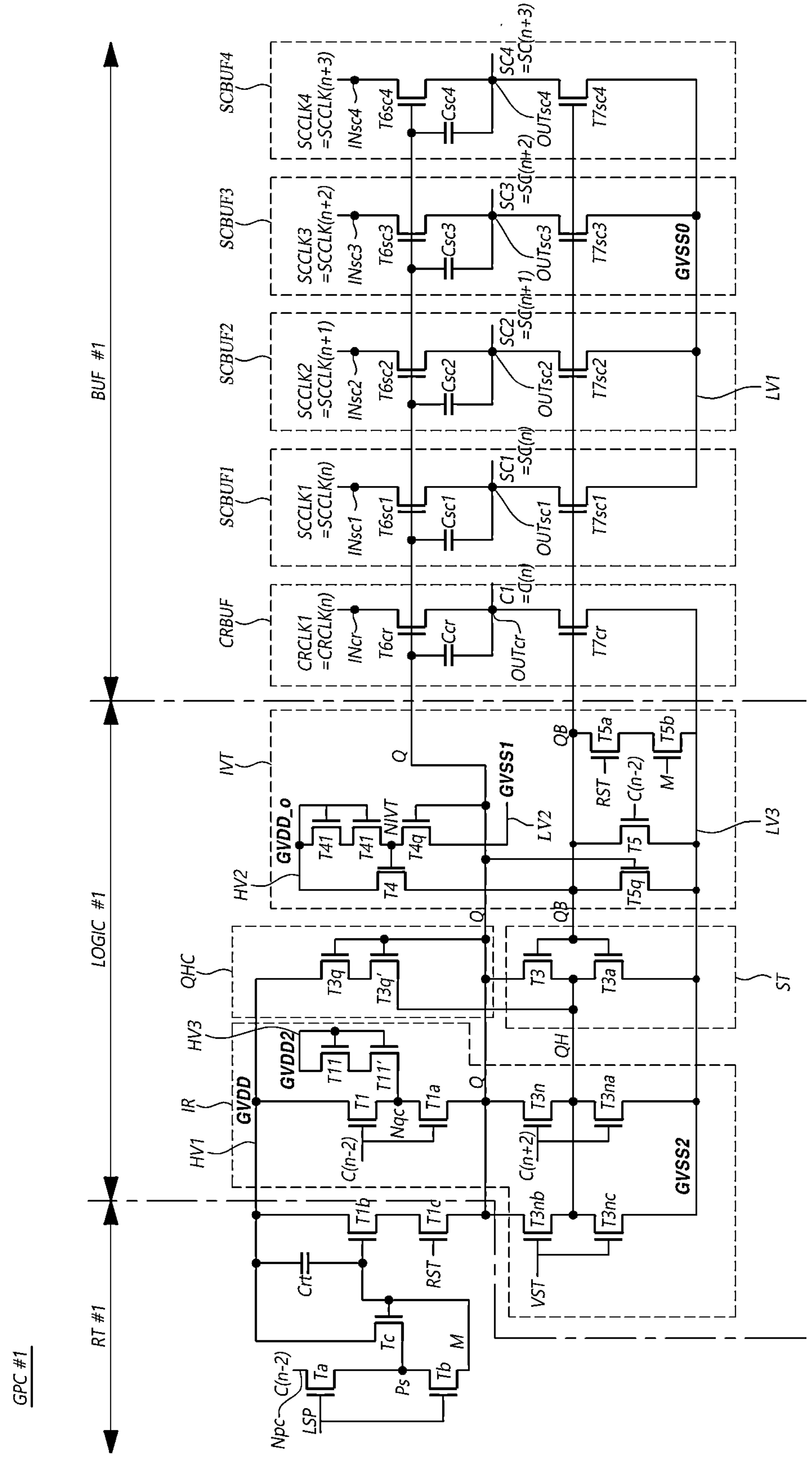
FIG. 16 illustrates a first gate driving panel circuit included in a gate driving panel circuit when the gate driving panel circuit is of a second type according to embodiments of the disclosure.

FIG. 16 illustrates a first gate driving panel circuit included in a gate driving panel circuit when the gate driving panel circuit is of a second type according to embodiments of the disclosure.

Hereinafter, for convenience of description, the nth scan signal SC(n) is referred to as the first scan signal SC1, the (n+1)th scan signal SC(n+1) is referred to as the second scan signal SC2, the (n+2)th scan signal SC(n+2) is referred to as the third scan signal SC3, and the (n+3)th scan signal SC(n+3) is referred to as the fourth scan signal SC4.

Hereinafter, for convenience of description, the nth scan clock signal SCCLK(n) is referred to as the first scan clock signal SCCLK1, the (n+1)th scan clock signal SCCLK(n+1) is referred to as the second scan clock signal SCCLK2, the (n+2)th scan clock signal SCCLK(n+2) is referred to as the third scan clock signal SCCLK3, and the (n+3)th scan clock signal SCCLK(n+3) is referred to as the fourth scan clock signal SCCLK4.

Hereinafter, for convenience of description, the nth carry signal C(n) is referred to as the first carry signal C1, and the nth carry clock signal CRCLK(n) is referred to as the first carry clock signal CRCLK1. Referring to FIG. 16, the first gate driving panel circuit GPC #1 can include a first output buffer block BUF #1, a first logic block LOGIC #1, and a first real-time sensing control block RT #1.

As compared to the first type of first gate driving panel circuit GPC #1 illustrated in FIG. 12, the second type of first gate driving panel circuit GPC #1 illustrated in FIG. 16 has the same basic structure and configuration except that the input carry signals are somewhat different, and the first output buffer block BUF #1 is different. Accordingly, the following description of the second type of first gate driving panel circuit GPC #1 illustrated in FIG. 16 focuses primarily on differences from the first type of first gate driving panel circuit GPC #1 illustrated in FIG. 12.

Referring to FIG. 16, the first output buffer block BUF #1 can include a carry output buffer CRBUF and two or more scan output buffers. For example, the first output buffer block BUF #1 can include a carry output buffer CRBUF, a first scan output buffer SCBUF1, a second scan output buffer SCBUF2, a third scan output buffer SCBUF3, and a fourth scan output buffer SCBUF4.

The carry output buffer CRBUF can include a carry pull-up transistor T6*cr* and a carry pull-down transistor T7*cr*.

The carry pull-up transistor T6*cr* can be turned on or off according to the voltage of the Q node, thereby controlling the connection between the carry clock node INcr to which the first carry clock signal CRCLK1 is input and the carry output node OUTcr where the first carry signal C1 is output.

The gate node of the carry pull-up transistor T6*cr* can be the Q node or can be electrically connected to the Q node. The source node (or drain node) of the carry pull-up transistor T6*cr* can be the carry output node OUTcr or can be electrically connected to the carry output node OUTcr. The drain node (or source node) of the carry pull-up transistor T6*cr* can be the carry clock node INcr or can be electrically connected to the carry clock node INcr.

The carry pull-up transistor T6*cr* can be turned on to output the first carry clock signal CRCLK1 as the first carry signal C1 having a high-level voltage.

The carry output buffer CRBUF can further include a carry bootstrapping capacitor Ccr connected between the gate node and the source node (or the drain node) of the carry pull-up transistor T6*cr*.

The carry-pull-down transistor T7*cr* can be turned on or off according to the voltage of the QB node, thereby controlling the connection between the third gate low-potential node LV3 to which the third gate low-potential voltage GVSS2 is input and the carry output node OUTcr where the first carry signal C1 is output.

The gate node of the carry pull-down transistor T7*cr* can be the QB node or can be electrically connected to the QB node. The drain node or the source node of the carry pull-down transistor T7*cr* can be the third gate low-potential node LV3 or can be electrically connected to the third gate low-potential node LV3, and the source node or the drain node of the carry pull-down transistor T7*cr* can be the carry output node OUTcr or can be electrically connected to the carry output node OUTcr. The carry pull-down transistor T7*cr* can be turned on to output the third gate low-potential voltage GVSS2 as the first carry signal C1 having a low-level voltage.

The first scan output buffer SCBUF1 can be configured to output the first scan signal SC1 having a turn-on level voltage or a turn-off level voltage to the first scan output node OUTsc1. The first scan signal SC1 output to the first scan output node OUTsc1 can be applied to the first scan signal line SCL1 electrically connected to the first scan output node OUTsc1.

The first scan output buffer SCBUF1 can include a first scan pull-up transistor T6*sc*1 and a first scan pull-down transistor T7*sc*1.

The first scan pull-up transistor T6*sc*1 can be turned on or off according to the voltage of the Q node, thereby controlling the connection between the first scan clock node INsc1 to which the first scan clock signal SCCLK1 is input and the first scan output node OUTsc1 where the first scan signal SC1 is output.

The gate node of the first scan pull-up transistor T6*sc*1 can be the Q node or can be electrically connected to the Q node. The source node (or drain node) of the first scan pull-up transistor T6*sc*1 can be the first scan output node OUTsc1 or can be electrically connected to the first scan output node OUTsc1. The drain node (or source node) of the first scan pull-up transistor T6*sc*1 can be the first scan clock node INsc1 or can be electrically connected to the first scan clock node INsc1.

The first scan pull-up transistor T6*sc*1 can be turned on to output the first scan clock signal SCCLK1, as the first scan signal SC1 having a turn-on level voltage (e.g., a high-level voltage), to the first scan output node OUTsc1.

The first scan output buffer SCBUF1 can further include a first scan bootstrapping capacitor Csc1 connected between the gate node and the source node (or the drain node) of the first scan pull-up transistor T6*sc*1.

The first scan pull-down transistor T7*sc*1 can be turned on or off according to the voltage of the QB node, thereby controlling the connection between the first gate low-potential node LV1 to which the first gate low-potential voltage GVSS0 is input and the first scan output node OUTsc1 where the first scan signal SC1 is output.

The gate node of the first scan pull-down transistor T7*sc*1 can be the QB node or can be electrically connected to the QB node. The drain node or the source node of the first scan pull-down transistor T7*sc*1 can be the first gate low-potential node LV1 or can be electrically connected to the first gate low-potential node LV1. The source node or the drain node of the first scan pull-down transistor T7*sc*1 can be the first scan output node OUTsc1 or can be electrically connected to the first scan output node OUTsc1.

The first scan pull-down transistor T7*sc*1 can be turned on to output the first gate low-potential voltage GVSS0, as the first scan signal SC1 having a turn-off level voltage (e.g., a low-level voltage), to the first scan output node OUTsc1.

The second scan output buffer SCBUF2 can be configured to output the second scan signal SC2 having the turn-on level voltage or the turn-off level voltage to the second scan output node OUTsc2. The second scan signal SC2 output to the second scan output node OUTsc2 can be applied to the second scan signal line SCL2 electrically connected to the second scan output node OUTsc2.

The second scan output buffer SCBUF2 can include a second scan pull-up transistor T6*sc*2 and a second scan pull-down transistor T7*sc*2.

The second scan pull-up transistor T6*sc*2 can be turned on or off according to the voltage of the Q node, thereby controlling the connection between the second scan clock node INsc2 to which the second scan clock signal SCCLK2 is input and the second scan output node OUTsc2 where the second scan signal SC2 is output.

The gate node of the second scan pull-up transistor T6*sc*2 can be the Q node or can be electrically connected to the Q node. The source node (or drain node) of the second scan pull-up transistor T6*sc*2 can be the second scan output node OUTsc2 or can be electrically connected to the second scan output node OUTsc2. The drain node (or source node) of the second scan pull-up transistor T6*sc*2 can be the second scan clock node INsc2 or can be electrically connected to the second scan clock node INsc2.

The second scan pull-up transistor T6*sc*2 can be turned on to output the second scan clock signal SCCLK2, as the second scan signal SC2 having a turn-on level voltage (e.g., a high-level voltage), to the second scan output node OUTsc2.

The second scan output buffer SCBUF2 can further include a second scan bootstrapping capacitor Csc2 connected between the gate node and the source node (or the drain node) of the second scan pull-up transistor T6*sc*2.

The second scan pull-down transistor T7*sc*2 can be turned on or off according to the voltage of the QB node, thereby controlling the connection between the first gate low-potential node LV1 to which the first gate low-potential voltage GVSS0 is input and the second scan output node OUTsc2 where the second scan signal SC2 is output.

The gate node of the second scan pull-down transistor T7*sc*2 can be the QB node or can be electrically connected to the QB node. The drain node or the source node of the second scan pull-down transistor T7*sc*2 can be the first gate low-potential node LV1 or can be electrically connected to the first gate low-potential node LV1. The source node or drain node of the second scan pull-down transistor T7*sc*2 can be the second scan output node OUTsc2 or can be electrically connected to the second scan output node OUTsc2.

The second scan pull-down transistor T7*sc*2 can be turned on to output the first gate low-potential voltage GVSS0, as the second scan signal SC2 having a turn-off level voltage (e.g., a low-level voltage), to the second scan output node OUTsc2.

The third scan output buffer SCBUF3 can be configured to output the third scan signal SC3 having a turn-on level voltage or a turn-off level voltage to the third scan output node OUTsc3. The third scan signal SC3 output to the third scan output node OUTsc3 can be applied to the third scan signal line SCL3 electrically connected to the third scan output node OUTsc3.

The third scan output buffer SCBUF3 can include a third scan pull-up transistor T6*sc*3 and a third scan pull-down transistor T7*sc*3.

The third scan pull-up transistor T6*sc*3 can be turned on or off according to the voltage of the Q node, thereby controlling the connection between the third scan clock node INsc3 to which the third scan clock signal SCCLK3 is input and the third scan output node OUTsc3 where the third scan signal SC3 is output.

The gate node of the third scan pull-up transistor T6*sc*3 can be the Q node or can be electrically connected to the Q node. The source node (or drain node) of the third scan pull-up transistor T6*sc*3 can be the third scan output node OUTsc3 or can be electrically connected to the third scan output node OUTsc3. The drain node (or source node) of the third scan pull-up transistor T6*sc*3 can be the third scan clock node INsc3 or can be electrically connected to the third scan clock node INsc3.

The third scan pull-up transistor T6*sc*3 can be turned on to output the third scan clock signal SCCLK3, as the third scan signal SC3 having a turn-on level voltage (e.g., a high-level voltage), to the third scan output node OUTsc3.

The third scan output buffer SCBUF3 can further include a third scan bootstrapping capacitor Csc3 connected between the gate node and the source node (or the drain node) of the third scan pull-up transistor T6*sc*3.

The third scan pull-down transistor T7*sc*3 can be turned on or off according to the voltage of the QB node, thereby controlling the connection between the first gate low-potential node LV1 to which the first gate low-potential voltage GVSS0 is input and the third scan output node OUTsc3 where the third scan signal SC3 is output.

The gate node of the third scan pull-down transistor T7*sc*3 can be the QB node or can be electrically connected to the QB node. The drain node or the source node of the third scan pull-down transistor T7*sc*3 can be the first gate low-potential node LV1 or can be electrically connected to the first gate low-potential node LV1. The source node or drain node of the third scan pull-down transistor T7*sc*3 can be the third scan output node OUTsc3 or can be electrically connected to the third scan output node OUTsc3.

The third scan pull-down transistor T7*sc*3 can be turned on to output the first gate low-potential voltage GVSS0, as the third scan signal SC3 having a turn-off level voltage (e.g., a low-level voltage), to the third scan output node OUTsc3.

The fourth scan output buffer SCBUF4 can be configured to output the fourth scan signal SC4 having the turn-on level voltage or the turn-off level voltage to the fourth scan output node OUTsc4. The fourth scan signal SC4 output to the fourth scan output node OUTsc4 can be applied to the fourth scan signal line SCL4 electrically connected to the fourth scan output node OUTsc4.

The fourth scan output buffer SCBUF4 can include a fourth scan pull-up transistor T6*sc*4 and a fourth scan pull-down transistor T7*sc*4.

The fourth scan pull-up transistor T6*sc*4 can be turned on or off according to the voltage of the Q node, thereby controlling the connection between the fourth scan clock node INsc4 to which the fourth scan clock signal SCCLK4 is input and the fourth scan output node OUTsc4 where the fourth scan signal SC4 is output.

The gate node of the fourth scan pull-up transistor T6*sc*4 can be the Q node or can be electrically connected to the Q node. The source node (or drain node) of the fourth scan pull-up transistor T6*sc*4 can be the fourth scan output node OUTsc4 or can be electrically connected to the fourth scan output node OUTsc4. The drain node (or source node) of the fourth scan pull-up transistor T6*sc*4 can be the fourth scan clock node INsc4 or can be electrically connected to the fourth scan clock node INsc4.

The fourth scan pull-up transistor T6*sc*4 can be turned on to output the fourth scan clock signal SCCLK4, as the fourth scan signal SC4 having a turn-on level voltage (e.g., a high-level voltage), to the fourth scan output node OUTsc4.

The fourth scan output buffer SCBUF4 can further include a fourth scan bootstrapping capacitor Csc4 connected between the gate node and the source node (or the drain node) of the fourth scan pull-up transistor T6*sc*4.

The fourth scan pull-down transistor T7*sc*4 can be turned on or off according to the voltage of the QB node, thereby controlling the connection between the first gate low-potential node LV1 to which the first gate low-potential voltage GVSS0 is input and the fourth scan output node OUTsc4 where the fourth scan signal SC4 is output.

The gate node of the fourth scan pull-down transistor T7*sc*4 can be the QB node or can be electrically connected to the QB node. The drain node or the source node of the fourth scan pull-down transistor T7*sc*4 can be the first gate low-potential node LV1 or can be electrically connected to the first gate low-potential node LV1. The source node or drain node of the fourth scan pull-down transistor T7*sc*4 can be the fourth scan output node OUTsc4 or can be electrically connected to the fourth scan output node OUTsc4.

The fourth scan pull-down transistor T7*sc*4 can be turned on to output the first gate low-potential voltage GVSS0, as the fourth scan signal SC4 having a turn-off level voltage (e.g., a low-level voltage), to the fourth scan output node OUTsc4.

The respective gate nodes of the carry pull-up transistor T6*cr*, the first scan pull-up transistor T6*sc*1, the second scan pull-up transistor T6*sc*2, the third scan pull-up transistor T6*sc*3, and the fourth scan pull-up transistor T6*sc*4 included in the first output buffer block BUF #1 can be electrically connected.

The Q node can be shared by the carry output buffer CRBUF, the first scan output buffer SCBUF1, the second scan output buffer SCBUF2, the third scan output buffer SCBUF3, and the fourth scan output buffer SCBUF4 included in the first output buffer block BUF #1. The Q node can be electrically connected to the respective gate nodes of the carry pull-up transistor T6*cr*, the first scan pull-up transistor T6*sc*1, the second scan pull-up transistor T6*sc*2, the third scan pull-up transistor T6*sc*3, and the fourth scan pull-up transistor T6*sc*4. This structure can also be referred to as a "Q node sharing structure".

The respective gate nodes of the carry-pull-down transistor T7*cr*, the first scan-pull-down transistor T7*sc*1, the second scan-pull-down transistor T7*sc*2, the third scan-pull-down transistor T7*sc*3, and the fourth scan-pull-down transistor T7*sc*4 included in the first output buffer block BUF #1 can be connected.

The QB node can be shared by the carry output buffer CRBUF, the first scan output buffer SCBUF1, the second scan output buffer SCBUF2, the third scan output buffer SCBUF3, and the fourth scan output buffer SCBUF4 included in the first output buffer block BUF #1. The QB node can be electrically connected to the respective gate nodes of the carry-pull-down transistor T7*cr*, the first scan-pull-down transistor T7*sc*1, the second scan-pull-down transistor T7*sc*2, the third scan-pull-down transistor T7*sc*3, and the fourth scan-pull-down transistor T7*sc*4 included in the first output buffer block BUF #1.

The first logic block LOGIC #1 is the circuit block for controlling the voltages of the Q node and the QB node to control the operation of the first output buffer block BUF #1, and can include an input/reset block IR, a stabilization block ST, and an inverter block IVT.

The first logic block LOGIC #1 can further include a holding node control block QHC for controlling the voltage of the holding node QH node. The holding node control block QHC can be connected between the first gate high-potential node HV1 and the holding node QH node.

The first logic block LOGIC #1 illustrated in FIG. 16 is the same as the circuit configuration of the first logic block LOGIC #1 illustrated in FIG. 12, except for the following matters.

As a first difference, in the input/reset block IR of the first logic block LOGIC #1 illustrated in FIG. 16, the gate node of the first Q node charge transistor T1 and the gate node of the second Q node charge transistor T1*a* can be electrically connected to each other to receive the (n−2)th carry signal C(n−2) together, and the gate node of the first Q node discharge transistor T3*n* and the gate node of the second Q node discharge transistor T3*na* can be electrically connected to each other to receive the (n+2)th carry signal C(n+2) together.

As a second difference, in the inverter block IVT of the first logic block LOGIC #1 illustrated in FIG. 16, the (n−2)th carry signal C(n−2) can be input to the gate node of the first QB node discharge transistor T5.

Hereinafter, the circuit configuration of the first logic block LOGIC #1 illustrated in FIG. 16 will be briefly described.

Referring to FIG. 16, the input/reset block IR is a circuit block for controlling charging and discharging of the Q node, and can include a Q node charging block connected between the first gate high-potential node HV1 and the Q node and a Q node discharging block connected between the Q node and the third gate low-potential node LV3. Here, the first gate high-potential voltage GVDD can be input to the first gate high-potential node HV1. The third gate low-potential voltage GVSS2 can be input to the third gate low-potential node LV3.

The Q node charge block of the input/reset block IR can include at least one Q node charge transistor for controlling the connection between the first gate high-potential node HV1 and the Q node by being turned on or off according to the (n−2)th carry signal C(n−2) to charge the Q node.

For example, the Q node charge block of the input/reset block IR can include a first Q node charge transistor T1 and a second Q node charge transistor T1*a* connected in series between the first gate high-potential node HV1 and the Q node.

The Q node charge block of the input/reset block IR can further include a first Q node charge control transistor T11 and a second Q node charge control transistor T11' connected in series between the third gate high-potential node HV3 and the Q node charge control node Nqc to control the Q node charge control node Nqc. Here, the third gate high-potential voltage GVDD2 can be applied to the third gate high-potential node HV3.

The Q node discharge block of the input/reset block IR can include a first Q node discharge transistor T3*n* and a second Q node discharge transistor T3*na* connected in series between the Q node and the third gate low-potential node LV3 to discharge the Q node.

The Q node discharge block of the input/reset block IR can further include a third Q node discharge transistor T3*nb* and a fourth Q node discharge transistor T3*nc* connected in series between the Q node and the third gate low-potential node LV3 to discharge the Q node.

The stabilization block ST can be a circuit block that stabilizes the Q node and the output according to the voltage of the QB node during a period when the output signal of the gate driving panel circuit GPC has a turn-off level voltage.

The stabilization block ST can include a first stabilization transistor T3 and a second stabilization transistor T3*a* that are turned on or off according to the voltage of the QB node to control the connection between the Q node and the third gate low-potential node LV3.

The inverter block IVT can be a circuit block that controls the inverted voltage level of the voltage level of the Q node to be the voltage level of the QB node according to the voltage of the Q node.

The inverter block IVT can include a QB node charge transistor T4 for charging the QB node.

The inverter block IVT can further include a first inverter control transistor T4*q* for controlling the voltage of the inverter control node NIVT corresponding to the gate node of the QB node charge transistor T4.

The inverter block IVT can further include a second inverter control transistor T41 for controlling the voltage of the inverter control node NIVT.

Further, to discharge the QB node, the inverter block IVT can include a first QB node discharge transistor T5 connected between the QB node and the third gate low-potential node LV3 and turned on or off according to the (n−2)th carry signal C(n−2).

To discharge the QB node, the inverter block IVT can further include a second QB node discharge transistor T5*q* connected between the QB node and the third gate low-potential node LV3 and turned on or off according to a voltage of the Q node.

The inverter block IVT can further include a third QB node discharge transistor T5*a* and a fourth QB node discharge transistor T5*b* connected in series between the QB node and the third gate low-potential node LV3 to discharge the QB node.

Among the plurality of QB node discharge transistors T5, T5*q*, T5*a*, and T5*b* included in the inverter block IVT, the first QB node discharge transistor T5 and the second QB node discharge transistor T5*q* can be configured to discharge the QB node for display driving during the active period ACT, and the third QB node discharge transistor T5*a* and the fourth QB node discharge transistor T5*b* can be configured to discharge the QB node for sensing driving during the blank period BLANK.

The holding node control block QHC can include a first holding node control transistor T3*q* and a second holding node control transistor T3*q*' connected in series between the first gate high-potential node HV1 and the holding node QH node.

The respective gate nodes of the first holding node control transistor T3*q* and the second holding node control transistor T3*q*' can be connected to the Q node together.

The first real-time sensing control block RT #1 can be a circuit block for controlling the operation of the first logic block LOGIC #1 for real-time sensing driving. The first real-time sensing control block RT #1 can be configured to control the voltage of the Q node such that the first scan signal SC1 is output at a predetermined timing by the first output buffer block BUF #1 during the blank period BLANK.

The first real-time sensing control block RT #1 can control the first scan signal SC1 to be output to one of the plurality of scan signal lines SCL by the first output buffer block BUF #1 during the blank period BLANK. Accordingly, sensing can be performed on the subpixel SP included in any one of the plurality of subpixel lines.

The first real-time sensing control block RT #1 can include a first sensing control transistor Ta, a second sensing control transistor Tb, a third sensing control transistor Tc, a fourth sensing control transistor T1*b*, and a fifth sensing control transistor T1*c*.

The first real-time sensing control block RT #1 can include a sensing control capacitor Crt connected between the first gate high-potential node HV1 and the intermediate node M.

Figure 17A:
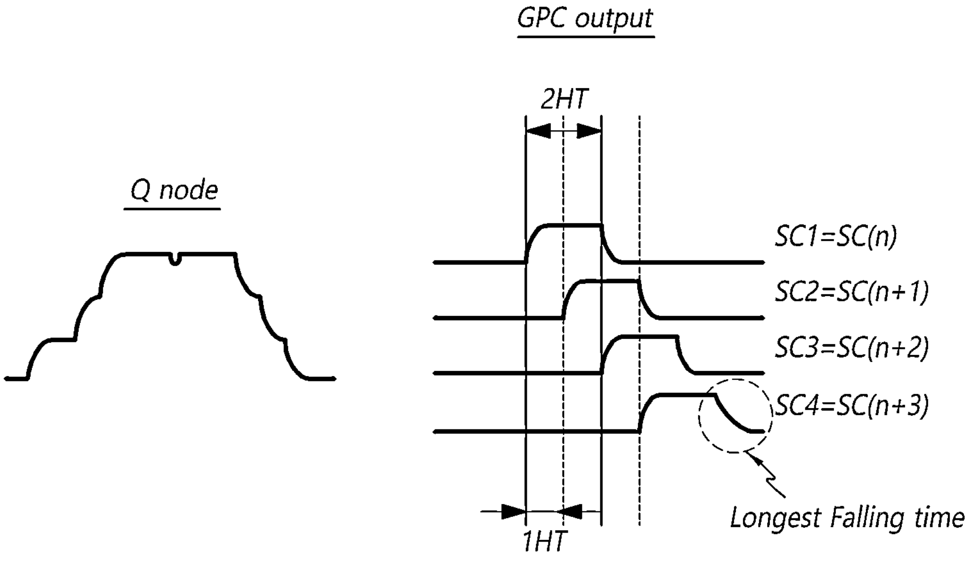
FIG. 17A illustrates a variation in voltage at Q node and output of a first gate driving panel circuit included in a gate driving panel circuit when the gate driving panel circuit is of a second type according to embodiments of the disclosure.

FIG. 17A illustrates a variation in voltage at Q node and output of a first gate driving panel circuit included in a gate driving panel circuit when the gate driving panel circuit is of a second type according to embodiments of the disclosure.

Referring to FIG. 17A, two or more voltage rises (boosting) can occur during the voltage rising process of the Q node of the first gate driving panel circuit GPC #1.

When the Q node of the first gate driving panel circuit GPC #1 has a high-level voltage, the first gate driving panel circuit GPC #1 can sequentially output the first to fourth scan signals SC1, SC2, SC3, and SC4 having the high-level voltage.

The temporal length of the high-level voltage section of each of the first to fourth scan signals SC1, SC2, SC3, and SC4 can be the 2-horizontal time 2HT.

The high-level voltage section of two scan signals temporally adjacent to each other among the first to fourth scan signals SC1, SC2, SC3, and SC4 can temporally overlap each other. The length at which high-level voltage sections of two adjacent scan signals temporally overlap can be 1 horizontal time 1HT.

The high-level voltage section of the first scan signal SC1 and the high-level voltage section of the second scan signal SC2 can temporally overlap each other. The high-level voltage section of the second scan signal SC2 and the high-level voltage section of the third scan signal SC3 can temporally overlap each other. The high-level voltage section of the third scan signal SC3 and the high-level voltage section of the fourth scan signal SC4 can temporally overlap each other.

As described above, a gate driving method in which high-level voltage sections of two scan signals output immediately adjacent to each other temporally overlap each other temporally can be referred to as an "overlap gate driving method".

According to the Q node sharing structure and the overlap gate driving, the length of the falling section (the section in which the voltage level decreases) of the fourth scan signal SC4 output last among the first to fourth scan signals SC1, SC2, SC3, and SC4 output from the first output buffer block BUF #1 sharing one Q node can be the longest. The fact that the length (falling length) of the falling section (voltage drop section) of the last output fourth scan signal SC4 is the longest can mean that the falling time (voltage drop time) is the longest.

Figure 17B:
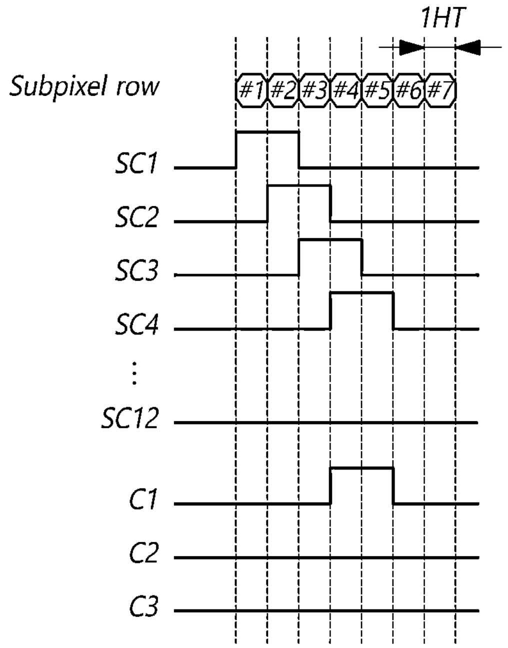
FIG. 17B illustrates scan signals and carry signals generated in a gate driving panel circuit when the gate driving panel circuit is of a second type according to embodiments of the disclosure.

FIG. 17B illustrates scan signals SC1 to SC12 and carry signals C1 to C3 generated by a gate driving panel circuit GPC when the gate driving panel circuit GPC is of a second type according to embodiments of the disclosure.

Referring to FIG. 17B, the gate driving panel circuit GPC can supply a corresponding scan signal to each of a plurality of subpixel rows #1, #2, #3, . . . . The gate driving panel circuit GPC can supply a first scan signal SC1 to a first subpixel row #1, can supply a second scan signal SC2 to a second subpixel row #2, and can supply a third scan signal SC3 to a third subpixel row #3.

The temporal length of the high-level voltage interval of each of the scan signals SC1 to SC12 can be a 2 horizontal time 2HT. The second half of the high-level voltage section of the first scan signal SC1 and the first half of the high-level voltage section of the second scan signal SC2 can overlap each other by 1 horizontal time HT. The second half of the high-level voltage section of the second scan signal SC2 and the first half of the high-level voltage section of the third scan signal SC3 can overlap each other by 1 horizontal time HT.

The gate driving panel circuit GPC can internally output the carry signals C1 to C3.

The temporal length of the high-level voltage section of each of the carry signals C1 to C3 can be 2 horizontal time 2HT. During the operation period for outputting the first carry signal C1, the first to fourth scan signals SC1, SC2, SC3, and SC4 can be sequentially output.

The first half of the high-level voltage section of the first carry signal C1 can overlap the second half of the high-level voltage section of the third scan signal SC3. The high-level voltage section of the first carry signal C1 can overlap the high-level voltage section of the fourth scan signal SC4.

The high-level voltage section of the first carry signal C1 and the high-level voltage section of the second carry signal C2 may not overlap each other. The high-level voltage section of the second carry signal C2 and the high-level voltage section of the third carry signal C3 may not overlap each other.

Figure 18:
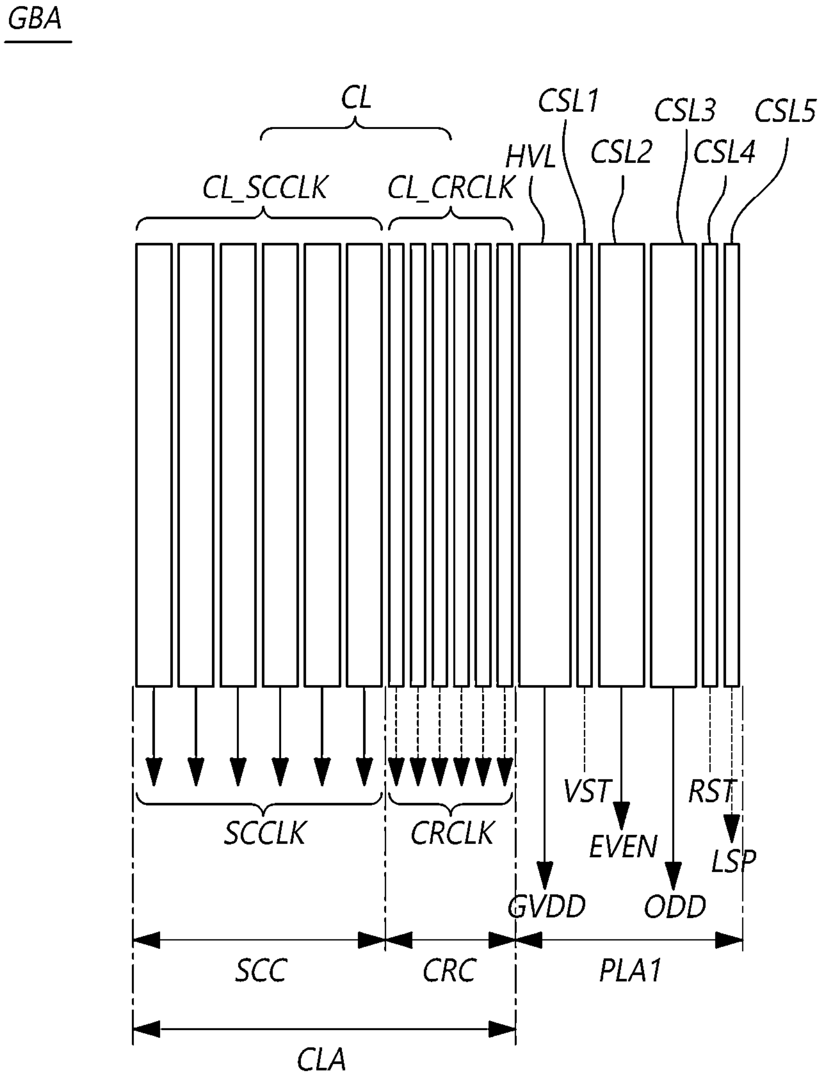
FIG. 18 is a view illustrating an arrangement of lines in a first power line area and a clock signal line area included in a gate bezel area when a gate driving panel circuit is of a second type according to embodiments of the disclosure.

FIG. 18 is a view illustrating an arrangement of lines in a first power line area and a clock signal line area included in a gate bezel area when a gate driving panel circuit is of a second type according to embodiments of the disclosure.

Referring to FIG. 18, the gate bezel area GBA of the display panel 110 can include a clock signal line area CLA and a first power line area PLA1. The clock signal line area CLA and the first power line area PLA1 can be positioned on one side of the second type of gate driving panel circuit area GPCA.

When the gate driving panel circuit GPC is of the second type, the plurality of clock signal lines CL disposed in the clock signal line area CLA can include a scan clock signal line area SCC and a carry clock signal line area CRC.

In the scan clock signal line area SCC, the scan clock signal lines CL_SCCLK for transferring the scan clock signals SCCLK to the gate driving panel circuit GPC can be disposed.

The carry clock signal lines CL_CRCLK for transferring the carry clock signals CRCCLK to the gate driving panel circuit GPC can be disposed in the carry clock signal line area CRC.

The scan clock signal line area SCC can be positioned farther away from the display area DA than the carry clock signal line area CRC. The carry clock signal line area CRC can be positioned closer to the display area DA than the scan clock signal line area SCC.

The scan clock signal line area SCC can be positioned farther away from the gate driving panel circuit area GPCA than the carry clock signal line area CRC. The carry clock signal line area CRC can be positioned closer to the gate driving panel circuit area GPCA than the scan clock signal line area SCC.

The width of one scan clock signal line CL_SCCLK can be larger than the width of one carry clock signal line CL_CRCLK.

In the first power line area PLA1, at least one gate high-potential voltage line HVL for transferring at least one gate high-potential voltage GVDD to the gate driving panel circuit GPC can be disposed.

Further, at least one control signal line can be additionally disposed in the first power line area PLA1. For example, the at least one control signal line can include at least one of a start signal line CSL1 for transferring a start signal VST for indicating the start of the gate driving operation to the gate driving panel circuit GPC, a first driving order control signal line CSL2 for transferring an even-numbered driving control signal EVEN to the gate driving panel circuit GPC, a second driving order control signal line CSL3 for transferring an odd-numbered driving control signal ODD to the gate driving panel circuit GPC, a reset signal line CSL4 for transferring a reset signal RST for indicating the end of the gate driving operation to the gate driving panel, and a line selection signal line CSL5 for transferring a line selection signal LSP to the gate driving panel circuit GPC.

The gate high-potential voltage line HVL can have a larger width than the start signal line CSL1, the reset signal line CSL4, and the line selection signal line CSL5.

The first driving order control signal line CSL2 and the second driving order control signal line CSL3 can be disposed in two specific line areas within the first power line area PLA1. As an example of changing the line arrangement, the first driving order control signal line CSL2 and the second driving order control signal line CSL3 may not be disposed in two specific line areas in the first power line area PLA1, but two gate high-potential voltage lines can be disposed.

Figure 19:
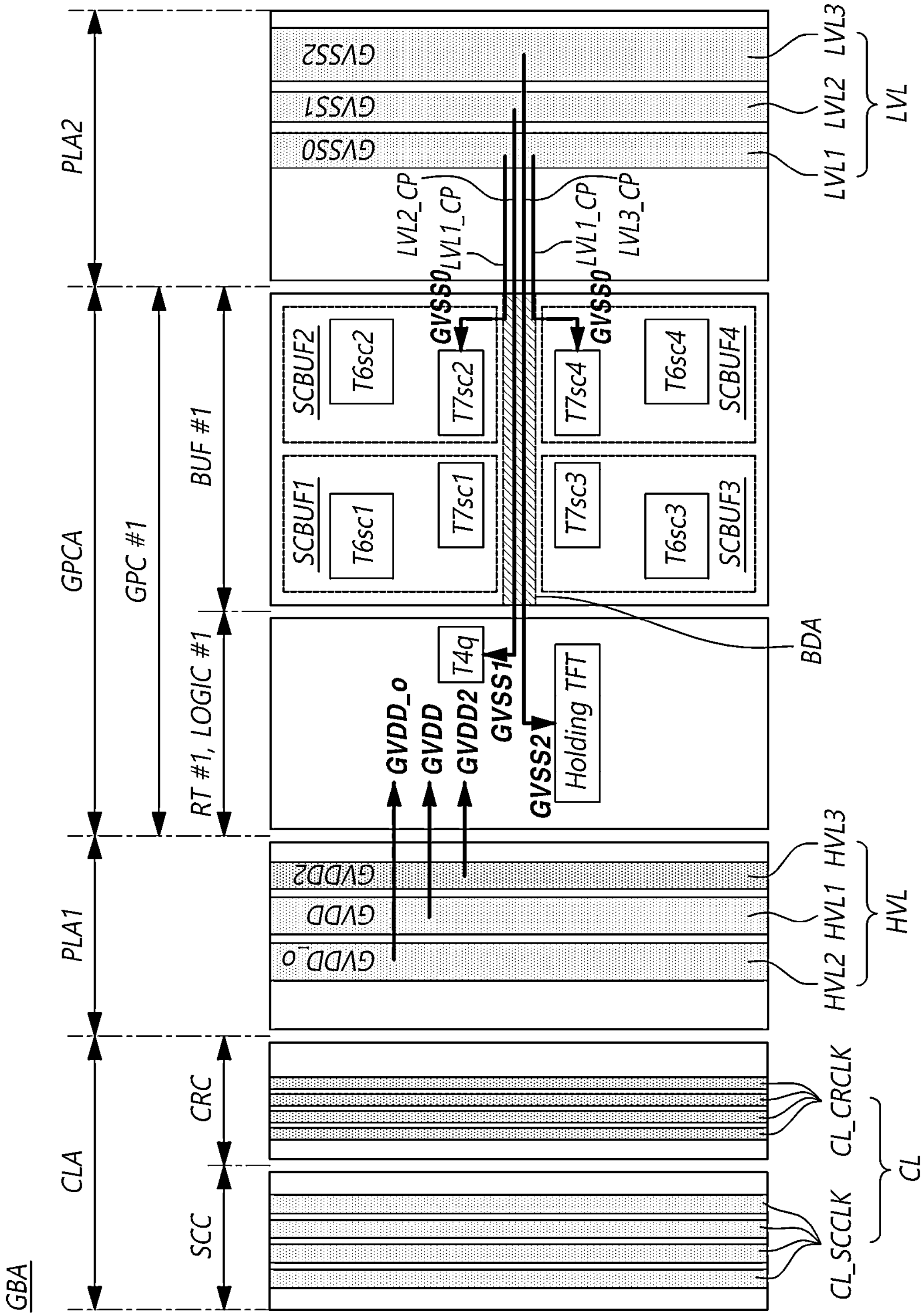
FIG. 19 is a plan view illustrating a gate bezel area in a display panel according to embodiments of the disclosure.

FIG. 19 is a plan view illustrating a gate bezel area in a display panel according to embodiments of the disclosure. It is assumed that the first gate driving panel circuit GPC #1 of the second type is disposed in the gate driving panel circuit area GPCA.

Referring to FIG. 19, a first output buffer block BUF #1, a first logic block LOGIC #1, and a first real-time sensing control block RT #1 can be disposed in the gate driving panel circuit area GPCA.

The first output buffer block BUF #1 can include a first scan output buffer SCBUF1 for outputting the first scan signal SC1, a second scan output buffer SCBUF2 for outputting the second scan signal SC2, a third scan output buffer SCBUF3 for outputting the third scan signal SC3, and a fourth scan output buffer SCBUF4 for outputting the fourth scan signal SC4.

The four scan output buffers SCBUF1 to SCBUF4 can include two upper scan output buffers disposed above the central area BDA and two lower scan output buffers disposed below the central area BDA. For example, the two upper scan output buffers can be a first scan output buffer SCBUF1 and a second scan output buffer SCBUF2, and the two lower scan output buffers can be a third scan output buffer SCBUF3 and a fourth scan output buffer SCBUF4. Accordingly, the first scan output buffer SCBUF1 and the second scan output buffer SCBUF2 can be positioned in a first direction with respect to the central area BDA, and the third scan output buffer SCBUF3 and the fourth scan output buffer SCBUF4 can be positioned in a direction opposite to the first direction with respect to the central area BDA.

The first scan output buffer SCBUF1 and the second scan output buffer SCBUF2, which are two upper scan output buffers, and the third scan output buffer SCBUF3 and the fourth scan output buffer SCBUF4, which are two lower scan output buffers, can have a symmetrical structure with respect to the central area BDA of the first output buffer block BUF #1.

The positions and/or shapes of the circuit components T7*sc*1, T7*sc*2, T6*sc*1, and T6*sc*2 included in each of the two upper scan output buffers and the circuit components T7*sc*3, T7*sc*4, T6*sc*3, and T6*sc*4 included in each of the two lower scan output buffers can be symmetrical with respect to the central area BDA.

The two upper scan output buffers can have a left-right symmetric structure. The two lower scan output buffers can have a left-right symmetric structure.

For example, the first scan output buffer SCBUF1 and the second scan output buffer SCBUF2 can be two upper scan output buffers disposed above the central area BDA, and the third scan output buffer SCBUF3 and the fourth scan output buffer SCBUF4 can be two lower scan output buffers disposed below the central area BDA.

For example, the two upper scan output buffers SCBUF1 and SCBUF2 and the two lower scan output buffers SCBUF3 and SCBUF4 can have a symmetrical structure with respect to the central area BDA. In other words, the positions and shapes of circuit components included in each of the two upper scan output buffers SCBUF1 and SCBUF2 and the two lower scan output buffers SCBUF3 and SCBUF4 can be symmetrical to each other with respect to the central area BDA.

For example, the two upper scan output buffers SCBUF1 and SCBUF2 can have a left-right symmetric structure. The two lower scan output buffers SCBUF3 and SCBUF4 can have a left-right symmetric structure.

The clock signal line area CLA can be positioned on one side of the gate driving panel circuit area GPCA, and can be an area in which a plurality of clock signal lines CL are disposed.

For example, the plurality of clock signal lines CL can include a plurality of scan clock signal lines CL_SCCLK and a plurality of carry clock signal lines CL_CRCLK.

Each of the plurality of scan clock signal lines CL_SCCLK and the plurality of carry clock signal lines CL_CRCLK can have a multi-layer line structure because load reduction is required for gate driving.

The scan clock signal SCCLK can be more sensitive to signal delay or signal waveform change in terms of driving than the carry clock signal CRCLK. Accordingly, to reduce the load of the plurality of scan clock signal lines CL_SCCLK, the line width of each of the plurality of scan clock signal lines CL_SCCLK can be designed to be larger than the line width of each of the plurality of carry clock signal lines CL_CRCLK.

The plurality of scan clock signal lines CL_SCCLK can be positioned farther from the first gate driving panel circuit GPC #1 than the plurality of carry clock signal lines CL_CRCLK.

The first power line area PLA1 can include a gate high-potential voltage line HVL positioned on one side of the gate driving panel circuit area GPCA and disposed in the column direction.

For example, the gate high-potential voltage line HVL can include a first gate high-potential voltage line HVL1 for transferring the first gate high-potential voltage GVDD to the first gate driving panel circuit GPC #1, a second gate high-potential voltage line HVL2 for transferring the second gate high-potential voltages GVDD_o and GVDD_e to the first gate driving panel circuit GPC #1, and a third gate high-potential voltage line HVL3 for transferring the third gate high-potential voltage GVDD2 to the first gate driving panel circuit GPC #1.

The first gate high-potential voltage line HVL1 can be the first gate high-potential node HV1 or can be electrically connected to the first gate high-potential node HV1. The second gate high-potential voltage line HVL2 can be the second gate high-potential node HV2 or can be electrically connected to the second gate high-potential node HV2. The third gate high-potential voltage line HVL3 can be the third gate high-potential node HV3 or can be electrically connected to the third gate high-potential node HV3.

The first gate high-potential voltage GVDD, the second gate high-potential voltages GVDD_o and GVDD_e, and the third gate high-potential voltage GVDD2 can be supplied to the first logic block LOGIC #1 included in the first gate driving panel circuit GPC #1.

Among the first gate high-potential voltage GVDD, the second gate high-potential voltages GVDD_o and GVDD_e, and the third gate high-potential voltage GVDD2, the first gate high-potential voltage GVDD can also be supplied to the first real-time sensing control block RT #1 included in the first gate driving panel circuit GPC #1.

The second power line area PLA2 can include a gate low-potential voltage line LVL positioned on the other side of the gate driving panel circuit area GPCA and disposed in the column direction.

For example, the gate low-potential voltage line LVL can include a first gate low-potential voltage line LVL1 for transferring the first gate low-potential voltage GVSS0 to the first gate driving panel circuit GPC #1, a second gate low-potential voltage line LVL2 for transferring the second gate low-potential voltage GVSS1 to the first gate driving panel circuit GPC #1, and a third gate low-potential voltage line LVL3 for transferring the third gate low-potential voltage GVSS2 to the first gate driving panel circuit GPC #1.

The first gate low-potential voltage line LVL1 can be the first gate low-potential node LV1 or can be electrically connected to the first gate low-potential node LV1. The second gate low-potential voltage line LVL2 can be the second gate low-potential node LV2 or can be electrically connected to the second gate low-potential node LV2. The third gate low-potential voltage line LVL3 can be the third gate low-potential node LV3 or can be electrically connected to the third gate low-potential node LV3.

The first gate low-potential voltage GVSS0 can be supplied to the first to fourth scan output buffers SCBUF1, SCBUF2, SCBUF3, and SCBUF4 included in the first output buffer block BUF #1 of the first gate driving panel circuit GPC #1.

The first gate low-potential voltage GVSS0 can be applied to the drain nodes or source nodes of the first to fourth scan pull-down transistors T7*sc*1, T7*sc*2, T7*sc*3, and T7*sc*4 respectively included in the first to fourth scan output buffers SCBUF1, SCBUF2, SCBUF3, and SCBUF4.

To that end, the display panel 110 can further include a plurality of gate low-potential voltage connection lines LVL1_CP, LVL2_CP, and LVL3_CP for connecting the plurality of gate low-potential voltage lines LVL1, LVL2, and LVL3 disposed in the second power line area PLA2 and the first gate driving panel circuit GPC #1 disposed in the gate driving panel circuit area GPCA.

The plurality of gate low-potential voltage connection lines LVL1_CP, LVL2_CP, and LVL3_CP can pass through the central area BDA in the area of the first output buffer block BUF #1.

The first gate low-potential voltage connection line LVL1_CP for electrically connecting the drain nodes or the source nodes of the first and second scan pull-down transistors T7*sc*1 and T7*sc*2 included in the two upper scan output buffers SCBUF1 and SCBUF2 to the first gate low-potential voltage line LVL1 can be disposed while extending in the row direction. The first gate low-potential voltage connection line LVL1_CP for electrically connecting the drain nodes or the source nodes of the third and fourth scan pull-down transistors T7*sc*3 and T7*sc*4 included in the two lower scan output buffers SCBUF3 and SCBUF4 to the first gate low-potential voltage line LVL1 can be disposed while extending in the row direction.

The first gate low-potential voltage connection line LVL1_CP can pass through the central area BDA between the two upper scan output buffers SCBUF1 and SCBUF2 and the two lower scan output buffers SCBUF3 and SCBUF4.

The second gate low-potential voltage GVSS1 can be supplied to the first logic block LOGIC #1 of the first gate driving panel circuit GPC #1.

The second gate low-potential voltage GVSS1 can be applied to the drain node or source node of the first inverter control transistor T4*q* included in the first logic block LOGIC #1.

To that end, the second gate low-potential voltage connection line LVL2_CP for connecting the drain node or the source node of the first inverter control transistor T4*q* included in the first logic block LOGIC #1 to the second gate low-potential voltage line LVL2 can be disposed while extending in the row direction.

The second gate low-potential voltage connection line LVL2_CP can pass through the central area BDA between the two upper scan output buffers SCBUF1 and SCBUF2 and the two lower scan output buffers SCBUF3 and SCBUF4.

The third gate low-potential voltage GVSS2 can be supplied to the first logic block LOGIC #1 of the first gate driving panel circuit GPC #1.

The third gate low-potential voltage GVSS2 can be applied to the drain nodes or source nodes of the holding transistors Holding TFT included in the first logic block LOGIC #1 and connected to the third gate low-potential node LV3. Here, the holding transistors Holding TFTs can include a second Q node discharge transistor T3*na*, a fourth Q node discharge transistor T3*nc*, a second stabilization transistor T3*a*, a second QB node discharge transistor T5*q*, a first QB node discharge transistor T5, and a fourth QB node discharge transistor T5*b*.

Further, the third gate low-potential voltage GVSS2 can be applied to the drain node or source node of the carry pull-down transistor T7*cr* included in the carry output buffer CRBUF of the first output buffer block BUF #1.

To that end, the third gate low-potential voltage connection line LVL3_CP for connecting the drain nodes or the source nodes of the holding transistors Holding TFT included in the first logic block LOGIC #1 and connected to the third gate low-potential node LV3 to the third gate low-potential voltage line LVL3 can be disposed while extending in the row direction.

The third gate low-potential voltage connection line LVL3_CP can connect the drain node or source node of the carry pull-down transistor T7*cr* included in the carry output buffer CRBUF of the first output buffer block BUF #1 to the third gate low-potential voltage line LVL3.

The third gate low-potential voltage connection line LVL3_CP can pass through the central area BDA between the two upper scan output buffers SCBUF1 and SCBUF2 and the two lower scan output buffers SCBUF3 and SCBUF4.

As described above, since the two upper scan output buffers SCBUF1 and SCBUF2 and the two lower scan output buffers SCBUF3 and SCBUF4 included in the first output buffer block BUF #1 have a symmetric structure with respect to the central area BDA, efficient transfer (supply) of the gate low-potential voltages GVSS0, GVSS1, and GVSS2 can be possible.

The use and structure of the first to third gate high-potential voltage lines HVL1, HVL2, and HVL3 and the use and structure of the first to third gate low-potential voltage lines LVL1, LVL2, and LVL3 are described below.

The first gate high-potential voltage GVDD transferred through the first gate high-potential voltage line HVL1 can be a high-potential voltage supplied to the Q node charge block of the input/reset block IR and used to charge the Q node. For example, the first gate high-potential voltage GVDD transferred through the first gate high-potential voltage line HVL1 can be a high-potential voltage used to charge the Q node by being connected to the drain node or source node of the first Q node charge transistor T1.

Further, the first gate high-potential voltage GVDD transferred through the first gate high-potential voltage line HVL1 can be a high-potential voltage supplied to the real-time sensing control block RT #1 and used to charge the Q node during the real-time sensing driving period.

The second gate high-potential voltages GVDD_o and GVDD_e transferred through the second gate high-potential voltage line HVL2 can be a high-potential voltage supplied to the inverter block IVT and used to charge the QB node.

The third gate high-potential voltage GVDD2 transferred through the third gate high-potential voltage line HVL3 can be applied to the drain node (or source node) and the gate node of the first Q node charge control transistor T11, and can be applied to the Q node charge control node Nqc through the first Q node charge control transistor T11. The first Q-node charge control transistor T11 can serve to compensate for the negative threshold voltage of the first Q-node charge transistor T1.

The first gate low-potential voltage GVSS0 transferred through the first gate low-potential voltage line LVL1 can be supplied to the first to fourth scan output buffers SCBUF1 to SCBUF4 of the first output buffer block BUF #1 to change the voltage levels of the first to fourth scan signals SC1 to SC4 to the turn-off voltage level, thereby turning off the driving of the first to fourth scan signal lines SCL1 to SCL4.

The second gate low-potential voltage GVSS1 transferred through the second gate low-potential voltage line LVL2 can be a low-potential voltage applied to the drain node or source node of the first inverter control transistor T4*q* included in the inverter block IVT.

The second gate low-potential voltage GVSS1 can be configured as a separate low-potential voltage separated from the third gate low-potential voltage GVSS2.

The third gate low-potential voltage GVSS2 transferred through the third gate low-potential voltage line LVL3 can be a low-potential voltage supplied to the first logic block LOGIC #1 and used to discharge (or turn off) the Q node and to discharge (or turn off) the QB node.

The third gate low-potential voltage GVSS2 transferred through the third gate low-potential voltage line LVL3 can be a power voltage supplied to the largest number of transistors.

Since the first gate high-potential voltage GVDD, the second gate high-potential voltages GVDD_o and GVDD_e, the first gate low-potential voltage GVSS0, the second gate low-potential voltage GVSS1, and the third gate low-potential voltage GVSS2 directly affect the output of the first gate driving panel circuit GPC #1, it can be better to reduce the line resistance of each of the first gate high-potential voltage line HVL1, the second gate high-potential voltage line HVL2, the first gate low-potential voltage line LVL1, the second gate low-potential voltage line LVL2, and the third gate low-potential voltage line LVL3. Thus, a multi-layer line structure can be provided.

The first Q node charge control transistor T11 connected to the third gate high-potential voltage line HVL3 does not require a high voltage. Further, there are many lines crossing and overlapping the third gate high-potential voltage line HVL3. Thus, the third gate high-potential voltage line HVL3 can have a single-layer line structure.

The structure of the gate bezel area GBA described with reference to FIG. 19 corresponds to the case in which the gate driving panel circuit GPC is of the second type. The structure of the gate bezel area GBA described with reference to FIG. 19 can be equally applied even when the gate driving panel circuit GPC is of the first type. For example, when the gate driving panel circuit GPC is of the first type, an area between the first gate driving panel circuit GPC #1 and the second gate driving panel circuit GPC #2 can be a central area BDA through which the first gate low-potential voltage connection line LVL1_CP, the second gate low-potential voltage connection line LVL2_CP, and the third gate low-potential voltage connection line LVL3_CP pass.

Hereinafter, a multi-layer line structure of the plurality of clock signal lines CL is described with reference to FIG. 20A, a multi-layer line structure of each of the first gate high-potential voltage line HVL1, the second gate high-potential voltage line HVL2, the first gate low-potential voltage line LVL1, the second gate low-potential voltage line LVL2, and the third gate low-potential voltage line LVL3 is described with reference to FIG. 20B, and a single-layer line structure of the third gate high-potential voltage line HVL3 is described with reference to FIG. 20C.

Figure 20A:
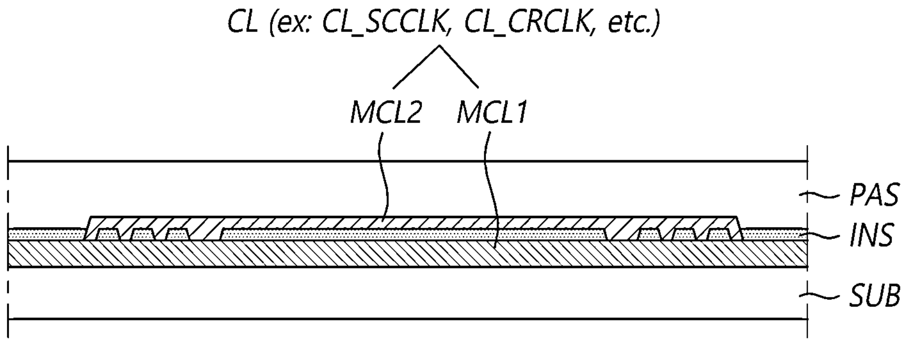
FIG. 20A illustrates a multi-layer line structure of a clock signal line in a gate bezel area in a display panel according to embodiments of the disclosure.

FIG. 20A illustrates a multi-layer line structure of a clock signal line in a gate bezel area in a display panel according to embodiments of the disclosure.

Referring to FIG. 20A, the plurality of clock signal lines CL disposed in the clock signal line area CLA can include a carry clock signal line CL_CRCLK and a scan clock signal line CL_SCCLK, or can further include a sensing clock signal line. All or some of the plurality of clock signal lines CL can be multi-layer lines.

The clock signal line CL having the multi-layer line structure can include a first metal clock signal line MCL1 and a second metal clock signal line MCL2 electrically connected to each other. The first metal clock signal line MCL1 and the second metal clock signal line MCL2 can be positioned on different layers and can be electrically connected to each other.

The first metal clock signal line MCL1 can be disposed in the first metal layer, which is a metal layer between the substrate SUB and the insulation layer INS on the substrate SUB.

The second metal clock signal line MCL2 can be disposed in the second metal layer, which is a metal layer between the insulation layer INS and the protection layer PAS on the insulation layer INS.

For example, the insulation layer INS can include a buffer layer and a gate insulation film.

The second metal clock signal line MCL2 can be connected to the first metal clock signal line MCL1 through a contact hole of the insulation layer INS.

For example, a light shield can be positioned under the active layer (channel) of the driving transistor DRT formed in the display area DA and can overlap the channel of the driving transistor DRT. An insulation layer (e.g., a buffer layer) can be disposed between the channel of the driving transistor DRT and the light shield. The light shield can be formed of a first metal (e.g., a light shield metal). In other words, the first metal layer can be a metal layer on which the light shield is disposed.

One of two or more capacitor electrodes constituting the storage capacitor Cst formed in the display area DA can be formed of the first metal (light shield metal). In other words, the first metal layer can be a metal layer where one of two or more capacitor electrodes constituting the storage capacitor Cst is disposed.

As another example, the source-drain electrode of the transistor can be formed of the first metal (e.g., source-drain metal). In other words, the first metal layer can be a metal layer where the source-drain electrode of the transistor is disposed.

For example, the scan signal line SCL and the sensing signal line SENL can be formed of a second metal (e.g., gate metal). In other words, the second metal layer can be a metal layer where the scan signal line SCL and the sensing signal line SENL are disposed. The second metal layer can be a metal layer where another one of the two or more capacitor electrodes constituting the storage capacitor Cst formed in the display area DA is disposed.

Figure 20B:
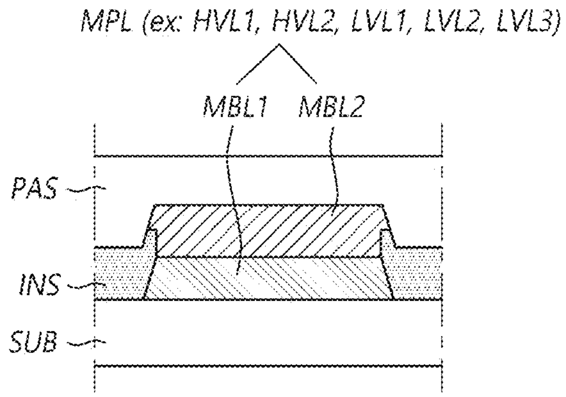
FIG. 20B illustrates a multi-layer structure of a multi-layer power line in a gate bezel area in a display panel according to embodiments of the disclosure.

FIG. 20B illustrates a multi-layer structure of a multi-layer power line in a gate bezel area in a display panel according to embodiments of the disclosure.

Referring to FIG. 20B, a multi-layer power line MPL having a multi-layer line structure can be disposed in the gate bezel area GBA.

The multi-layer power line MPL can include a first metal power line MBL1 and a second metal power line MBL2. The first metal power line MBL1 and the second metal power line MBL2 can be positioned on different layers and can be electrically connected to each other.

The first metal power line MBL1 can be disposed in the first metal layer between the substrate SUB and the insulation layer INS on the substrate SUB. The second metal power line MBL2 can be disposed in the second metal layer between the insulation layer INS and the protection layer PAS on the insulation layer INS. For example, the insulation layer INS can include a buffer layer and a gate insulation film.

The second metal power line MBL2 can be connected to the first metal power line MBL1 through a contact hole of the insulation layer INS.

For example, the first metal layer can be a metal layer where the light shield positioned under the channel of the driving transistor DRT formed in the display area DA is disposed. The first metal layer can be a metal layer where one of two or more capacitor electrodes constituting the storage capacitor Cst formed in the display area DA is disposed.

As another example, the first metal layer can be a metal layer constituting the source-drain electrode of the transistor.

For example, the second metal layer can be a metal layer constituting the scan signal line SCL and the sensing signal line SENL. The second metal layer can be a metal layer where another one of the two or more capacitor electrodes constituting the storage capacitor Cst formed in the display area DA is disposed.

For example, the multi-layer power line MPL having the multi-layer line structure can include a first gate high-potential voltage line HVL1, a second gate high-potential voltage line HVL2, a first gate low-potential voltage line LVL1, a second gate low-potential voltage line LVL2, and a third gate low-potential voltage line LVL3.

Figure 20C:
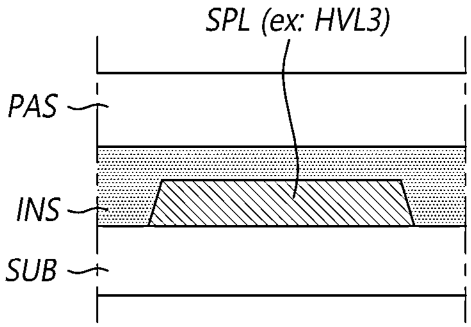
FIG. 20C illustrates a single-layer line structure of a single-layer power line in a gate bezel area in a display panel according to embodiments of the disclosure.

FIG. 20C illustrates a single-layer line structure of a single-layer power line in a gate bezel area in a display panel according to embodiments of the disclosure.

Referring to FIG. 20C, a single-layer power line SPL having a single-layer line structure can be disposed in the gate bezel area GBA.

The single-layer power line SPL can be disposed in the first metal layer between the substrate SUB and the insulation layer INS on the substrate SUB. For example, the insulation layer INS can include a buffer layer and a gate insulation film.

For example, the first metal layer can be a metal layer where the light shield positioned under the channel of the driving transistor DRT formed in the display area DA is disposed. The first metal layer can be a metal layer where one of two or more capacitor electrodes constituting the storage capacitor Cst formed in the display area DA is disposed.

As another example, the first metal layer can be a metal layer constituting the source-drain electrode of the transistor.

For example, the single-layer power supply line SPL having a single-layer line structure can include a third gate high-potential voltage line HVL3.

Referring to FIGS. 20A, 20B, and 20C, all or some of the plurality of clock signal lines CL can be multi-layer lines. Some of the plurality of gate high-potential voltage lines HVL can be single-layer lines and the others can be multi-layer lines. The plurality of gate low-potential voltage lines LVL can be multi-layer lines.

Figure 21:
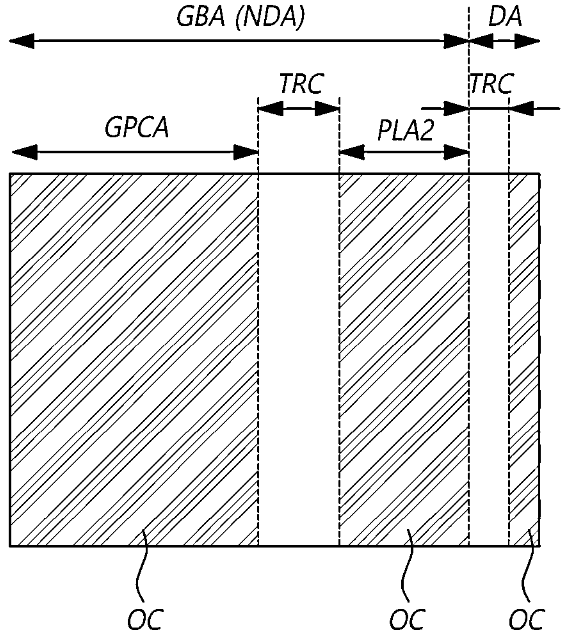
FIGS. 21 and 22 are a plan view and a cross-sectional view illustrating a partial area including a gate bezel area in a display panel according to embodiments of the disclosure.

FIG. 21 is a plan view illustrating a partial area including a gate bezel area in a display panel according to embodiments of the disclosure.

Referring to FIG. 21, the gate bezel area GBA in the non-display area NDA can include a gate driving panel circuit area GPCA and a second power line area PLA2.

Further, an overcoat layer OC can be disposed in the gate bezel area GBA in the non-display area NDA. At least one trench TRC where the overcoat layer OC has been removed can be present in the gate bezel area GBA.

For example, in the overcoat layer OC, a trench TRC can be formed in at least one of a first area between the gate driving panel circuit area GPCA and the second power line area PLA1 and a second area between the second power line area PLA2 and the display area DA.

For example, the trench TRC can be present in a first area between the gate driving panel circuit area GPCA and the second power line area PLA2. In other words, the overcoat layer OC can be disposed in each of the gate driving panel circuit area GPCA and the second power line area PLA1, and an area in which the overcoat layer OC is not present between the gate driving panel circuit area GPCA and the second power line area PLA1 can correspond to the trench TRC.

For example, a trench TRC can further be present in the second area between the second power line area PLA2 and the display area DA. In other words, an overcoat layer OC can be disposed in each of the second power line area PLA2 and the display area DA, and an area where the overcoat layer OC has been removed between the second power line area PLA2 and the display area DA can correspond to an additional trench TRC.

According to the above-described trench structure, moisture H20 can be prevented from penetrating into the light emitting layer EL.

Figure 22:
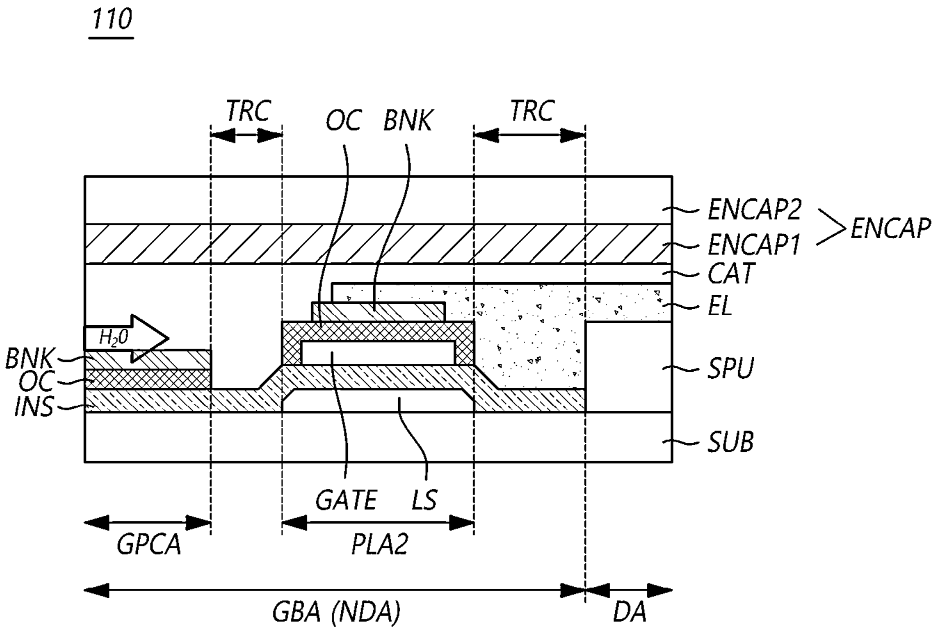

FIG. 22 is a cross-sectional view illustrating a partial area including a gate bezel area in a display panel according to embodiments of the disclosure.

Referring to FIG. 22, in the second power line area PLA2 of the gate bezel area GBA, the light shield LS can be disposed on the substrate SUB.

In the gate bezel area GBA, the insulation layer INS can be disposed while covering the light shield LS.

In the second power line area PLA2 of the gate bezel area GBA, a gate material layer GATE can be disposed on the insulation layer INS and can overlap the light shield LS.

In the gate driving panel circuit area GPCA of the gate bezel area GBA, the overcoat layer OC can be disposed on the insulation layer INS.

In the second power line area PLA2 of the gate bezel area GBA, the overcoat layer OC can be disposed while covering the gate material layer GATE on the insulation layer INS.

In the gate driving panel circuit area GPCA and the second power line area PLA2 of the gate bezel area GBA, the bank BNK can be disposed on the overcoat layer OC.

In the gate bezel area GBA, a trench TRC where the overcoat layer OC and the bank BNK are absent can be formed between the gate driving panel circuit area GPCA and the second power line area PLA2.

In the gate bezel area GBA, an additional trench TRC where the overcoat layer OC and the bank BNK are absent can be formed between the second power line area PLA2 and the display area DA.

Meanwhile, in the display area DA, the light emitting layer EL can be disposed under the cathode electrode CAT, and the subpixel unit SPU can be disposed under the light emitting layer EL. The subpixel unit SPU can include an anode electrode AE, transistors (e.g., DRT, SCT, or SENT), and a storage capacitor Cst. The light emitting layer EL can extend to the gate bezel area GBA of the non-display area NDA.

For example, the light emitting layer EL can extend from the display area DA to the non-display area NDA and can extend to an upper portion of the bank BNK of the second power line area PLA2 via the trench TRC.

In the display area DA, the cathode electrode CAT can be disposed on the light emitting layer EL. The cathode electrode CAT can extend to the gate bezel area GBA of the non-display area NDA. Accordingly, the cathode electrode CAT can extend from the display area DA to the whole or part of the gate driving panel circuit area GPCA.

The cathode electrode CAT can also be present in the area in which the trench TRC between the gate driving panel circuit area GPCA and the second power line area PLA2 and the trench TRC between the second power line area PLA2 and the display area DA are present.

The encapsulation layer ENCAP can be disposed on the cathode electrode CAT. The encapsulation layer ENCAP can extend from the display area DA to a partial area of the non-display area NDA.

The encapsulation layer ENCAP can include a first encapsulation layer ENCAP1 on the cathode electrode CAT and a second encapsulation layer ENCAP2 on the first encapsulation layer ENCAP1. For example, the first encapsulation layer ENCAP1 can include an adhesive and/or a desiccant having an encapsulation function. The first encapsulation layer ENCAP1 can include an organic material. The second encapsulation layer ENCAP2 can include a metal or an inorganic material.

Figure 23:
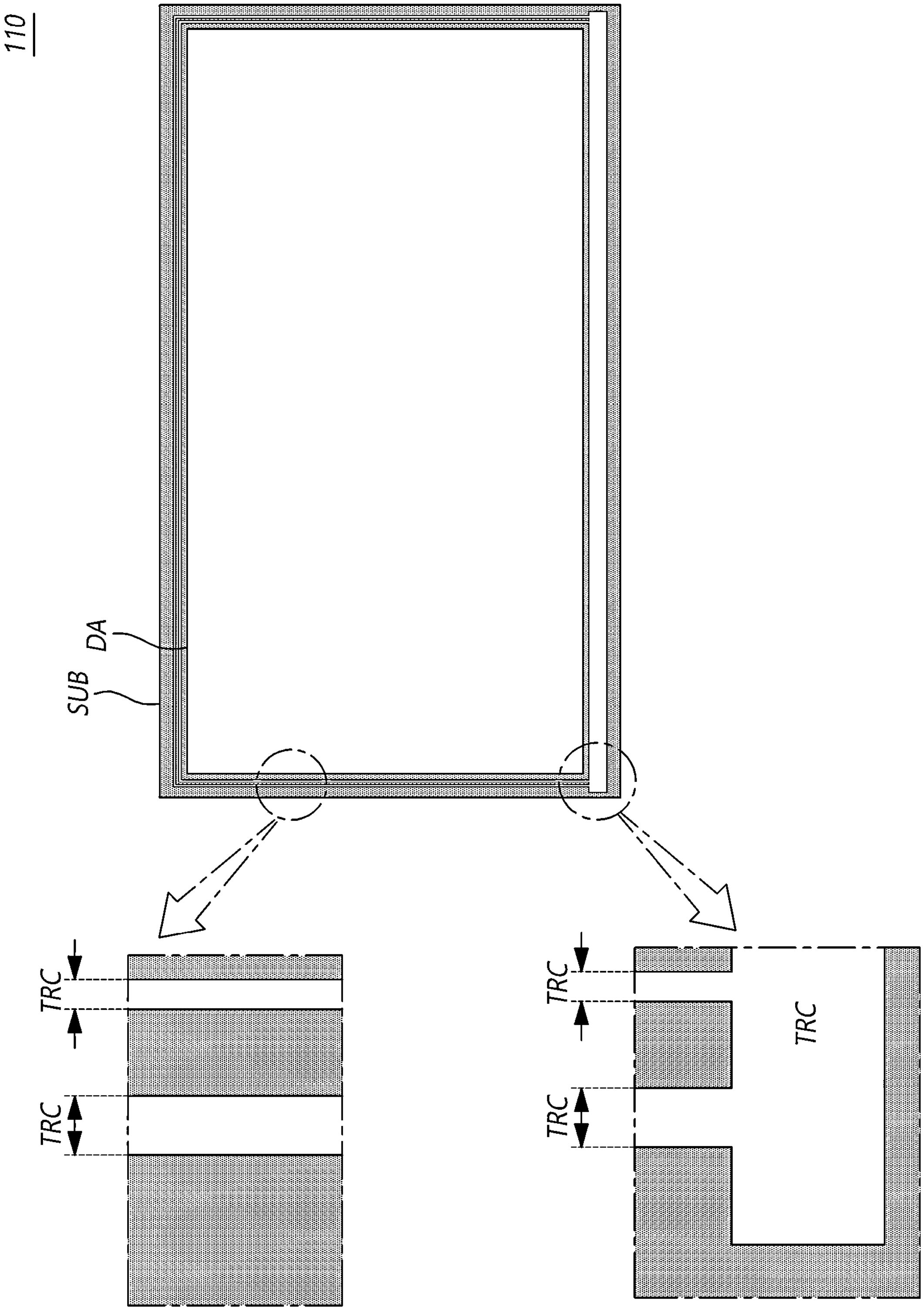
FIG. 23 is a plan view illustrating a display panel, in which a trench is formed in an entire periphery according to embodiments of the disclosure.

FIG. 23 is a plan view illustrating a display panel, in which a trench is formed in an entire periphery according to embodiments of the disclosure.

Referring to FIG. 23, the trench TRC can be formed on the entire outer periphery of the display panel 110. In other words, the trench TRC can be present in the non-display area NDA while surrounding the display area DA.

For example, two rows of trenches TRC as shown in FIGS. 21 and 22 can be formed in the three-sided outer area of the four-sided outer area of the display panel 110. For example, the width of the trenches TRC in one row can be greater than the width of each of the trenches TRC in two rows.

For example, one row of trenches TRC can be formed in the one-sided outer area of the four-sided outer area of the display panel 110. The one-sided outer area in which one row of trenches TRC are formed can be an area connected with the circuit films CF on which the source driver integrated circuits SDIC are mounted.

Figure 24:
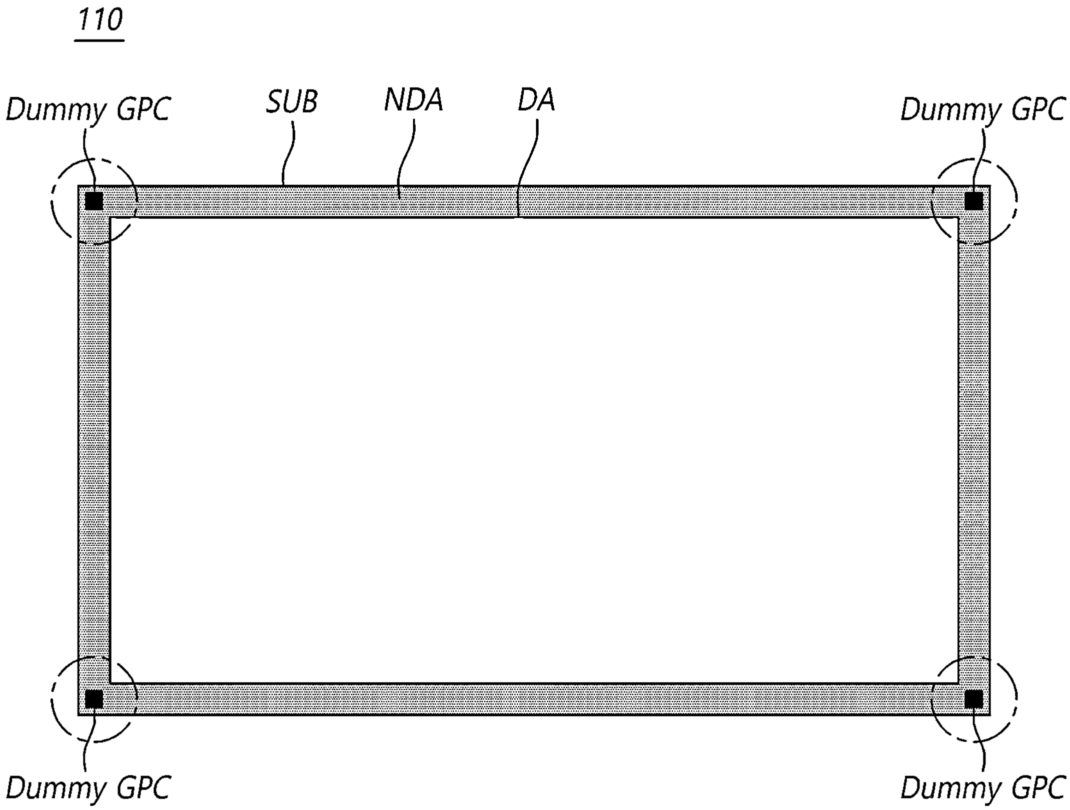
FIG. 24 is a plan view illustrating a display panel, in which a dummy gate driving panel circuit is formed at a corner point according to embodiments of the disclosure.

FIG. 24 is a plan view illustrating a display panel, in which a dummy gate driving panel circuit Dummy GPC is formed at a corner point according to embodiments of the disclosure.

Referring to FIG. 24, the display panel 110 according to embodiments of the disclosure can include a dummy gate driving panel circuit Dummy GPC disposed at all or some of a plurality of corner points of the non-display area NDA.

The dummy gate driving panel circuit Dummy GPC can have the same structure as, or can differ in some blocks from, the first type or second type of gate driving panel circuit GPC.

However, the dummy gate driving panel circuit Dummy GPC is not connected to the gate line GL actually used for display driving. Here, each gate line GL can be a scan signal line SCL or a sensing signal line SENL.

Figure 25:
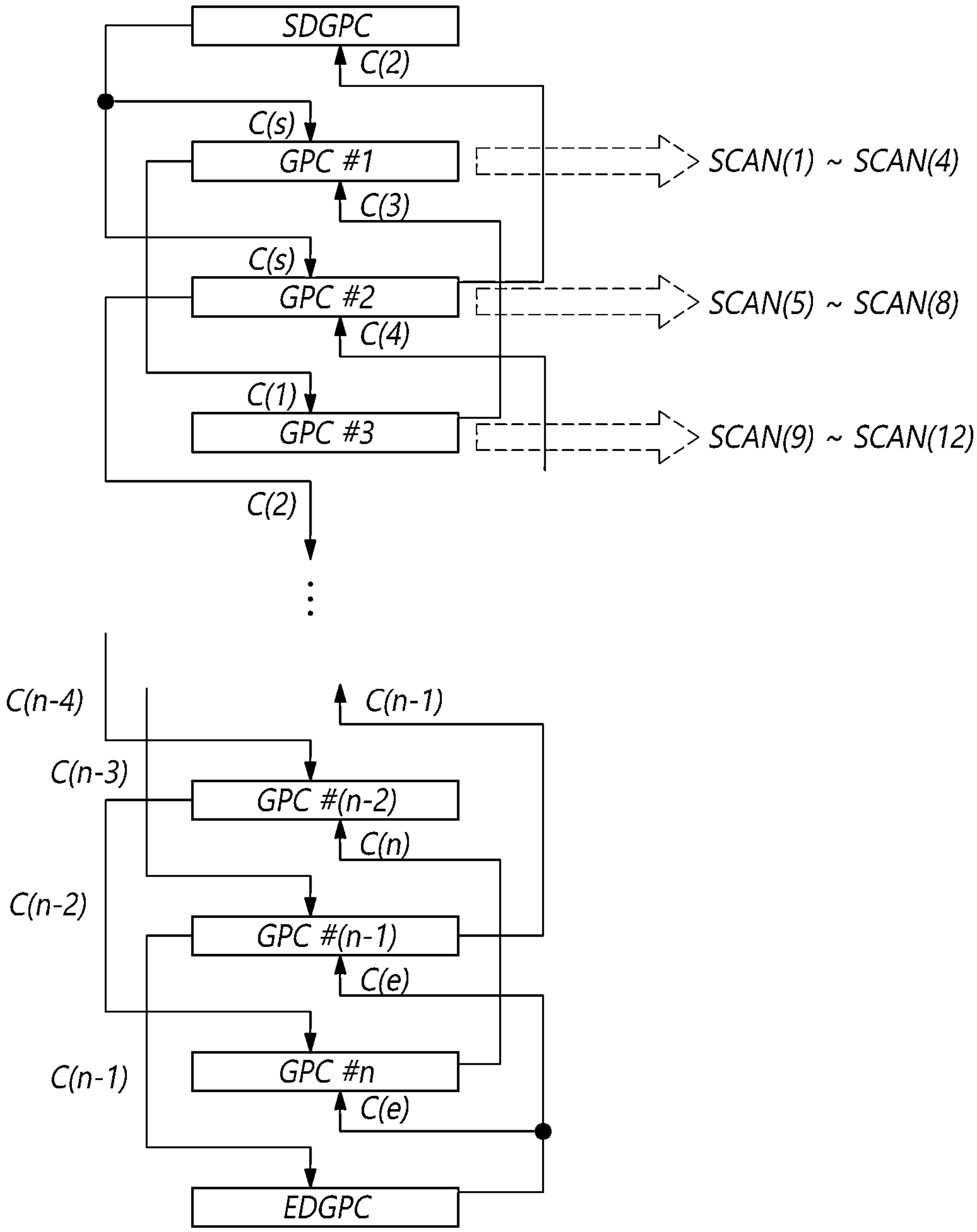
FIG. 25 is a view illustrating an example configuration of a dummy gate driving panel circuit and a plurality of gate driving panel circuits in a gate driving circuit according to embodiments of the disclosure.

FIG. 25 is a view illustrating an example configuration of a dummy gate driving panel circuit and a plurality of gate driving panel circuits in a gate driving circuit according to embodiments of the disclosure.

Referring to FIG. 25, the gate driving circuit 130 according to embodiments of the disclosure can include a first gate driving panel circuit GPC #1 to an nth gate driving panel circuit GPC #n (where, n is a positive integer), a start dummy gate driving panel circuit SDGPC disposed in front of the first gate driving panel circuit GPC #1, and an end dummy gate driving panel circuit EDGPC disposed behind the nth gate driving panel circuit GPC #n.

Here, each gate driving panel circuit GPC can correspond to a gate driving integrated circuit GDIC or a GIP circuit constituting the gate driving circuit 130.

A plurality of different scan clocks SCCLK with different phases can be applied to the first gate driving panel circuit GPC #1 to the nth gate driving panel circuit GPC #n, to correspond to scan signals, respectively.

In the gate driving circuit 130 according to embodiments of the disclosure, each of the first gate driving panel circuit GPC #1 to the nth gate driving panel circuit GPC #n can receive four scan clocks SCCLK to generate four scan signals SC.

Among the first gate driving panel circuit GPC #1 to the nth gate driving panel circuit GPC #(n), the first gate driving panel circuit GPC #1 outputs the first scan signal SCAN (1) to the fourth scan signal SCAN (4) according to the first scan clock SCCLK(1) to the fourth scan clock SCCLK(4). The second gate driving panel circuit GPC #2 outputs the fifth scan signal SCAN (5) to the eighth scan signal SCAN (8) according to the fifth scan clock SCCLK(5) to the eighth scan clock SCCLK(8). Further, the third gate driving panel circuit GPC #3 outputs the ninth scan signal SCAN (9) to the twelfth scan signal SCAN (12) according to the ninth scan clock SCCLK(9) to the twelfth scan clock SCCLK(12).

The first to nth gate driving panel circuits GPC #1 to GPC #n can be stepwise or dependently (cascaded) connected to each other.

In this case, the first gate driving panel circuit GPC #1 to the nth gate driving panel circuit GPC #n can be connected in a two-stage gate driving panel circuit structure in which one gate driving panel circuit skips its adjacent gate driving panel circuit and supplies the carry signal C to the second front gate driving panel circuit or the second rear gate driving panel circuit.

For example, the third gate driving panel circuit GPC #3 can charge the Q node using the first carry signal C(1) output from the first gate driving panel circuit GPC #1. The fourth gate driving panel circuit can charge the Q node using the second carry signal C2 output from the second gate driving panel circuit GPC #2.

Further, the n−2th gate driving panel circuit GPC #(n−2) can discharge the Q node using the nth carry signal C(n) output from the nth gate driving panel circuit GPC #n. The n−3th gate driving panel circuit GPC #(n−3) can discharge the Q node using the n−1th carry signal C(n−1) output from the n−1th gate driving panel circuit GPC #(n−1).

Such a two-stage gate driving panel circuit structure can prevent an overlap of scan signals output from adjacent gate driving panel circuits, and can secure a signal margin between scan signals output from the gate driving panel circuits.

In this case, to correspond to the two-stage gate driving panel circuit structure, one or two start dummy gate driving panel circuits can be disposed in front of the first gate driving panel circuit GPC #1. Further, one or two end dummy gate driving panel circuits can be disposed behind the nth gate driving panel circuit GPC #n.

Illustrated here is an example in which the gate driving circuit 130 having the two-stage gate driving panel circuit structure is operated using one start dummy gate driving panel circuit and one end dummy gate driving panel circuit.

To that end, the first gate driving panel circuit GPC #1 to the nth gate driving panel circuit GPC #n outputting n scan signals are connected in the two-stage gate driving panel circuit structure, and one start dummy gate driving panel circuit SDGPC is disposed in front of the first gate driving panel circuit GPC #1, and one end dummy gate driving panel circuit EDGPC is disposed behind the nth gate driving panel circuit GPC #n.

Accordingly, the carry signals generated by the first gate driving panel circuit GPC #1 to the nth gate driving panel circuit GPC #n can be sequentially applied to the second rear gate driving panel circuits to charge the Q node, and can be sequentially applied to the second front gate driving panel circuits to discharge the Q node.

In this case, since one start dummy gate driving panel circuit SDGPC is disposed in front of the first gate driving panel circuit GPC #1, the start carry signal C(s) output from the start dummy gate driving panel circuit SDGPC can be simultaneously applied to the first gate driving panel circuit GPC #1 and the second gate driving panel circuit GPC #2.

Accordingly, the first gate driving panel circuit GPC #1 and the second gate driving panel circuit GPC #2 simultaneously charge the Q node with the start carry signal C(s) output from the start dummy gate driving panel circuit SDGPC. However, for the first gate driving panel circuit GPC #1 and the second gate driving panel circuit GPC #2, the output timings of the carry signal and the scan signal are determined according to the timings of the carry clock and the scan clock.

Further, since one end dummy gate driving panel circuit EDGPC is disposed behind the nth gate driving panel circuit GPC #n, the end carry signal Ce output from the end dummy gate driving panel circuit EDGPC can be simultaneously applied to the n−1th gate driving panel circuit GPC #n−1 and the nth gate driving panel circuit GPC #n.

Accordingly, the n−1th gate driving panel circuit GPC #n−1 and the nth gate driving panel circuit GPC #n simultaneously discharge the Q node with the end carry signal Ce output from the end dummy gate driving panel circuit EDGPC. However, for the n−1th gate driving panel circuit GPC #(n−1) and the nth gate driving panel circuit GPC #n, the output timings of the carry signal and the scan signal are determined according to the timings of the carry clock and the scan clock.

Here, since the start dummy gate driving panel circuit SDGPC and the end dummy gate driving panel circuit EDGPC are not connected to the gate line GL actually used for display driving, it is not necessary to output the scan signal SC or the sensing signal SE.

Accordingly, the size of the gate bezel area can be reduced by deleting the scan output buffer SCBUF for generating the scan signal SC and the sensing output buffer SEBUF for generating the sensing signal SE from the start dummy gate driving panel circuit SDGPC and the end dummy gate driving panel circuit EDGPC.

Figure 26:
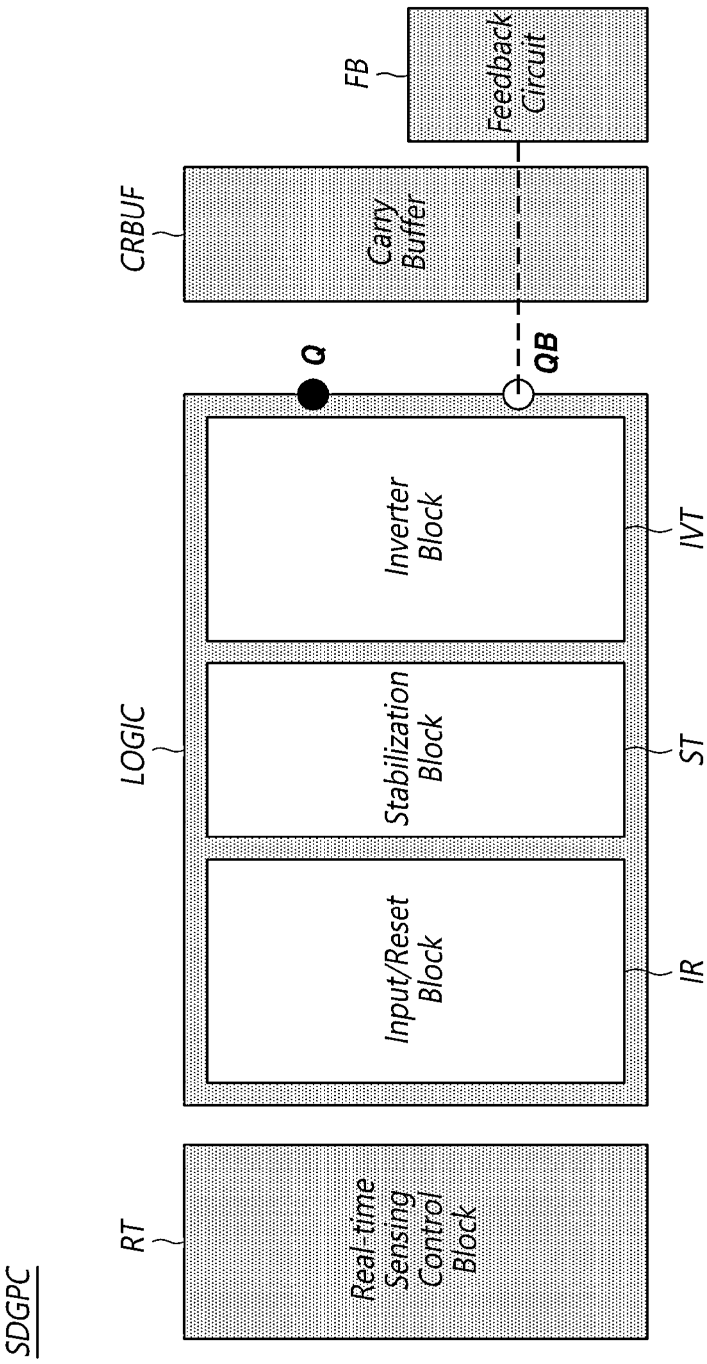
FIG. 26 is a block diagram illustrating a start dummy gate driving panel circuit in a gate driving circuit according to embodiments of the disclosure.

FIG. 26 is a block diagram illustrating a start dummy gate driving panel circuit in a gate driving circuit according to embodiments of the disclosure.

Referring to FIG. 26, in the gate driving circuit 130 according to embodiments of the disclosure, the start dummy gate driving panel circuit SDGPC can include a carry output buffer CRBUF, a feedback circuit FB, a logic block LOGIC, and a real-time sensing control block RT.

The carry output buffer CRBUF can be configured to output the start carry signal C(s).

The carry output buffer CRBUF can be controlled according to the voltage states of the Q node and the QB node of the logic block LOGIC. The operation and output of the carry output buffer CRBUF can vary according to voltage states of the Q node and the QB node.

The Q node and the QB node can have different voltage levels. For example, if the voltage of the Q node during a first period is a high-level voltage, the voltage of the QB node can be a low-level voltage. If the voltage of the Q node is a low-level voltage during a second period before or after the first period, the voltage of the QB node can be a high-level voltage.

The feedback circuit FB can be configured to output a feedback voltage. The feedback voltage can have a voltage level that reflects the state of the QB node of the logic block LOGIC.

The feedback circuit FB can be controlled according to the voltage state of the QB node of the logic block LOGIC. The operation and output of the feedback circuit FB can vary according to the voltage state of the QB node.

The logic block LOGIC can be a circuit block that controls the operations of the carry output buffer CRBUF and the feedback circuit FB and implements the operation of a shift register. The logic block LOGIC can control the voltages of the Q node and QB node to control the operation of the carry output buffer CRBUF. Further, the logic block LOGIC can control the voltage of the QB node to control the operation of the feedback circuit FB.

The logic block LOGIC can include an input/reset block IR, a stabilization block ST, and an inverter block IVT.

The input/reset block IR can be a circuit block that controls charge and discharge of the Q node. The inverter block IVT can control the inverted voltage level of the voltage level of the Q node to be the voltage level of the QB node according to the voltage of the Q node. The stabilization block ST can stabilize the Q node and the output according to the voltage of the QB node during a period when the output signal of the gate driving panel circuit GPC has a turn-off level voltage.

Each of the input/reset block IR, the stabilization block ST, and the inverter block IVT can include at least one transistor.

The real-time sensing control block RT can be a circuit block for controlling the operation of the logic block LOGIC for real-time sensing driving. Here, the real-time sensing driving can be sensing driving performed in real time during display driving and sensing driving performed every blank period BLANK between active periods ACT. The real-time sensing driving can be performed in a second sensing mode corresponding to the fast sensing mode. The real-time sensing driving can be sensing driving for sensing the mobility of the driving transistor DRT of each subpixel SP.

The real-time sensing control block RT can include at least one transistor.

The real-time sensing control block RT can control the Q node and the QB node so that the carry output buffer CRBUF outputs the start carry signal C(s) to the rear first gate driving panel circuit GPC #1 while the start dummy gate driving panel circuit SDGPC performs real-time sensing driving.

Figure 27:
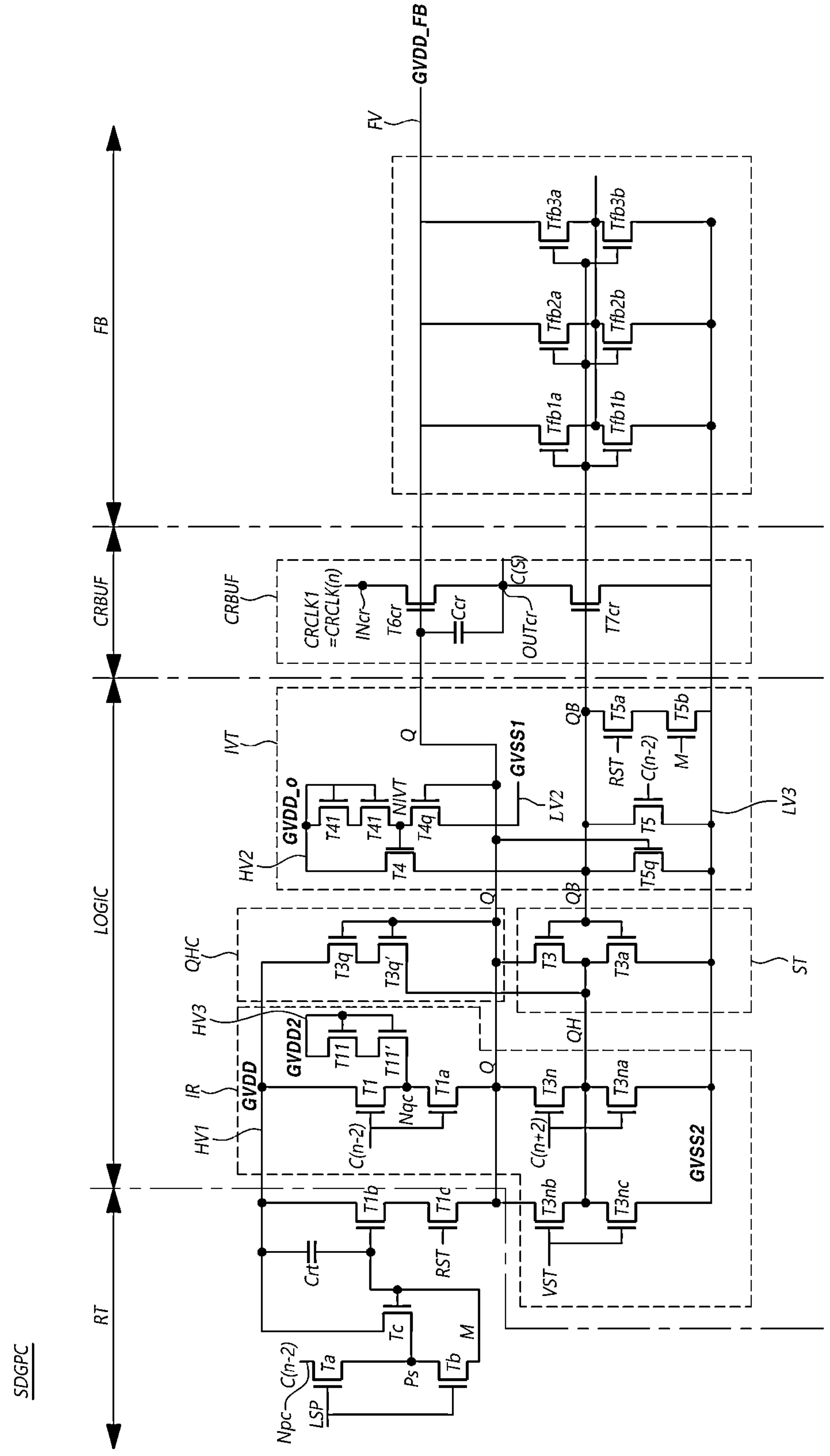
FIG. 27 is a view illustrating an example start dummy gate driving panel circuit in a gate driving circuit according to embodiments of the disclosure.

FIG. 27 is a view illustrating an example start dummy gate driving panel circuit in a gate driving circuit according to embodiments of the disclosure.

Referring to FIG. 27, a start dummy gate driving panel circuit SDGPC can include a carry output buffer CRBUF, a feedback circuit FB, a logic block LOGIC, and a real-time sensing control block RT.

The carry output buffer CRBUF can include a carry pull-up transistor T6*cr* and a carry pull-down transistor T7*cr*.

The carry pull-up transistor T6*cr* can be turned on or off according to the voltage of the Q node, thereby controlling the connection between the carry clock node INcr to which the carry clock signal CRCLK(n) is input and the carry output node OUTcr where the start carry signal C(s) is output. Here, the carry clock signal CRCLK(n) can also be referred to as a first carry clock signal CRCLK1.

The gate node of the carry pull-up transistor T6*cr* can be the Q node or can be electrically connected to the Q node. The source node (or drain node) of the carry pull-up transistor T6*cr* can be the carry output node OUTcr or can be electrically connected to the carry output node OUTcr. The drain node (or source node) of the carry pull-up transistor T6*cr* can be the carry clock node INcr or can be electrically connected to the carry clock node INcr.

The carry pull-up transistor T6*cr* can be turned on to output an end carry signal C(e) having the first carry clock signal CRCLK1 as a high-level voltage.

The carry output buffer CRBUF can further include a carry bootstrapping capacitor Ccr connected between the gate node and the source node (or the drain node) of the carry pull-up transistor T6*cr*.

The carry-pull-down transistor T7*cr* can be turned on or off according to the voltage of the QB node, thereby controlling the connection between the third gate low-potential node LV3 to which the third gate low-potential voltage GVSS2 is input and the carry output node OUTcr where the start carry signal C(s) is output.

The gate node of the carry pull-down transistor T7*cr* can be the QB node or can be electrically connected to the QB node. The drain node or the source node of the carry pull-down transistor T7*cr* can be the third gate low-potential node LV3 or can be electrically connected to the third gate low-potential node LV3, and the source node or the drain node of the carry pull-down transistor T7*cr* can be the carry output node OUTcr or can be electrically connected to the carry output node OUTcr.

The carry pull-down transistor T7*cr* can be turned on to output the third gate low-potential voltage GVSS2 as the start carry signal C(s) having a low-level voltage.

The start dummy gate driving panel circuit SDGPC according to embodiments of the disclosure does not include a scan output buffer or a sensing output buffer. Accordingly, the size of the gate bezel area including the start dummy gate driving panel circuit SDGPC can be reduced.

The feedback circuit FB can include at least one feedback transistor sharing the gate node.

For example, the feedback circuit FB can include a first feedback transistor, a second feedback transistor, and a third feedback transistor in which a QB node is connected to a gate node, a drain node is connected to a third gate low-potential node LV3, and a source node is connected to the feedback node FV.

The first feedback transistor can include a 1*a*-th feedback transistor Tfb1*a* and a 1*b*-th feedback transistor Tfb1*b* for controlling a connection between the feedback node FV and the third gate low-potential node LV3 by being turned on or off according to the voltage of the QB node.

The second feedback transistor can include a 2*a*-th feedback transistor Tfb2*a* and a 2*b*-th feedback transistor Tfb2*b* for controlling a connection between the feedback node FV and the third gate low-potential node LV3 by being turned on or off according to the voltage of the QB node.

The third feedback transistor can include a 3*a*-th feedback transistor Tfb3*a* and a 3*b*-th feedback transistor Tfb3*b* for controlling a connection between the feedback node FV and the third gate low-potential node LV3 by being turned on or off according to the voltage of the QB node.

The feedback voltage GVDD_FB can correspond to the voltage level of the feedback node FV. When the feedback transistor is turned on by the QB node according to the sources of the first to third feedback transistors, the feedback voltage GVDD_FB represents the level of the third gate low-potential voltage GVSS2.

It is effective to form the feedback transistor constituting the feedback circuit FB in the same process as the process of forming the transistor that shares the QB node as the gate node.

In this case, the feedback transistor constituting the feedback circuit FB can be formed in the same process as the transistors T3 and T3*a* of the stabilization block ST, and the transistor can have the same size as the transistors T3 and T3*a* of the stabilization block ST.

When the start dummy gate driving panel circuit SDGPC is of the first type, the configuration of the logic block LOGIC and the real-time sensing control block RT can be the same as that of FIG. 12, and when the start dummy gate driving panel circuit SDGPC is of the second type, the configuration of the logic block LOGIC and the real-time sensing control block RT can be the same as that of FIG. 16.

Figure 28:
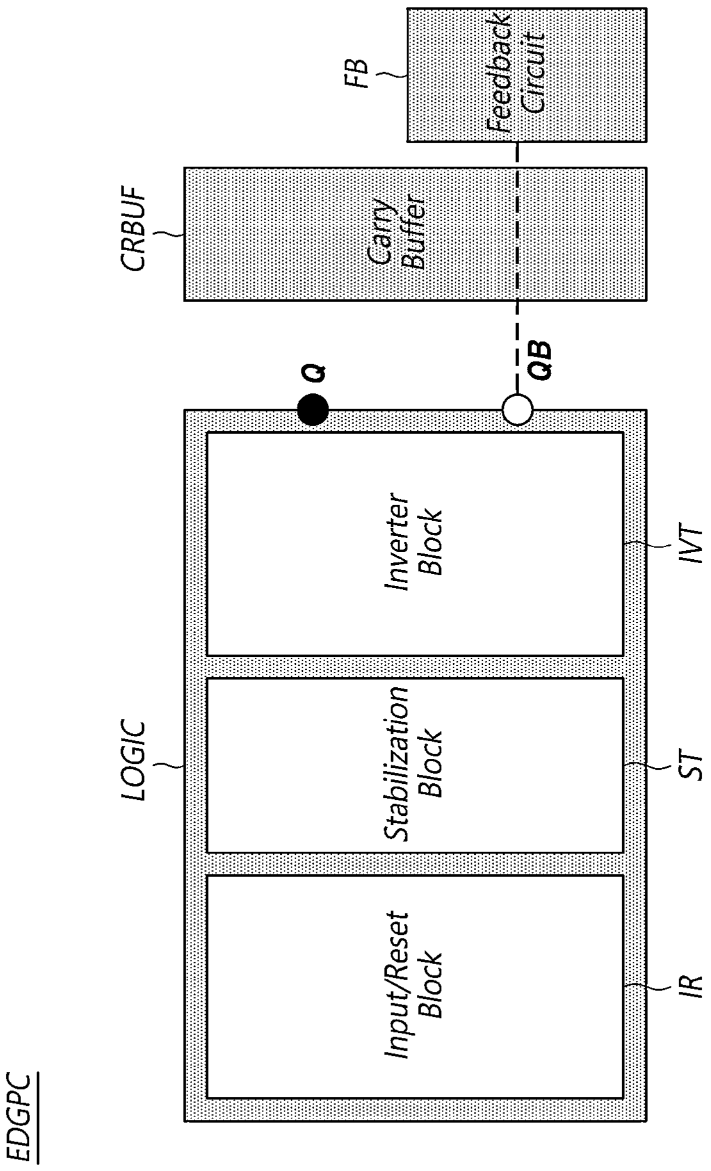
FIG. 28 is a block diagram illustrating an end dummy gate driving panel circuit in a gate driving circuit according to embodiments of the disclosure.

FIG. 28 is a block diagram illustrating an end dummy gate driving panel circuit in a gate driving circuit according to embodiments of the disclosure.

Referring to FIG. 28, in a gate driving circuit 130 according to embodiments of the disclosure, an end dummy gate driving panel circuit EDGPC can include a carry output buffer CRBUF, a feedback circuit FB, and a logic block LOGIC.

The carry output buffer CRBUF can be configured to output an end carry signal C(e).

The carry output buffer CRBUF can be controlled according to voltage states of the Q node and the QB node of the logic block LOGIC. The operation and output of the carry output buffer CRBUF can vary according to voltage states of the Q node and the QB node.

The Q node and the QB node can have different voltage levels. For example, if the voltage of the Q node during a first period is a high-level voltage, the voltage of the QB node can be a low-level voltage. If the voltage of the Q node is a low-level voltage during a second period before or after the first period, the voltage of the QB node can be a high-level voltage.

The feedback circuit FB can be configured to output a feedback voltage. The feedback voltage can have a voltage level that reflects the state of the QB node of the logic block LOGIC.

The feedback circuit FB can be controlled according to the voltage state of the QB node of the logic block LOGIC. The operation and output of the feedback circuit FB can vary according to the voltage state of the QB node.

The logic block LOGIC can be a circuit block that controls the operations of the carry output buffer CRBUF and the feedback circuit FB and implements the operation of a shift register. The logic block LOGIC can control the voltages of the Q node and QB node to control the operation of the carry output buffer CRBUF. Further, the logic block LOGIC can control the voltage of the QB node to control the operation of the feedback circuit FB.

The logic block LOGIC can include an input/reset block IR, a stabilization block ST, and an inverter block IVT.

The input/reset block IR can be a circuit block that controls charge and discharge of the Q node. The inverter block IVT can control the inverted voltage level of the voltage level of the Q node to be the voltage level of the QB node according to the voltage of the Q node. The stabilization block ST can stabilize the Q node and the output according to the voltage of the QB node during a period when the output signal of the gate driving panel circuit GPC has a turn-off level voltage.

Each of the input/reset block IR, the stabilization block ST, and the inverter block IVT can include at least one transistor.

The real-time sensing control block RT can be omitted from the end dummy gate driving panel circuit EDGPC.

Figure 29:
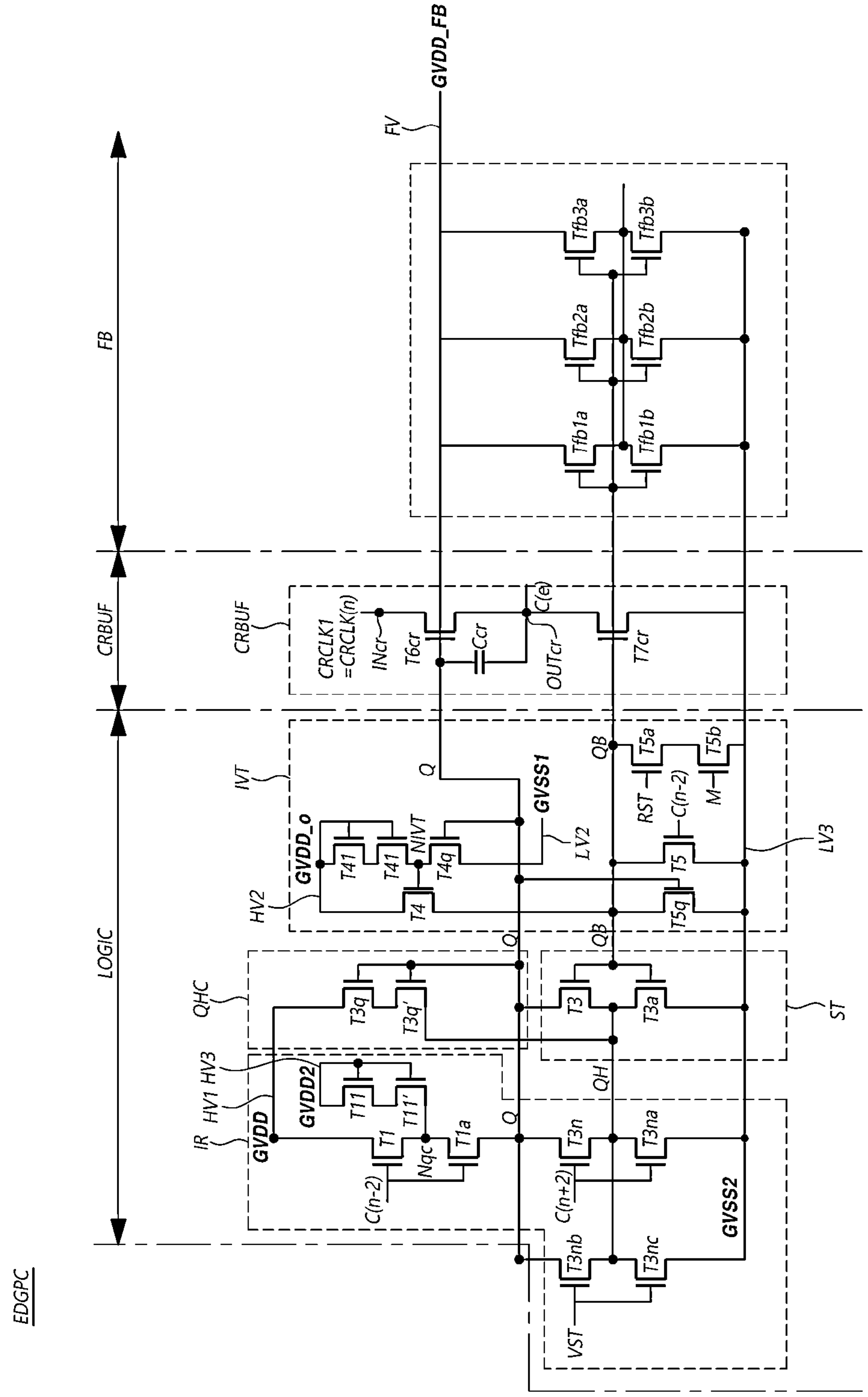
FIG. 29 is a view illustrating an example end dummy gate driving panel circuit in a gate driving circuit according to embodiments of the disclosure.

FIG. 29 is a view illustrating an example end dummy gate driving panel circuit in a gate driving circuit according to embodiments of the disclosure.

Referring to FIG. 29, an end dummy gate driving panel circuit EDGPC can include a carry output buffer CRBUF, a feedback circuit FB, and a logic block LOGIC.

The carry output buffer CRBUF can include a carry pull-up transistor T6*cr* and a carry pull-down transistor T7*cr*.

The carry pull-up transistor T6*cr* can be turned on or off according to the voltage of the Q node, thereby controlling the connection between the carry clock node INcr to which the carry clock signal CRCLK(n) is input and the carry output node OUTcr where the end carry signal C(e) is output. Here, the carry clock signal CRCLK(n) can also be referred to as a first carry clock signal CRCLK1.

The gate node of the carry pull-up transistor T6*cr* can be the Q node or can be electrically connected to the Q node. The source node (or drain node) of the carry pull-up transistor T6*cr* can be the carry output node OUTcr or can be electrically connected to the carry output node OUTcr. The drain node (or source node) of the carry pull-up transistor T6*cr* can be the carry clock node INcr or can be electrically connected to the carry clock node INcr.

The carry pull-up transistor T6*cr* can be turned on to output an end carry signal C(e) having the first carry clock signal CRCLK1 as a high-level voltage.

The carry output buffer CRBUF can further include a carry bootstrapping capacitor Ccr connected between the gate node and the source node (or the drain node) of the carry pull-up transistor T6*cr*.

The carry-pull-down transistor T7*cr* can be turned on or off according to the voltage of the QB node, thereby controlling the connection between the third gate low-potential node LV3 to which the third gate low-potential voltage GVSS2 is input and the carry output node OUTcr where the end carry signal C(e) is output.

The gate node of the carry pull-down transistor T7*cr* can be the QB node or can be electrically connected to the QB node. The drain node or the source node of the carry pull-down transistor T7*cr* can be the third gate low-potential node LV3 or can be electrically connected to the third gate low-potential node LV3, and the source node or the drain node of the carry pull-down transistor T7*cr* can be the carry output node OUTcr or can be electrically connected to the carry output node OUTcr.

The carry pull-down transistor T7*cr* can be turned on to output the third gate low-potential voltage GVSS2 as the end carry signal C(e) having a low-level voltage.

The end dummy gate driving panel circuit EDGPC according to embodiments of the disclosure does not include a real-time sensing control block, a scan output buffer, and a sensing output buffer. Accordingly, the size of the gate bezel area including the end dummy gate driving panel circuit EDGPC can be reduced.

The feedback circuit FB can include at least one feedback transistor sharing the gate node.

For example, the feedback circuit FB can include a first feedback transistor, a second feedback transistor, and a third feedback transistor in which a QB node is connected to a gate node, a drain node is connected to a third gate low-potential node LV3, and a source node is connected to the feedback node FV.

The first feedback transistor can include a 1*a*-th feedback transistor Tfb1*a* and a 1*b*-th feedback transistor Tfb1*b* for controlling a connection between the feedback node FV and the third gate low-potential node LV3 by being turned on or off according to the voltage of the QB node.

The second feedback transistor can include a 2*a*-th feedback transistor Tfb2*a* and a 2*b*-th feedback transistor Tfb2*b* for controlling a connection between the feedback node FV and the third gate low-potential node LV3 by being turned on or off according to the voltage of the QB node.

The third feedback transistor can include a 3*a*-th feedback transistor Tfb3*a* and a 3*b*-th feedback transistor Tfb3*b* for controlling a connection between the feedback node FV and the third gate low-potential node LV3 by being turned on or off according to the voltage of the QB node.

The feedback voltage GVDD_FB can correspond to the voltage level of the feedback node FV. Accordingly, when the first to third feedback transistors are turned on by the QB node, the first to third feedback transistors output a feedback voltage GVDD_FB having the level of the third gate low-potential voltage GVSS2.

It is effective to form the feedback transistor constituting the feedback circuit FB in the same process as the process of forming the transistor that shares the QB node as the gate node.

In this case, the feedback transistor constituting the feedback circuit FB can be formed in the same process as the transistors T3 and T3*a* of the stabilization block ST, and the transistor can have the same size as the transistors T3 and T3*a* of the stabilization block ST.

When the end dummy gate driving panel circuit EDGPC is of the first type, the configuration of the logic block LOGIC can be the same as that of FIG. 12, and when the end dummy gate driving panel circuit EDGPC is of the second type, the configuration of the logic block LOGIC can be the same as that of FIG. 16.

Figure 30:
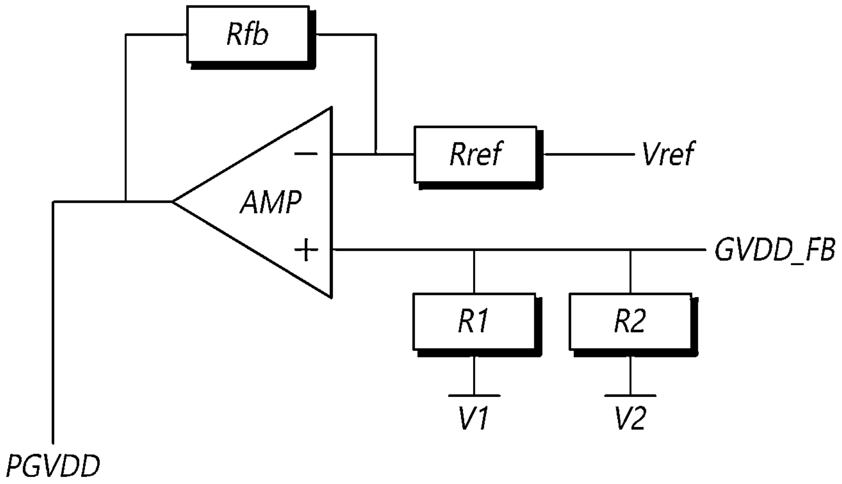
FIG. 30 is a view illustrating an example gate high-potential compensation circuit for sensing and compensating for deterioration of a gate driving circuit in a display device according to embodiments of the disclosure.

FIG. 30 is a view illustrating an example gate high-potential compensation circuit for sensing and compensating for deterioration of a gate driving circuit in a display device according to embodiments of the disclosure.

Referring to FIG. 30, in a display device according to embodiments of the disclosure, a feedback circuit can be included in a start dummy gate driving panel circuit SDGPC and an end dummy gate driving panel circuit EDGPC.

When the gate driving circuits 130 are positioned on the left and right sides of the display panel 110, the feedback circuits can be positioned in four corners where the start dummy gate driving panel circuit SDGPC and the end dummy gate driving panel circuit EDGPC are positioned on the display panel 110.

Accordingly, the gate high-potential compensation circuit receives the feedback voltage GVDD_FB through the feedback circuit configured in the start dummy gate driving panel circuit SDGPC or the end dummy gate driving panel circuit EDGPC, and generates the gate high-potential compensation voltage PGVDD applied to the plurality of gate driving panel circuits GPC.

The gate high-potential compensation voltage PGVDD can be applied to all of the start dummy gate driving panel circuit SDGPC, the end dummy gate driving panel circuit EDGPC, and the plurality of gate driving panel circuits GPC.

The gate high-potential compensation voltage PGVDD generated by the gate high-potential compensation circuit can be applied to the second gate high-potential node HV2 that supplies the second gate high-potential voltages GVDD_o and GVDD_e to the inverter block IVT of the gate driving panel circuit GPC.

When the gate high-potential compensation voltage PGVDD is applied to the second gate high-potential node HV2, the gate-source voltages of the transistors T3 and T3*a* constituting the stabilizing block ST can be decreased, relieving stress.

The gate high-potential compensation circuit can be positioned in the power management circuit.

The gate high-potential compensation circuit can include an amplifier AMP having a non-inverting input terminal (+) receiving a feedback voltage GVDD_FB, a reference resistor Rref connected to the inverting input terminal (−) of the amplifier AMP to transfer the reference voltage Vref, at least one setting resistor R1 and R2 connected to the non-inverting input terminal (+) of the amplifier AMP to transfer at least one setting voltage V1 and V2, and a feedback resistor Rfb connected between the inverting input terminal (−) and the output terminal of the amplifier AMP.

Accordingly, the gate high-potential compensation circuit can control the level of the gate high-potential compensation voltage PGVDD applied to the plurality of gate driving panel circuits GPC in conjunction with the feedback voltage GVDD_FB transferred from the feedback circuit of the start dummy gate driving panel circuit SDGPC or the end dummy gate driving panel circuit EDGPC.

In this case, the values of the reference resistor Rref, the setting resistors R1 and R2, and the feedback resistor Rfb can be determined considering the level of the gate high-potential compensation voltage PGVDD for compensation controlled according to the feedback voltage GVDD_FB applied to the non-inverting input terminal (+).

Figure 31:
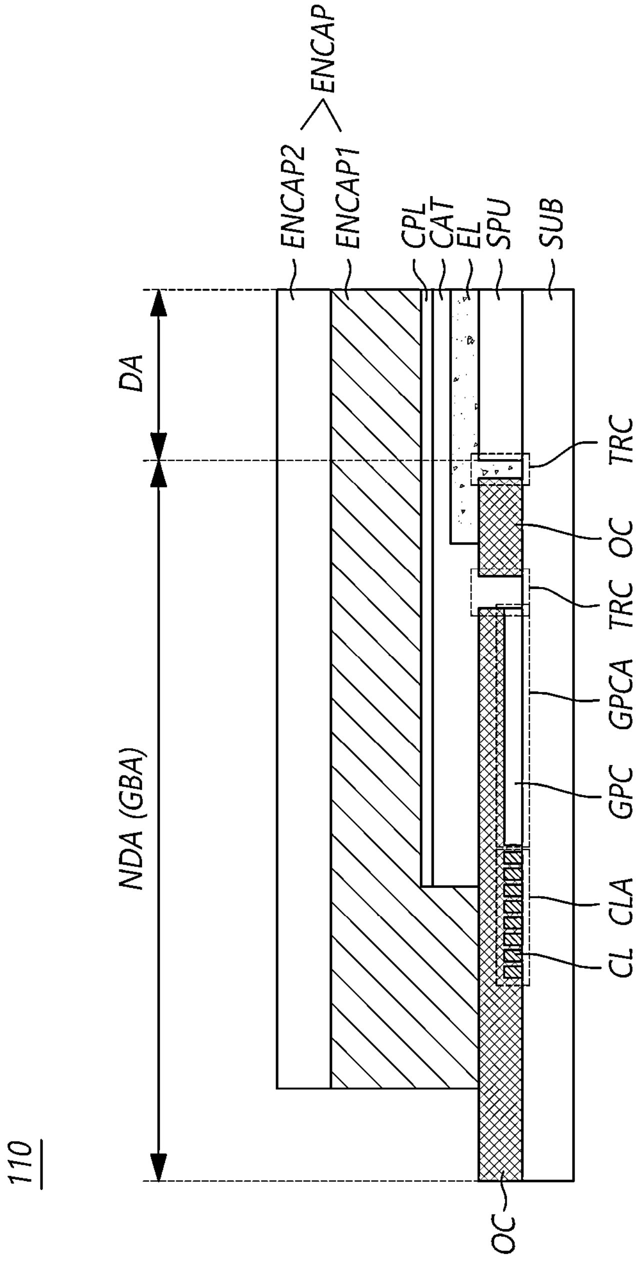
FIG. 31 is a cross-sectional view illustrating a display panel, for an area including a portion of a display area and a gate bezel area according to embodiments of the disclosure.

FIG. 31 is a cross-sectional view illustrating a display panel, for an area including a portion of a display area and a gate bezel area according to embodiments of the disclosure.

The cross-sectional view illustrated in FIG. 31 is a cross-sectional view of an area including the gate bezel area GBA where the gate driving panel circuit GPC is disposed in the non-display area NDA of the display panel 110 and a portion of the display area DA near the gate bezel area GBA.

Referring to FIG. 31, the display panel 110 according to embodiments of the disclosure can include a substrate SUB, a gate driving panel circuit GPC, a plurality of clock signal lines CL, an overcoat layer OC, a cathode electrode CAT, and the like.

The substrate SUB can be divided into a display area DA and a non-display area NDA.

The gate driving panel circuit GPC can be disposed on the substrate SUB, can be disposed in the gate driving panel circuit area GPCA included in the gate bezel area GBA of the non-display area NDA, and can be configured to output a gate signal to each of the plurality of gate lines GL disposed in the display area DA.

For example, when the gate driving panel circuit GPC is of the first type, the plurality of gate lines GL can include a plurality of scan signal lines SCL and a plurality of sensing signal lines SENL. As another example, when the gate driving panel circuit GPC is of the second type, the plurality of gate lines GL can include a plurality of scan signal lines SCL.

The plurality of clock signal lines CL can be disposed on the substrate SUB and can be disposed in the clock signal line area CLA positioned on one side of the gate driving panel circuit area GPCA in the non-display area NDA. Each of the plurality of clock signal lines CL can supply a corresponding clock signal to the gate driving panel circuit GPC.

For example, the clock signal line area CLA can be disposed further outside than the gate driving panel circuit area GPCA.

For example, when the gate driving panel circuit GPC is of the first type, the plurality of clock signal lines CL can include a plurality of carry clock signal lines CL_CRCLK, a plurality of scan clock signal lines CL_SCCLK, and a plurality of sensing clock signal lines CL_SECLK. As another example, when the gate driving panel circuit GPC is of the second type, the plurality of clock signal lines CL can include a plurality of scan clock signal lines CL_SCCLK and a plurality of carry clock signal lines CL_CRCLK.

The overcoat layer OC can be disposed on the plurality of clock signal lines CL.

The overcoat layer OC can be disposed on the gate driving panel circuit GPC.

The cathode electrode CAT can be disposed in the display area DA and can extend to the non-display area NDA.

The cathode electrode CAT can extend to the gate bezel area GBA in the non-display area NDA, and can extend to an upper portion of the whole or part of the gate driving panel circuit GPC. Accordingly, the cathode electrode CAT can overlap the whole or part of the gate driving panel circuit GPC.

The cathode electrode CAT can extend to the gate bezel area GBA in the non-display area NDA, and can extend to an upper portion of the whole or part of the plurality of clock signal lines CL. Accordingly, the cathode electrode CAT can overlap the whole or part of the plurality of clock signal lines CL.

The first power line area PLA1 can be disposed between the clock signal line area CLA and the gate driving panel circuit area GPCA, and the second power line area PLA2 can be disposed between the gate driving panel circuit area GPCA and the display area DA. However, in FIG. 31, the first power line area PLA1 and the second power line area PLA2 are omitted.

The light emitting layer EL positioned under the cathode electrode CAT can be disposed in the display area DA and can extend to a partial point of the non-display area NDA. The light emitting layer EL can overlap a portion of the overcoat layer OC.

A subpixel unit SPU can be positioned under the light emitting layer EL. The subpixel unit SPU can include an anode electrode AE, transistors (e.g., DRT, SCT, or SENT), and a storage capacitor Cst.

In the non-display area NDA, there can be a hole in the overcoat layer OC or a trench TRC corresponding to an area where the overcoat layer OC has been removed. For example, when there are a plurality of trenches TRC, one of the plurality of trenches TRC may not overlap the light emitting layer EL and another trench can overlap the light emitting layer EL. The light emitting layer EL can extend to the non-display area NDA and be interposed inside the trench TRC of the overcoat layer OC.

The display panel 110 according to embodiments of the disclosure can include a capping layer CPL on the cathode electrode CAT and an encapsulation layer ENCAP on the capping layer CPL.

The encapsulation layer ENCAP can include a first encapsulation layer ENCAP1 and a second encapsulation layer ENCAP2. For example, the first encapsulation layer ENCAP1 can include an adhesive and/or a desiccant having an encapsulation function. The first encapsulation layer ENCAP1 can include an organic material. The second encapsulation layer ENCAP2 can include a metal or an inorganic material. The second encapsulation layer ENCAP2 can be disposed to cover the cathode electrode CAT, the capping layer CPL, and the first encapsulation layer ENCAP1.

The encapsulation layer ENCAP can overlap the plurality of clock signal lines CL and the gate driving panel circuit GPC.

When manufacturing the display panel 110, each of the light emitting layer EL, the cathode electrode CAT, and the capping layer CPL can have a slightly different size or edge position depending on a process error. For example, the cathode electrode CAT can overlap none of the plurality of clock signal lines CL disposed in the clock signal line area CLA. Depending on a process error, a portion of the cathode electrode CAT can overlap the whole or part of the plurality of clock signal lines CL disposed in the clock signal line area CLA.

Figure 32:
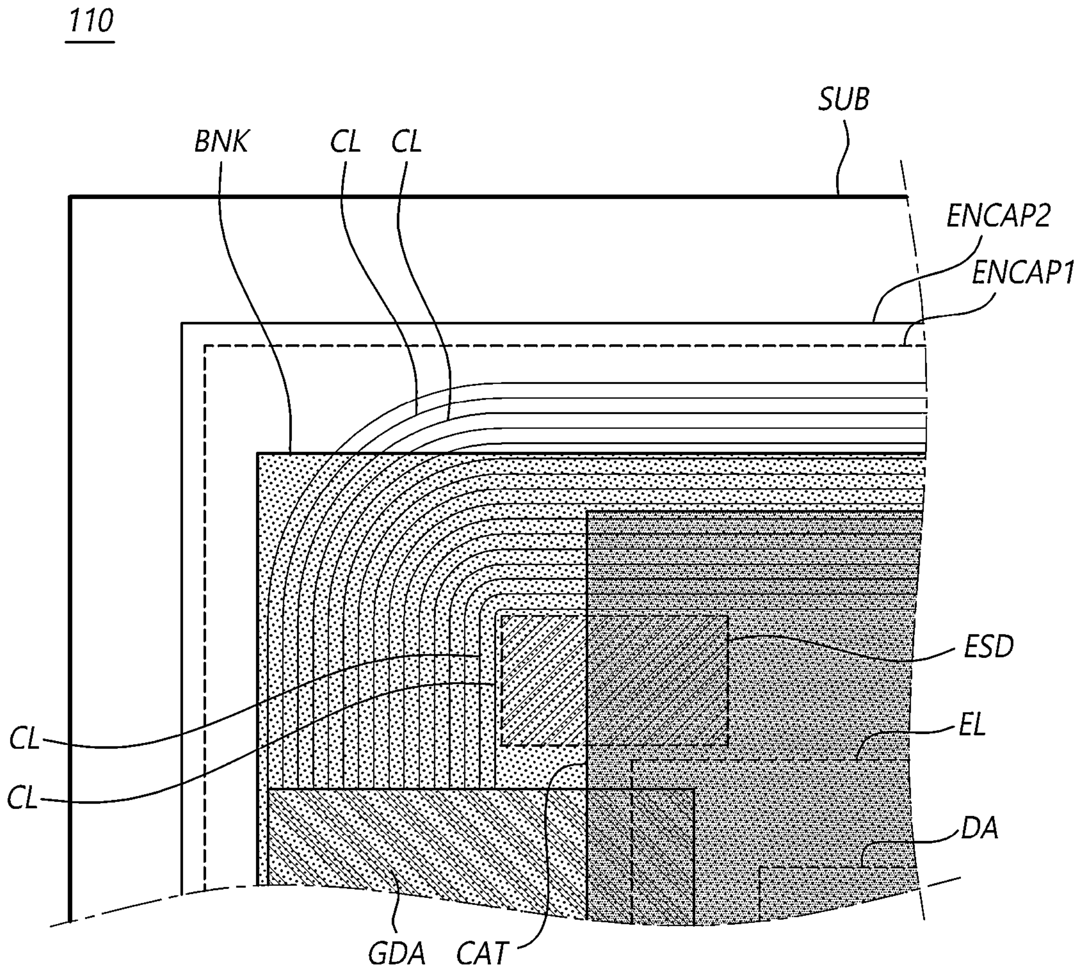
FIG. 32 is a plan view illustrating an outer corner area of a display panel according to embodiments of the disclosure.

FIG. 32 is a plan view illustrating an outer corner area of a substrate of a display panel according to embodiments of the disclosure.

Referring to FIG. 32, the display panel 110 according to embodiments of the disclosure can include a bank BNK extending from the display area DA to the non-display area NDA, a light emitting layer EL extending from the display area DA to the non-display area NDA, a cathode electrode CAT extending from the display area DA to the non-display area NDA and positioned on the light emitting layer EL, and an electrostatic discharge unit ESD disposed in an outer corner area of the non-display area NDA.

A corner portion of the bank BNK, a corner portion of the cathode electrode CAT, a corner portion of the first encapsulation layer ENCAP1, and a corner portion of the second encapsulation layer ENCAP2 can be present in an outer corner area of the substrate SUB of the display panel 110.

In the outer corner area of the display panel 110, among the bank BNK, the cathode electrode CAT, the first encapsulation layer ENCAP1, and the second encapsulation layer ENCAP2, the bank BNK can extend further outward than the cathode electrode CAT, and the first encapsulation layer ENCAP1 and the second encapsulation layer ENCAP2 can extend further outward than the bank BNK. The second encapsulation layer ENCAP2 can extend to a position similar to that of the first encapsulation layer ENCAP1 or can extend further outward than the first encapsulation layer ENCAP1.

A portion of the gate driving area GDA can be disposed in an outer corner area of the substrate SUB of the display panel 110.

The gate driving area GDA can include a gate driving panel circuit area GPCA in which the gate driving panel circuit GPC is disposed. The gate driving area GDA can further include a clock signal line area CLA, a first power line area PLA1, and a second power line area PLA2.

The gate driving area GDA can overlap the bank BNK, the first encapsulation layer ENCAP1, and the second encapsulation layer ENCAP2. The whole or part of the gate driving area GDA can overlap the cathode electrode CAT.

An electrostatic discharge unit ESD can be disposed in an outer corner area of the substrate SUB of the display panel 110. For example, the electrostatic discharge unit ESD can include an electrostatic discharge circuit or an electrostatic discharge pattern.

The electrostatic discharge unit ESD may not be disposed only in the outer corner area of the substrate SUB, but can be disposed at various positions requiring an electrostatic discharge function.

The electrostatic discharge unit ESD can overlap the bank BNK. The whole or part of the electrostatic discharge unit ESD can overlap the cathode electrode CAT. The electrostatic discharge unit ESD can overlap each of the first encapsulation layer ENCAP1 and the second encapsulation layer ENCAP2.

For example, the bank BNK can be disposed above the entire electrostatic discharge unit ESD. The cathode electrode CAT can be disposed above a portion of the electrostatic discharge unit ESD.

A plurality of clock signal lines CL can be disposed along edges of outer corners of the substrate SUB.

The plurality of clock signal lines CL can overlap the bank BNK, the first encapsulation layer ENCAP1, and the second encapsulation layer ENCAP2. All or some of the plurality of clock signal lines CL can partially overlap the cathode electrode CAT. All or some of the plurality of clock signal lines CL may not overlap the electrostatic discharge unit ESD.

The light emitting layer EL can be disposed to extend from the display area DA to the non-display area NDA. For example, the light emitting layer EL can be one of components for configuring one of an organic light emitting diode (OLED), a quantum dot organic light emitting diode (QD-OLED), and a light emitting diode (LED) chip.

A portion of the gate driving area GDA can overlap the light emitting layer EL. The electrostatic discharge unit ESD may not overlap the light emitting layer EL. In some cases, the electrostatic discharge unit ESD can overlap the whole or part of the light emitting layer EL.

Embodiments of the disclosure described above are briefly described below.

A gate driving circuit according to an aspect of the disclosure can comprise n gate driving panel circuits outputting two or more gate signals (where, n is a natural number equal to or larger than 2), a start dummy gate driving panel circuit generating a first feedback voltage and transferring a start carry signal to a first gate driving panel circuit among the plurality of gate driving panel circuits, and an end dummy gate driving panel circuit generating a second feedback voltage and transferring an end carry signal to an nth gate driving panel circuit.

The two or more gate signals can include at least one scan signal for controlling a scan transistor connecting a data line with a gate node of a driving transistor or at least one sensing signal for controlling a sensing transistor connecting a reference voltage line with a source node or drain node of the driving transistor.

The n gate driving panel circuits can include an output buffer block outputting the two or more gate signals according to voltage states of a first node and a second node, a logic block controlling voltages of the first node and the second node, and a real-time sensing control block controlling the logic block to perform real-time sensing driving.

The output buffer block can include a carry output buffer outputting a carry signal and a scan output buffer outputting at least one scan signal.

The output buffer block further can include a sensing output buffer outputting the at least one sensing signal.

The logic block can include an input/reset block controlling charge and discharge of the first node, a stabilization block stabilizing the first node during a period when the at least one scan signal has a turn-off level voltage, and an inverter block controlling the voltage of the second node by inverting the voltage of the first node.

The start carry signal can be a signal for charging the first node of the first gate driving panel circuit.

The start dummy gate driving panel circuit can include a carry output buffer outputting the start carry signal according to voltage states of a first node and a second node, a first feedback circuit outputting the first feedback voltage according to the voltage state of the second node, a logic block controlling voltages of the first node and the second node, and a real-time sensing control block controlling the logic block to perform real-time sensing driving.

The logic block can include an input/reset block controlling charge and discharge of the first node, a stabilization block stabilizing the first node during a period when the start carry signal has a turn-off level voltage, and an inverter block controlling the voltage of the second node by inverting the voltage of the first node.

The first feedback circuit can include at least one feedback transistor in which a gate node is connected to the second node, a gate low-potential voltage is applied to a gate low-potential node, and the first feedback voltage is output through a feedback node.

The at least one feedback transistor can be formed in the same size as a transistor constituting the stabilization block.

The end carry signal can be a signal for discharging the first node of the nth gate driving panel circuit.

The end dummy gate driving panel circuit can include a carry output buffer outputting the end carry signal according to voltage states of a first node and a second node, a second feedback circuit outputting the second feedback voltage according to the voltage state of the second node, and a logic block controlling the voltages of the first node and the second node.

The logic block can include an input/reset block controlling charge and discharge of the first node, a stabilization block stabilizing the first node during a period when the end carry signal has a turn-off level voltage, and an inverter block controlling the voltage of the second node by inverting the voltage of the first node.

The second feedback circuit can include at least one feedback transistor in which a gate node is connected to the second node, a gate low-potential voltage is applied to a gate low-potential node, and the second feedback voltage is output through a feedback node.

The at least one feedback transistor can be formed in the same size as a transistor constituting the stabilization block.

The gate driving circuit can further comprise a gate high-potential compensation circuit receiving the first feedback voltage and the second feedback voltage and generating a gate high-potential compensation voltage applied to the n gate driving panel circuits.

The gate high-potential compensation voltage can be supplied to an inverter control node for maintaining an inverter block, which inverts a voltage of a first node to control a voltage of a second node, always in a turn-on state, in the n gate driving panel circuits.

A display device according to an aspect of the disclosure can comprise a display panel having a plurality of subpixels, a gate driving circuit configured to supply a plurality of gate signals to the display panel through a plurality of gate lines, a data driving circuit configured to supply a plurality of data voltages to the display panel through a plurality of data lines, and a timing controller configured to drive the gate driving circuit and the data driving circuit. The gate driving circuit can include n gate driving panel circuits outputting two or more gate signals (where, n is a natural number equal to or larger than 2), a start dummy gate driving panel circuit generating a first feedback voltage and transferring a start carry signal to a first gate driving panel circuit among the plurality of gate driving panel circuits, and an end dummy gate driving panel circuit generating a second feedback voltage and transferring an end carry signal to an nth gate driving panel circuit.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only.

For example, the disclosed embodiments are intended to illustrate the scope of the technical idea of the disclosure.

What is claimed:

1. A gate driving circuit, comprising:

n gate driving panel circuits configured to output two or more gate signals, wherein n is a natural number equal to or larger than 2;

a start dummy gate driving panel circuit configured to generate a first feedback voltage and transfer a start carry signal to a first gate driving panel circuit among the n gate driving panel circuits; and an end dummy gate driving panel circuit configured to generate a second feedback voltage and transfer an end carry signal to an nth gate driving panel circuit among the n gate driving panel circuits.

2. The gate driving circuit of claim 1, wherein the two or more gate signals include:

at least one scan signal to control a scan transistor connecting a data line with a gate node of a driving transistor; or at least one sensing signal to control a sensing transistor connecting a reference voltage line with a source node or drain node of the driving transistor.

3. The gate driving circuit of claim 2, wherein the n gate driving panel circuits include:

an output buffer block configured to output the two or more gate signals according to voltage states of a first node and a second node;

a logic block configured to control voltages of the first node and the second node; and a real-time sensing control block configured to control the logic block to perform real-time sensing driving.

4. The gate driving circuit of claim 3, wherein the output buffer block includes:

a carry output buffer configured to output a carry signal; and a scan output buffer configured to output the at least one scan signal.

5. The gate driving circuit of claim 3, wherein the output buffer block further includes a sensing output buffer configured to output the at least one sensing signal.

6. The gate driving circuit of claim 3, wherein the logic block includes:

an input/reset block configured to control charge and discharge of the first node;

a stabilization block configured to stabilize the first node during a period when the at least one scan signal has a turn-off level voltage; and an inverter block configured to control the voltage of the second node by inverting the voltage of the first node.

7. The gate driving circuit of claim 3, wherein the start carry signal is a signal for charging the first node of the first gate driving panel circuit.

8. The gate driving circuit of claim 1, wherein the start dummy gate driving panel circuit includes:

a carry output buffer configured to output the start carry signal according to voltage states of a first node and a second node;

a first feedback circuit configured to output the first feedback voltage according to the voltage state of the second node;

a logic block configured to control voltages of the first node and the second node; and a real-time sensing control block configured to control the logic block to perform real-time sensing driving.

9. The gate driving circuit of claim 8, wherein the logic block includes:

an input/reset block configured to control charge and discharge of the first node;

a stabilization block configured to stabilize the first node during a period when the start carry signal has a turn-off level voltage; and an inverter block configured to control the voltage of the second node by inverting the voltage of the first node.

10. The gate driving circuit of claim 9, wherein the first feedback circuit includes at least one feedback transistor in which a gate node is connected to the second node, a gate low-potential voltage is applied to a gate low-potential node, and the first feedback voltage is output through a feedback node.

11. The gate driving circuit of claim 10, wherein the at least one feedback transistor is formed in the same size as a transistor constituting the stabilization block.

12. The gate driving circuit of claim 3, wherein the end carry signal is a signal for discharging the first node of the nth gate driving panel circuit.

13. The gate driving circuit of claim 1, wherein the end dummy gate driving panel circuit includes:

a carry output buffer configured to output the end carry signal according to voltage states of a first node and a second node;

a second feedback circuit configured to output the second feedback voltage according to the voltage state of the second node; and a logic block configured to control the voltages of the first node and the second node.

14. The gate driving circuit of claim 13, wherein the logic block includes:

an input/reset block configured to control charge and discharge of the first node;

a stabilization block configured to stabilize the first node during a period when the end carry signal has a turn-off level voltage; and an inverter block configured to control the voltage of the second node by inverting the voltage of the first node.

15. The gate driving circuit of claim 14, wherein the second feedback circuit includes at least one feedback transistor in which a gate node is connected to the second node, a gate low-potential voltage is applied to a gate low-potential node, and the second feedback voltage is output through a feedback node.

16. The gate driving circuit of claim 15, wherein the at least one feedback transistor is formed in a same size as a transistor constituting the stabilization block.

17. The gate driving circuit of claim 1, further comprising a gate high-potential compensation circuit configured to receive the first feedback voltage and the second feedback voltage and generate a gate high-potential compensation voltage applied to the n gate driving panel circuits.

18. The gate driving circuit of claim 17, wherein the gate high-potential compensation voltage is supplied to an inverter control node for maintaining an inverter block, which inverts a voltage of a first node to control a voltage of a second node, always in a turn-on state, in the n gate driving panel circuits.

19. A display device, comprising:

a display panel including a plurality of subpixels;

a gate driving circuit configured to supply a plurality of gate signals to the display panel through a plurality of gate lines;

a data driving circuit configured to supply a plurality of data voltages to the display panel through a plurality of data lines; and a timing controller configured to drive the gate driving circuit and the data driving circuit, wherein the gate driving circuit includes:

n gate driving panel circuits configured to output two or more gate signals, wherein n is a natural number equal to or larger than 2;

a start dummy gate driving panel circuit configured to generate a first feedback voltage and transfer a start carry signal to a first gate driving panel circuit among the n gate driving panel circuits; and an end dummy gate driving panel circuit configured to generate a second feedback voltage and transfer an end carry signal to an nth gate driving panel circuit among the n gate driving panel circuits.

* * * * *